(12) United States Patent
Peret et al.

(10) Patent No.: US 10,802,495 B2
(45) Date of Patent: Oct. 13, 2020

(54) USER CONTROL DEVICE FOR A TRANSPORTER

(71) Applicant: DEKA Products Limited Partnership, Manchester, NH (US)

(72) Inventors: Bob D. Peret, Bedford, NH (US); Stewart M. Coulter, Bedford, NH (US); Dean Kamen, Bedford, NH (US); Derek G. Kane, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 182 days.

(21) Appl. No.: 15/486,980

(22) Filed: Apr. 13, 2017

(65) Prior Publication Data

US 2017/0300058 A1    Oct. 19, 2017

Related U.S. Application Data

(60) Provisional application No. 62/322,522, filed on Apr. 14, 2016.

(51) Int. Cl.
*G05D 1/02* (2020.01)
*B60L 15/10* (2006.01)
(Continued)

(52) U.S. Cl.
CPC ......... *G05D 1/0223* (2013.01); *A61G 3/0808* (2013.01); *A61G 5/06* (2013.01);
(Continued)

(58) Field of Classification Search
CPC ........ A61G 5/1051; A61G 5/061; A61G 5/06; A61G 5/065; A61G 3/0808; G05D 1/0011;
(Continued)

(56) References Cited

U.S. PATENT DOCUMENTS

| 584,127 A | 6/1897 | Draullette et al. |
| 849,270 A | 4/1907 | Schafer |

(Continued)

FOREIGN PATENT DOCUMENTS

| CA | 2580632 | 3/2006 |
| CA | 2822729 | 3/2006 |

(Continued)

OTHER PUBLICATIONS

Cooper, Rory A., Intelligent Control of Power Wheelchairs, IEEE Engineering in Medicine and Biology Magazine, IEEE Service Center, Piscataway, NJ, US, vol. 14, No. 4, Jul. 1, 1995, pp. 423-431, XP11084628.

(Continued)

*Primary Examiner* — Hunter B Lonsberry
*Assistant Examiner* — Luis A Martinez Borrero
(74) *Attorney, Agent, or Firm* — Kathleen Chapman

(57) ABSTRACT

A user control device for a transporter. The user control device can communicate with the transporter via electrical interface(s) that can facilitate communication and data processing among the user interface device and controllers that can control the movement of the transporter. The user control device can perform automated actions based on the environment in which the transporter operates and the user's desired movement of the transporter. External applications can enable monitoring and control of the transporter.

20 Claims, 47 Drawing Sheets

(51) Int. Cl.
  *A61G 5/10* (2006.01)
  *A61G 3/08* (2006.01)
  *A61G 5/06* (2006.01)
  *G01S 19/01* (2010.01)

(52) U.S. Cl.
  CPC ............ *A61G 5/061* (2013.01); *A61G 5/104* (2013.01); *A61G 5/1043* (2013.01); *A61G 5/1051* (2016.11); *A61G 5/1059* (2013.01); *A61G 5/1067* (2013.01); *B60L 15/10* (2013.01); *G05D 1/0246* (2013.01); *G05D 1/0274* (2013.01); *G05D 1/0278* (2013.01); *A61G 2203/14* (2013.01); *A61G 2203/22* (2013.01); *A61G 2203/30* (2013.01); *G01S 19/01* (2013.01); *G05D 2201/0206* (2013.01); *Y02T 10/645* (2013.01); *Y02T 90/16* (2013.01)

(58) Field of Classification Search
  CPC ........ G05D 1/024; G05D 1/12; G05D 1/0223; G05D 1/0088; G05D 1/0212; G05D 1/0221
  See application file for complete search history.

(56) References Cited

U.S. PATENT DOCUMENTS

| | | |
|---|---|---|
| 880,823 A | 3/1908 | Redfield |
| 2,224,411 A | 12/1940 | Smith |
| 2,415,056 A | 1/1947 | Wheeler |
| 2,618,447 A | 11/1952 | Lecarme |
| 2,742,973 A | 4/1956 | Johannesen |
| 2,966,223 A | 12/1960 | Gleasman |
| 3,017,199 A | 1/1962 | Sechrist |
| 3,145,797 A | 8/1964 | Taylor |
| 3,179,355 A | 4/1965 | Pickering |
| 3,260,324 A | 7/1966 | Suarez |
| 3,283,398 A | 11/1966 | Andren |
| 3,288,234 A | 11/1966 | Feliz |
| 3,306,626 A | 2/1967 | Kawada |
| 3,313,365 A | 4/1967 | Jackson |
| 3,338,328 A | 8/1967 | Cataldo |
| 3,348,518 A | 10/1967 | Forsyth |
| 3,374,845 A | 3/1968 | Selwyn |
| 3,399,742 A | 9/1968 | Malick |
| 3,446,304 A | 5/1969 | Alimanestiand |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,628,624 A | 12/1971 | Wesener |
| 3,718,342 A | 2/1973 | Freed |
| 3,787,066 A | 1/1974 | Hautier |
| 3,790,150 A | 2/1974 | Lippert |
| 3,860,264 A | 1/1975 | Douglas |
| 3,872,945 A | 3/1975 | Hickman |
| 3,893,689 A | 7/1975 | Verhoff |
| 3,952,822 A | 4/1976 | Udden |
| 3,965,402 A | 6/1976 | Mogle |
| 3,993,154 A | 11/1976 | Simmons et al. |
| 4,005,907 A | 2/1977 | Bonomo |
| 4,018,440 A | 4/1977 | Deutsch |
| 4,030,753 A | 6/1977 | Meiners |
| 4,054,319 A | 10/1977 | Fogg et al. |
| 4,062,558 A | 12/1977 | Wasserman |
| 4,065,145 A | 12/1977 | Chambers |
| 4,065,146 A | 12/1977 | Denzer |
| 4,076,270 A | 2/1978 | Winchell |
| 4,078,627 A | 3/1978 | Brown et al. |
| 4,087,107 A | 5/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,115,445 A | 9/1978 | Hearsey |
| 4,140,200 A | 2/1979 | Tucek |
| 4,151,892 A | 5/1979 | Francken |
| D253,234 S | 10/1979 | Cooke |
| 4,222,449 A | 9/1980 | Feliz |
| 4,264,082 A | 4/1981 | Fouchey, Jr. |
| 4,266,627 A | 5/1981 | Lauber |
| 4,274,503 A | 6/1981 | Mackintosh |
| 4,281,734 A | 8/1981 | Johnston |
| 4,293,052 A | 10/1981 | Daswick |
| 4,307,788 A | 12/1981 | Shelton |
| 4,325,565 A | 4/1982 | Winchell |
| 4,354,569 A | 10/1982 | Eichholz |
| D266,758 S | 11/1982 | Johannsen et al. |
| 4,363,493 A | 12/1982 | Veneklasen |
| 4,373,600 A | 2/1983 | Buschbom |
| 4,375,840 A | 3/1983 | Campbell |
| 4,413,693 A | 11/1983 | Derby |
| 4,448,455 A | 5/1984 | Ellegaard |
| 4,456,086 A | 6/1984 | Wier |
| 4,484,648 A | 11/1984 | Jephcott |
| 4,510,956 A | 4/1985 | King |
| 4,512,588 A | 4/1985 | Cox |
| 4,556,997 A | 12/1985 | Takamiya |
| 4,560,022 A | 12/1985 | Kassai |
| 4,566,707 A * | 1/1986 | Nitzberg ................ A61G 5/066 180/8.2 |
| 4,570,078 A | 2/1986 | Yashima |
| 4,571,844 A | 2/1986 | Komasaku |
| 4,624,469 A | 11/1986 | Bourne, Jr. |
| 4,648,783 A | 3/1987 | Tan |
| 4,657,271 A | 4/1987 | Salmon |
| 4,657,272 A | 4/1987 | Davenport |
| 4,674,584 A | 6/1987 | Watkins |
| 4,685,693 A | 8/1987 | Vadjunec |
| 4,709,772 A | 12/1987 | Brunet |
| 4,712,806 A | 12/1987 | Patrin |
| 4,716,980 A | 1/1988 | Butler |
| 4,722,547 A | 2/1988 | Kishi |
| 4,732,353 A | 3/1988 | Studer |
| 4,740,001 A | 4/1988 | Torleumke |
| 4,746,132 A | 5/1988 | Eagan |
| 4,750,578 A | 6/1988 | Brandenfels |
| 4,754,255 A | 6/1988 | Sanders et al. |
| 4,770,410 A | 9/1988 | Brown |
| 4,778,133 A | 10/1988 | Sakurai |
| 4,786,069 A | 11/1988 | Tang |
| 4,787,679 A | 11/1988 | Arnold |
| 4,790,400 A | 12/1988 | Sheeter |
| 4,790,548 A | 12/1988 | Decelles |
| 4,794,730 A | 1/1989 | Fischbach |
| 4,794,999 A | 1/1989 | Hester |
| 4,798,255 A | 1/1989 | Wu |
| 4,802,542 A | 2/1989 | Houston |
| 4,809,804 A | 3/1989 | Houston |
| 4,834,200 A | 5/1989 | Kajita |
| 4,837,694 A | 6/1989 | Narita et al. |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,897,070 A | 1/1990 | Wagstaff |
| 4,913,252 A | 4/1990 | Bartley et al. |
| 4,919,225 A | 4/1990 | Sturges |
| D308,364 S | 6/1990 | Beasley, Jr. et al. |
| 4,941,854 A | 7/1990 | Takahashi et al. |
| 4,944,360 A | 7/1990 | Sturges |
| 4,953,851 A | 9/1990 | Sherlock |
| 4,964,679 A | 10/1990 | Rath |
| 4,967,862 A | 11/1990 | Pong et al. |
| 4,973,071 A | 11/1990 | Ishizaki |
| 4,984,754 A | 1/1991 | Yarrington |
| 4,985,947 A | 1/1991 | Ethridge |
| 4,998,596 A | 3/1991 | Miksitz |
| 5,001,636 A | 3/1991 | Shiraishi et al. |
| 5,002,295 A | 3/1991 | Lin |
| 5,011,171 A | 4/1991 | Cook |
| 5,012,176 A | 4/1991 | Laforge |
| RE33,675 E | 8/1991 | Young |

(56) References Cited

U.S. PATENT DOCUMENTS

| | | |
|---|---|---|
| 5,044,457 A | 9/1991 | Aikman |
| 5,052,237 A | 10/1991 | Reimann |
| 5,076,390 A | 12/1991 | Haskins |
| 5,087,103 A | 2/1992 | Pompier |
| 5,088,761 A | 2/1992 | Takehara et al. |
| 5,098,041 A | 3/1992 | Uetrecht |
| 5,111,899 A | 5/1992 | Reimann |
| 5,123,972 A | 6/1992 | Ostrander |
| 5,124,938 A | 6/1992 | Algrain |
| 5,125,468 A | 6/1992 | Coker |
| 5,136,219 A | 8/1992 | Takahashi |
| 5,158,493 A | 10/1992 | Morgrey |
| 5,161,820 A | 11/1992 | Vollmer |
| 5,165,711 A | 11/1992 | Tsai |
| 5,168,947 A | 12/1992 | Rodenborn |
| 5,171,173 A | 12/1992 | Henderson |
| 5,186,270 A | 2/1993 | West |
| 5,208,521 A | 5/1993 | Aoyama |
| 5,217,246 A | 6/1993 | Williams |
| 5,221,883 A | 6/1993 | Takenaka |
| 5,229,068 A | 7/1993 | Johansson et al. |
| 5,241,875 A | 9/1993 | Kochanneck |
| 5,248,007 A | 9/1993 | Watkins |
| 5,261,503 A | 11/1993 | Yasui |
| 5,274,576 A | 12/1993 | Williams |
| 5,276,588 A | 1/1994 | Repplinger |
| 5,276,624 A | 1/1994 | Ito |
| 5,297,646 A | 3/1994 | Yamamura |
| 5,307,888 A | 5/1994 | Urvoy |
| 5,307,892 A | 5/1994 | Philips |
| 5,314,034 A | 5/1994 | Chittal |
| 5,350,033 A | 9/1994 | Kraft |
| 5,366,036 A | 11/1994 | Perry |
| 5,369,580 A | 11/1994 | Monji |
| 5,376,868 A | 12/1994 | Toyoda |
| D355,148 S | 2/1995 | Orsolini |
| 5,388,658 A | 2/1995 | Ando et al. |
| 5,397,890 A | 3/1995 | Schueler |
| 5,408,411 A | 4/1995 | Nakamura |
| 5,408,811 A | 4/1995 | Satake |
| 5,417,298 A | 5/1995 | Shibahata |
| 5,419,624 A | 5/1995 | Adler |
| 5,450,919 A | 9/1995 | Shitani |
| 5,465,806 A | 11/1995 | Higasa |
| 5,482,125 A | 1/1996 | Pagett |
| D373,121 S | 8/1996 | Deiuliis et al. |
| 5,551,756 A | 9/1996 | Gurasich et al. |
| 5,576,959 A | 11/1996 | Hrovat |
| D376,585 S | 12/1996 | Wathen et al. |
| 5,615,116 A | 3/1997 | Gudat |
| D381,325 S | 7/1997 | McMahan et al. |
| 5,646,845 A | 7/1997 | Gudat |
| 5,649,605 A | 7/1997 | Nne Gert Steen Slashed |
| 5,657,828 A | 8/1997 | Nagamachi |
| 5,695,021 A | 12/1997 | Schaffner |
| 5,701,965 A | 12/1997 | Kamen et al. |
| 5,701,968 A | 12/1997 | Wright-Ott |
| 5,705,746 A | 1/1998 | Trost |
| 5,732,379 A | 3/1998 | Eckert |
| 5,743,347 A | 4/1998 | Gingerich |
| 5,746,282 A | 5/1998 | Fujiwara |
| 5,769,441 A | 6/1998 | Namngani |
| 5,774,819 A | 6/1998 | Yamamoto et al. |
| 5,775,452 A | 7/1998 | Patmont |
| 5,791,425 A | 8/1998 | Kamen |
| 5,794,730 A | 8/1998 | Kamen |
| 5,799,745 A | 9/1998 | Fukatani |
| 5,799,914 A | 9/1998 | Chivallier et al. |
| 5,826,209 A | 10/1998 | Matsuno |
| D402,645 S | 12/1998 | Garguilo |
| 5,848,660 A | 12/1998 | McGreen |
| 5,850,136 A | 12/1998 | Kaneko |
| 5,869,943 A | 2/1999 | Nakashima et al. |
| 5,869,946 A | 2/1999 | Carobolante |
| 5,893,896 A | 4/1999 | Imamura et al. |
| 5,927,414 A | 7/1999 | Kan et al. |
| 5,928,309 A | 7/1999 | Korver |
| 5,931,421 A | 8/1999 | Surauer et al. |
| 5,939,864 A | 8/1999 | Lenhart et al. |
| 5,965,991 A | 10/1999 | Koike |
| 5,971,091 A | 10/1999 | Kamen |
| 5,973,463 A | 10/1999 | Okuda |
| 5,975,225 A | 11/1999 | Kamen |
| 5,986,221 A | 11/1999 | Stanley |
| 6,002,975 A | 12/1999 | Schiffmann |
| 6,003,624 A | 12/1999 | Jorgensen et al. |
| 6,024,182 A | 2/2000 | Hamada et al. |
| 6,036,619 A | 3/2000 | Tashiro |
| 6,039,142 A | 3/2000 | Eckstein |
| 6,050,357 A | 4/2000 | Staelin |
| 6,052,647 A | 4/2000 | Parkinson |
| 6,053,579 A | 4/2000 | Nelson et al. |
| 6,059,062 A | 5/2000 | Staelin |
| 6,062,600 A | 5/2000 | Kamen et al. |
| 6,062,651 A | 5/2000 | Schaad |
| 6,065,558 A | 5/2000 | Wielenga |
| 6,073,951 A | 6/2000 | Jindra et al. |
| 6,076,033 A | 6/2000 | Hamada |
| 6,089,680 A | 7/2000 | Yoshioka et al. |
| 6,092,249 A | 7/2000 | Kamen et al. |
| D428,936 S | 8/2000 | Serfaty et al. |
| 6,105,704 A | 8/2000 | Hamada |
| 6,108,592 A | 8/2000 | Kurtzberg et al. |
| 6,123,398 A | 9/2000 | Arai |
| 6,125,953 A | 10/2000 | Arai |
| 6,125,957 A | 10/2000 | Kauffmann |
| 6,131,057 A | 10/2000 | Tamaki |
| 6,141,613 A | 10/2000 | Fan |
| 6,148,939 A | 11/2000 | Brookhart |
| 6,154,692 A | 11/2000 | Cielaszyk |
| D434,762 S | 12/2000 | Ikenaga |
| 6,169,946 B1 | 1/2001 | Griessbach |
| 6,189,643 B1 | 2/2001 | Takahashi |
| 6,192,305 B1 | 2/2001 | Schiffmann |
| 6,208,734 B1 | 3/2001 | Ortscheid et al. |
| 6,208,929 B1 | 3/2001 | Matsuno et al. |
| 6,212,276 B1 | 4/2001 | Inoue |
| 6,223,104 B1 | 4/2001 | Kamen |
| 6,223,114 B1 | 4/2001 | Boros |
| 6,225,977 B1 | 5/2001 | Li |
| D444,184 S | 6/2001 | Kettler |
| 6,247,548 B1 | 6/2001 | Hayashi |
| 6,260,646 B1 | 7/2001 | Fernandez et al. |
| 6,263,261 B1 | 7/2001 | Brown |
| 6,273,212 B1 | 8/2001 | Husted et al. |
| 6,276,471 B1 | 8/2001 | Kratzenberg et al. |
| 6,285,778 B1 | 9/2001 | Nakajima et al. |
| 6,288,505 B1 | 9/2001 | Heinzmann |
| 6,292,722 B1 | 9/2001 | Holmes et al. |
| 6,302,230 B1 | 10/2001 | Kamen |
| 6,311,794 B1 | 11/2001 | Morrell et al. |
| 6,320,336 B1 | 11/2001 | Eguchi |
| 6,324,446 B1 | 11/2001 | Brown et al. |
| 6,325,736 B1 | 12/2001 | Hamada |
| 6,328,125 B1 | 12/2001 | Brink |
| 6,332,103 B1 | 12/2001 | Steenson, Jr. |
| 6,332,104 B1 | 12/2001 | Brown |
| D452,692 S | 1/2002 | Fukuda |
| 6,343,664 B2 | 2/2002 | Morrell et al. |
| 6,356,188 B1 | 3/2002 | Meyers |
| 6,357,544 B1 | 3/2002 | Kamen |
| 6,360,996 B1 | 3/2002 | Bockman et al. |
| 6,367,817 B1 | 4/2002 | Kamen |
| 6,371,228 B1 | 4/2002 | Husted et al. |
| 6,377,906 B1 | 4/2002 | Rowe |
| 6,386,576 B1 | 5/2002 | Kamen et al. |
| 6,388,580 B1 | 5/2002 | Graham |
| 6,397,046 B1 | 5/2002 | Kfoury |
| 6,405,816 B1 | 6/2002 | Kamen et al. |
| 6,408,240 B1 | 6/2002 | Morrell et al. |
| 6,415,215 B1 | 7/2002 | Nishizaki |
| 6,415,879 B2 | 7/2002 | Kamen et al. |
| 6,416,272 B1 | 7/2002 | Suehiro |
| 6,435,535 B1 | 8/2002 | Field |

(56) References Cited

U.S. PATENT DOCUMENTS

| | | |
|---|---|---|
| 6,435,538 B2 | 8/2002 | Ellis |
| 6,443,250 B1 | 9/2002 | Kamen et al. |
| 6,443,251 B1 | 9/2002 | Morrell et al. |
| 6,446,320 B2 | 9/2002 | Kilgore |
| 6,463,369 B2 | 10/2002 | Sadano |
| D466,122 S | 11/2002 | Moody |
| 6,484,829 B1 | 11/2002 | Cox |
| D466,516 S | 12/2002 | Peiker |
| 6,502,011 B2 | 12/2002 | Haag |
| 6,508,319 B1 | 1/2003 | Langenfeld et al. |
| 6,538,411 B1 | 3/2003 | Field et al. |
| 6,543,564 B1 | 4/2003 | Kamen |
| 6,543,848 B1 | 4/2003 | Suga et al. |
| 6,543,858 B1 | 4/2003 | Melton |
| 6,547,026 B2 | 4/2003 | Kamen et al. |
| 6,553,271 B1 | 4/2003 | Morrell |
| 6,554,250 B2 | 4/2003 | Alves et al. |
| 6,556,909 B2 | 4/2003 | Matsumoto |
| 6,561,294 B1 | 5/2003 | Kamen |
| 6,562,511 B2 | 5/2003 | Daroux |
| 6,571,176 B1 | 5/2003 | Shinmura |
| 6,571,892 B2 * | 6/2003 | Kamen ............... A61G 5/061 180/21 |
| 6,575,539 B2 | 6/2003 | Reich |
| 6,581,714 B1 | 6/2003 | Kamen |
| 6,582,181 B2 | 6/2003 | Suehiro et al. |
| 6,586,901 B1 | 7/2003 | Singer et al. |
| 6,593,849 B2 | 7/2003 | Chubb |
| 6,598,941 B2 | 7/2003 | Field et al. |
| 6,614,343 B1 | 9/2003 | Fennel |
| 6,615,938 B2 | 9/2003 | Morrell et al. |
| 6,634,451 B2 | 10/2003 | Sakakiyama |
| 6,643,451 B1 | 11/2003 | Tokura et al. |
| 6,647,248 B1 | 11/2003 | Ortscheid et al. |
| 6,651,763 B1 | 11/2003 | Kamen et al. |
| 6,651,766 B2 | 11/2003 | Kamen et al. |
| 6,654,674 B2 | 11/2003 | Lu |
| 6,654,675 B2 | 11/2003 | Pedersen et al. |
| 6,659,211 B2 | 12/2003 | Esposito |
| 6,659,570 B2 | 12/2003 | Nakamura |
| D485,279 S | 1/2004 | DeCombe |
| 6,694,225 B2 | 2/2004 | Aga |
| 6,704,622 B2 | 3/2004 | Tinskey |
| 6,713,693 B1 | 3/2004 | Sadowski et al. |
| D489,027 S | 4/2004 | Waters |
| D489,029 S | 4/2004 | Waters |
| D489,300 S | 5/2004 | Chang |
| 6,752,231 B2 | 6/2004 | Hume |
| D493,127 S | 7/2004 | Waters |
| D493,128 S | 7/2004 | Waters |
| D493,801 S | 8/2004 | Byun |
| D494,099 S | 8/2004 | Maurer |
| 6,779,621 B2 | 8/2004 | Kamen et al. |
| 6,781,960 B1 | 8/2004 | Charas |
| 6,789,640 B1 | 9/2004 | Arling |
| 6,793,258 B2 | 9/2004 | Gray |
| 6,796,396 B2 | 9/2004 | Kamen |
| 6,799,649 B2 | 10/2004 | Kamen et al. |
| 6,827,163 B2 | 12/2004 | Amsbury et al. |
| 6,856,326 B1 | 2/2005 | Zhai |
| D503,402 S | 3/2005 | Su et al. |
| 6,866,107 B2 | 3/2005 | Heinzmann |
| 6,868,931 B2 | 3/2005 | Morrell |
| D503,928 S | 4/2005 | Obata |
| 6,874,591 B2 | 4/2005 | Morrell et al. |
| 6,889,784 B2 | 5/2005 | Troll |
| 6,907,949 B1 | 6/2005 | Wang |
| D507,206 S | 7/2005 | Wang |
| 6,920,947 B2 | 7/2005 | Kamen et al. |
| 6,938,923 B2 | 9/2005 | Mulhern et al. |
| 6,962,383 B2 | 11/2005 | Takenoshita et al. |
| 6,965,206 B2 | 11/2005 | Kamen et al. |
| 6,969,079 B2 | 11/2005 | Kamen et al. |
| 7,000,933 B2 | 2/2006 | Arling et al. |
| 7,004,271 B1 | 2/2006 | Kamen et al. |
| 7,006,901 B2 | 2/2006 | Wang |
| D517,086 S | 3/2006 | Siebel |
| 7,017,686 B2 * | 3/2006 | Kamen ............... G05D 1/0891 180/7.1 |
| D521,017 S | 5/2006 | Jewitt |
| 7,040,713 B2 | 5/2006 | Rudolf |
| D524,315 S | 7/2006 | Reusing |
| 7,090,040 B2 | 8/2006 | Kamen et al. |
| D528,468 S | 9/2006 | Arling |
| D529,005 S | 9/2006 | Hong |
| 7,102,328 B2 | 9/2006 | Long et al. |
| 7,130,702 B2 | 10/2006 | Morrell |
| 7,174,976 B2 | 2/2007 | Kamen et al. |
| 7,178,611 B2 | 2/2007 | Zupanick |
| 7,178,614 B2 | 2/2007 | Ishii |
| 7,182,166 B2 | 2/2007 | Gray et al. |
| D539,810 S | 4/2007 | Cummins |
| 7,198,223 B2 | 4/2007 | Phelps, III et al. |
| 7,210,544 B2 | 5/2007 | Kamen et al. |
| 7,219,912 B2 | 5/2007 | Meyer |
| D544,486 S | 6/2007 | Hussaini |
| 7,234,779 B2 | 6/2007 | Bedford et al. |
| D546,782 S | 7/2007 | Poulet et al. |
| D549,721 S | 8/2007 | Ito |
| D549,722 S | 8/2007 | Ito et al. |
| D551,592 S | 9/2007 | Chang et al. |
| D551,722 S | 9/2007 | Chang et al. |
| 7,272,681 B2 | 9/2007 | Davies |
| 7,273,116 B2 | 9/2007 | Kamen et al. |
| D552,609 S | 10/2007 | Kornblum |
| 7,275,607 B2 | 10/2007 | Kamen et al. |
| D556,149 S | 11/2007 | Kaufhold et al. |
| D557,220 S | 12/2007 | Ewringmann |
| D557,221 S | 12/2007 | Ewringmann |
| 7,303,032 B2 | 12/2007 | Kahlert et al. |
| 7,316,441 B2 | 1/2008 | Iwatani et al. |
| D564,033 S | 3/2008 | Itskov et al. |
| 7,363,993 B2 | 4/2008 | Ishii |
| 7,370,713 B1 | 5/2008 | Kamen |
| 7,399,035 B2 | 7/2008 | Kusanagi et al. |
| 7,481,291 B2 | 1/2009 | Nishikawa |
| D585,906 S | 2/2009 | Berg et al. |
| D587,660 S | 3/2009 | Lin |
| 7,539,557 B2 * | 5/2009 | Yamauchi ............ G05D 1/0038 340/12.54 |
| 7,546,889 B2 | 6/2009 | Kamen et al. |
| D598,927 S | 8/2009 | Hirsch |
| 7,589,643 B2 | 9/2009 | Dagci |
| 7,592,900 B2 | 9/2009 | Kamen et al. |
| D601,922 S | 10/2009 | Imai et al. |
| 7,640,086 B2 | 12/2009 | Nakashima et al. |
| 7,688,191 B2 | 3/2010 | Lu |
| 7,690,447 B2 | 4/2010 | Kamen et al. |
| 7,690,452 B2 | 4/2010 | Kamen et al. |
| 7,703,568 B2 | 4/2010 | Ishii |
| D614,998 S | 5/2010 | Fujita |
| 7,740,099 B2 | 6/2010 | Field et al. |
| D619,945 S | 7/2010 | Sadanowicz et al. |
| 7,757,794 B2 | 7/2010 | Heinzmann et al. |
| 7,789,174 B2 | 9/2010 | Kamen |
| 7,823,676 B2 | 11/2010 | Yamada et al. |
| 7,856,248 B1 | 12/2010 | Fujisaki |
| 7,857,088 B2 | 12/2010 | Field |
| D632,229 S | 2/2011 | Kruse |
| 7,896,440 B2 | 3/2011 | Tsai |
| 7,900,725 B2 | 3/2011 | Heinzmann et al. |
| 7,917,097 B2 | 3/2011 | Hawkins et al. |
| 7,938,207 B2 * | 5/2011 | Kamen ............... B60L 15/2036 180/282 |
| 7,958,956 B2 | 6/2011 | Kakinuma et al. |
| D644,654 S | 9/2011 | Maitlen et al. |
| 8,011,459 B2 | 9/2011 | Serai |
| 8,014,923 B2 | 9/2011 | Ishii |
| 8,025,325 B1 | 9/2011 | Carrier et al. |
| 8,028,777 B2 | 10/2011 | Kakinuma |
| 8,050,820 B2 | 11/2011 | Yanaka |
| 8,050,837 B2 | 11/2011 | Yamada |
| 8,074,388 B2 | 12/2011 | Trainer |
| 8,091,672 B2 | 1/2012 | Gutsch |

(56) References Cited

U.S. PATENT DOCUMENTS

| | | | |
|---|---|---|---|
| 8,113,244 B2 | 2/2012 | Kamen et al. | |
| 8,151,912 B2 | 4/2012 | Koide et al. | |
| 8,155,828 B2 | 4/2012 | Fuwa et al. | |
| 8,160,794 B2 | 4/2012 | Fuwa | |
| 8,162,089 B2 | 4/2012 | Shaw | |
| 8,170,780 B2 | 5/2012 | Field | |
| 8,170,781 B2 | 5/2012 | Fuwa | |
| 8,172,016 B2 | 5/2012 | Goertzen et al. | |
| 8,186,462 B2 | 5/2012 | Kamen | |
| 8,224,524 B2 | 7/2012 | Nakashima | |
| 8,225,891 B2 | 7/2012 | Takenaka | |
| 8,239,992 B2 * | 8/2012 | Schnittman | A47L 11/4061 15/41.1 |
| 8,248,222 B2 | 8/2012 | Kamen | |
| 8,249,773 B2 | 8/2012 | Kawada | |
| 8,255,105 B2 | 8/2012 | Weissert | |
| 8,265,774 B2 | 9/2012 | Senba | |
| 8,269,130 B2 | 9/2012 | Mangan et al. | |
| 8,285,474 B2 | 10/2012 | Doi | |
| 8,312,017 B2 | 11/2012 | Martin et al. | |
| 8,326,469 B2 * | 12/2012 | Phillips | G05D 1/0088 701/2 |
| 8,346,441 B2 | 1/2013 | Miki et al. | |
| 8,371,410 B2 | 2/2013 | Fuwa | |
| D678,217 S | 3/2013 | Helm | |
| D678,320 S | 3/2013 | Kanalakis, Jr. | |
| 8,396,611 B2 * | 3/2013 | Phillips | G05D 1/0033 701/2 |
| 8,417,404 B2 | 4/2013 | Yen | |
| 8,418,705 B2 | 4/2013 | Ota et al. | |
| 8,453,768 B2 | 6/2013 | Kamen | |
| 8,467,941 B2 | 6/2013 | Field | |
| D686,200 S | 7/2013 | Huang et al. | |
| 8,490,723 B2 | 7/2013 | Heinzmann | |
| 8,504,248 B2 | 8/2013 | Taira | |
| 8,564,444 B2 | 10/2013 | Ota et al. | |
| 8,572,822 B2 | 11/2013 | Hasegawa | |
| 8,584,782 B2 | 11/2013 | Chen | |
| 8,587,583 B2 * | 11/2013 | Newcombe | G06T 17/00 345/420 |
| 8,621,684 B2 | 1/2014 | Okumatsu | |
| 8,636,451 B2 | 1/2014 | Yamashita et al. | |
| 8,639,416 B2 | 1/2014 | Jones | |
| 8,640,807 B2 | 2/2014 | Takenaka | |
| 8,672,339 B2 | 3/2014 | Raike, III | |
| 8,672,356 B2 | 3/2014 | Inaguma | |
| 8,684,123 B2 | 4/2014 | Chen | |
| 8,690,265 B2 | 4/2014 | Noblanc | |
| D704,621 S | 5/2014 | Taylor | |
| D705,799 S | 5/2014 | Funabashi et al. | |
| 8,738,238 B2 | 5/2014 | Rekow | |
| 8,738,278 B2 | 5/2014 | Chen | |
| D706,807 S | 6/2014 | Harre | |
| D707,701 S | 6/2014 | d'Amore | |
| 8,744,720 B1 | 6/2014 | Fujisaki | |
| 8,753,208 B2 | 6/2014 | Jaouen et al. | |
| D708,203 S | 7/2014 | Johnson | |
| 8,775,001 B2 | 7/2014 | Phillips | |
| 8,807,250 B2 | 8/2014 | Chen | |
| 8,830,048 B2 | 9/2014 | Kamen | |
| 8,832,875 B2 | 9/2014 | Odashima et al. | |
| 8,843,244 B2 * | 9/2014 | Phillips | G05D 1/0038 701/2 |
| D716,325 S | 10/2014 | Brudnicki | |
| 8,860,551 B2 | 10/2014 | Carraher | |
| D716,818 S | 11/2014 | Alegiani | |
| 8,925,563 B2 | 1/2015 | Ota et al. | |
| 8,958,976 B2 | 2/2015 | Kajima | |
| D723,558 S | 3/2015 | Downs | |
| 8,978,791 B2 | 3/2015 | Ha | |
| 9,002,535 B2 * | 4/2015 | Powers | G05D 1/0044 701/2 |
| 9,016,410 B2 | 4/2015 | Trowell et al. | |
| D729,270 S | 5/2015 | Claire | |
| D729,833 S | 5/2015 | Claire | |
| 9,038,212 B2 | 5/2015 | Yamaguchi et al. | |
| D732,062 S | 6/2015 | Kwon | |
| 9,045,190 B2 | 6/2015 | Chen | |
| 9,056,629 B2 * | 6/2015 | Kamo | B62D 11/003 |
| 9,096,281 B1 * | 8/2015 | Li | B62D 55/04 |
| D738,907 S | 9/2015 | Cabrera-Cordon et al. | |
| D738,913 S | 9/2015 | Cabrera-Cordon et al. | |
| 9,126,497 B2 | 9/2015 | Heinzmann | |
| 9,156,516 B2 | 10/2015 | Kahlert | |
| D742,300 S | 11/2015 | Fontaeus | |
| D742,407 S | 11/2015 | Park | |
| D742,795 S | 11/2015 | Siao | |
| 9,187,071 B2 | 11/2015 | Vinck et al. | |
| 9,193,066 B2 * | 11/2015 | Ohm | B25J 5/005 |
| 9,218,003 B2 * | 12/2015 | Fong | G05D 1/0274 |
| D747,352 S | 1/2016 | Lee et al. | |
| D750,179 S | 2/2016 | Foulkes et al. | |
| D752,572 S | 3/2016 | Kohler et al. | |
| 9,278,036 B2 * | 3/2016 | Lee | A61G 5/066 |
| 9,309,692 B2 | 4/2016 | Westwinkel | |
| D755,785 S | 5/2016 | Sirotich | |
| D757,732 S | 5/2016 | Galanti | |
| D758,284 S | 6/2016 | Ringer et al. | |
| D762,179 S | 7/2016 | Wong | |
| 9,400,044 B2 | 7/2016 | Wadhva et al. | |
| D763,359 S | 8/2016 | Kwong | |
| D764,520 S | 8/2016 | Lee et al. | |
| 9,403,566 B2 * | 8/2016 | Jacobsen | B62D 37/04 |
| 9,404,756 B2 * | 8/2016 | Fong | G05D 1/0274 |
| D765,718 S | 9/2016 | Vinna | |
| D766,312 S | 9/2016 | Hedges | |
| 9,455,104 B1 | 9/2016 | Leusenkamp et al. | |
| D769,314 S | 10/2016 | Piroddi | |
| D770,514 S | 11/2016 | Bae et al. | |
| D772,255 S | 11/2016 | Taylor et al. | |
| D772,924 S | 11/2016 | Begin et al. | |
| D772,930 S | 11/2016 | Vazquez et al. | |
| D775,148 S | 12/2016 | Anzures | |
| 9,527,213 B2 * | 12/2016 | Luo | B25J 9/162 |
| D778,312 S | 2/2017 | Goodwin et al. | |
| 9,567,021 B2 * | 2/2017 | Mailey | A61G 5/061 |
| D784,405 S | 4/2017 | Kim et al. | |
| D786,278 S | 5/2017 | Motamedi | |
| D786,770 S | 5/2017 | Smallhorn | |
| D787,420 S | 5/2017 | Smallhorn | |
| D787,996 S | 5/2017 | Rode et al. | |
| 9,636,265 B2 | 5/2017 | Furuta | |
| 9,656,704 B2 * | 5/2017 | Couture | B62D 55/075 |
| 9,662,438 B2 | 5/2017 | Kamen et al. | |
| D791,174 S | 7/2017 | Hart et al. | |
| D792,444 S | 7/2017 | Cho et al. | |
| D794,674 S | 8/2017 | Brush | |
| 9,730,029 B2 * | 8/2017 | Choudhury | G01S 5/021 |
| D797,772 S | 9/2017 | Mizono et al. | |
| D798,318 S | 9/2017 | Ferguson | |
| 9,750,896 B2 | 9/2017 | Kamen et al. | |
| 9,770,825 B2 * | 9/2017 | Goldenberg | B25J 9/08 |
| D801,996 S | 11/2017 | Yang | |
| D802,002 S | 11/2017 | Howard et al. | |
| D804,393 S | 12/2017 | Yoo et al. | |
| D805,972 S | 12/2017 | Lee et al. | |
| D805,973 S | 12/2017 | Mullaney | |
| D807,235 S | 1/2018 | Collins | |
| D807,236 S | 1/2018 | Collins | |
| D807,277 S | 1/2018 | Lee et al. | |
| D812,533 S | 3/2018 | Lee et al. | |
| D814,370 S | 4/2018 | Kim et al. | |
| D816,090 S | 4/2018 | Stonecipher et al. | |
| 9,974,467 B2 | 5/2018 | Blahnik et al. | |
| D821,410 S | 6/2018 | Vinna et al. | |
| 9,989,970 B1 * | 6/2018 | Morey | B62D 57/022 |
| 9,996,157 B2 | 6/2018 | Chaudhri et al. | |
| 10,007,391 B2 | 6/2018 | Sabatelli et al. | |
| 10,025,472 B2 | 7/2018 | Sabatelli | |
| D825,437 S | 8/2018 | Hilton et al. | |
| D825,493 S | 8/2018 | Chen | |
| D826,244 S | 8/2018 | Yampolskaya | |
| D826,255 S | 8/2018 | Andrizzi et al. | |

(56) References Cited

U.S. PATENT DOCUMENTS

| | | | |
|---|---|---|---|
| 10,055,108 B2 | 8/2018 | Bates | |
| 10,055,184 B1 | 8/2018 | Ferrell et al. | |
| D829,740 S | 10/2018 | Lepine et al. | |
| D830,384 S | 10/2018 | Lepine et al. | |
| D830,385 S | 10/2018 | Lepine et al. | |
| D830,386 S | 10/2018 | Lepine et al. | |
| D831,046 S | 10/2018 | Hashimoto et al. | |
| D832,289 S | 10/2018 | Chen et al. | |
| 10,088,993 B2 | 10/2018 | Hall et al. | |
| 10,127,250 B2 | 11/2018 | Dingman et al. | |
| 10,130,534 B2 | 11/2018 | Mattes | |
| D835,118 S | 12/2018 | Lee et al. | |
| D835,139 S | 12/2018 | Li | |
| D835,141 S | 12/2018 | Li et al. | |
| D835,632 S | 12/2018 | Liu et al. | |
| 10,149,589 B2* | 12/2018 | Lindhe | A47L 11/24 |
| D838,731 S | 1/2019 | Pillalamarri et al. | |
| 10,172,752 B2 | 1/2019 | Goffer | |
| D840,413 S | 2/2019 | Leach et al. | |
| D841,021 S | 2/2019 | Klar et al. | |
| D841,022 S | 2/2019 | Klar et al. | |
| D841,676 S | 2/2019 | Zhang | |
| D841,687 S | 2/2019 | Muller et al. | |
| D842,897 S | 3/2019 | Kumar | |
| 10,220,843 B2* | 3/2019 | Coulter | B60W 30/09 |
| 10,229,245 B2 | 3/2019 | Laurance | |
| 10,230,538 B2 | 3/2019 | Killian et al. | |
| 10,235,014 B2 | 3/2019 | Yang | |
| D847,161 S | 4/2019 | Chaudhri | |
| 10,266,097 B2* | 4/2019 | Takahata | G05D 1/024 |
| 10,296,167 B2 | 5/2019 | Liu | |
| 10,296,194 B2 | 5/2019 | McLean | |
| 10,318,589 B2 | 6/2019 | Sharp | |
| 10,338,776 B2 | 7/2019 | Andersson | |
| D855,634 S | 8/2019 | Kim | |
| 10,372,304 B2 | 8/2019 | Jaramillo, III | |
| 10,386,942 B2 | 8/2019 | Kim | |
| 10,423,283 B2 | 9/2019 | Ikeda | |
| 2001/0006125 A1* | 7/2001 | Richey, II | A61G 5/042 180/6.5 |
| 2001/0037163 A1* | 11/2001 | Allard | B25J 9/1689 700/245 |
| 2002/0007239 A1 | 1/2002 | Matsumoto | |
| 2002/0011361 A1* | 1/2002 | Richey, II | B60L 15/2036 180/6.5 |
| 2002/0056582 A1 | 5/2002 | Chubb | |
| 2002/0063006 A1 | 5/2002 | Kamen | |
| 2002/0082749 A1 | 6/2002 | Meyers | |
| 2002/0121394 A1* | 9/2002 | Kamen | A61G 5/061 180/41 |
| 2002/0121572 A1 | 9/2002 | Jacobson | |
| 2002/0189870 A1 | 12/2002 | Kamen | |
| 2003/0014167 A1 | 1/2003 | Pedersen | |
| 2003/0128840 A1 | 7/2003 | Luginbill | |
| 2003/0226698 A1 | 12/2003 | Kamen | |
| 2004/0005958 A1 | 1/2004 | Kamen | |
| 2004/0007121 A1 | 1/2004 | Graves et al. | |
| 2004/0007399 A1 | 1/2004 | Heinzmann et al. | |
| 2004/0007644 A1 | 1/2004 | Phelps, III et al. | |
| 2004/0055796 A1 | 1/2004 | Kamen | |
| 2004/0069543 A1 | 4/2004 | Kamen | |
| 2004/0124655 A1 | 7/2004 | Takenoshita et al. | |
| 2004/0135434 A1 | 7/2004 | Honda | |
| 2004/0201271 A1 | 10/2004 | Kakinuma | |
| 2004/0256886 A1 | 12/2004 | Wu | |
| 2004/0262871 A1 | 12/2004 | Schreuder | |
| 2005/0029023 A1 | 2/2005 | Takami | |
| 2005/0121866 A1 | 6/2005 | Kamen | |
| 2005/0134014 A1 | 6/2005 | Xie | |
| 2005/0211477 A1 | 9/2005 | Gray | |
| 2005/0236208 A1 | 10/2005 | Runkles | |
| 2005/0236894 A1 | 10/2005 | Lu et al. | |
| 2005/0251292 A1* | 11/2005 | Casey | G05D 1/024 700/245 |
| 2006/0108956 A1 | 5/2006 | Clark | |
| 2006/0163437 A1 | 7/2006 | Lin | |
| 2006/0187646 A1 | 8/2006 | Belson et al. | |
| 2006/0202439 A1 | 9/2006 | Kahlert | |
| 2006/0231313 A1 | 10/2006 | Ishii | |
| 2006/0279554 A1 | 12/2006 | Shin | |
| 2006/0293850 A1 | 12/2006 | Ahn et al. | |
| 2007/0001830 A1 | 1/2007 | Dagci | |
| 2007/0055424 A1 | 3/2007 | Peters et al. | |
| 2007/0100511 A1 | 5/2007 | Koerlin | |
| 2007/0156286 A1* | 7/2007 | Yamauchi | G05D 1/0038 700/245 |
| 2007/0208483 A1* | 9/2007 | Rabin | B60L 50/51 701/72 |
| 2007/0213900 A1 | 9/2007 | Raab | |
| 2007/0221423 A1 | 9/2007 | Chang | |
| 2007/0296170 A1 | 12/2007 | Field | |
| 2008/0029985 A1 | 2/2008 | Chen | |
| 2008/0086241 A1* | 4/2008 | Phillips | G05D 1/0038 701/2 |
| 2008/0147281 A1 | 6/2008 | Ishii | |
| 2008/0149798 A1 | 6/2008 | Tinoco | |
| 2008/0174415 A1 | 7/2008 | Tanida | |
| 2008/0197599 A1 | 8/2008 | Comstock | |
| 2008/0238005 A1 | 10/2008 | James | |
| 2008/0294288 A1* | 11/2008 | Yamauchi | G05D 1/0038 700/258 |
| 2008/0302938 A1 | 12/2008 | Goodwin et al. | |
| 2009/0009984 A1 | 1/2009 | Mangiardi | |
| 2009/0032323 A1 | 2/2009 | Kakinuma | |
| 2009/0037033 A1* | 2/2009 | Phillips | G05D 1/0278 701/2 |
| 2009/0045025 A1 | 2/2009 | Bassett | |
| 2009/0078485 A1 | 3/2009 | Gutsch | |
| 2009/0105908 A1 | 4/2009 | Casey | |
| 2009/0115149 A1 | 5/2009 | Wallis | |
| 2009/0224524 A1 | 9/2009 | Rathsack | |
| 2010/0025139 A1 | 2/2010 | Kosaka | |
| 2010/0107076 A1 | 4/2010 | Laurance | |
| 2010/0114468 A1 | 5/2010 | Field | |
| 2010/0121538 A1 | 5/2010 | Ishii | |
| 2010/0126787 A1 | 5/2010 | Kawada | |
| 2010/0138128 A1* | 6/2010 | Strothmann | B62D 11/04 701/72 |
| 2010/0222994 A1 | 9/2010 | Field | |
| 2010/0230919 A1 | 9/2010 | Kawada | |
| 2010/0235028 A1 | 9/2010 | Ishii | |
| 2010/0237645 A1 | 9/2010 | Trainer | |
| 2010/0250040 A1 | 9/2010 | Yamano | |
| 2011/0035101 A1 | 2/2011 | Kawada et al. | |
| 2011/0054717 A1* | 3/2011 | Yamauchi | G05D 1/0038 701/2 |
| 2011/0106339 A1* | 5/2011 | Phillips | G01C 21/20 701/2 |
| 2011/0123286 A1* | 5/2011 | Van Roosmalen | A61G 3/006 410/7 |
| 2011/0209929 A1 | 9/2011 | Heinzmann | |
| 2011/0215540 A1 | 9/2011 | Hunziker et al. | |
| 2011/0220427 A1 | 9/2011 | Chen | |
| 2011/0221160 A1 | 9/2011 | Shaw | |
| 2011/0225417 A1 | 9/2011 | Maharajh et al. | |
| 2011/0238247 A1 | 9/2011 | Yen | |
| 2011/0285195 A1 | 11/2011 | Ratgen | |
| 2012/0019554 A1 | 1/2012 | Narimatu et al. | |
| 2012/0046821 A1* | 2/2012 | Pettersson | G01C 21/20 701/25 |
| 2012/0072052 A1* | 3/2012 | Powers | G05D 1/024 701/2 |
| 2012/0168240 A1* | 7/2012 | Wilson | G05D 1/0212 180/167 |
| 2012/0174037 A1 | 7/2012 | Relyea et al. | |
| 2012/0185091 A1* | 7/2012 | Field | G05D 1/0044 700/254 |
| 2012/0185094 A1* | 7/2012 | Rosenstein | B25J 11/009 700/259 |
| 2012/0197470 A1 | 8/2012 | Inui | |
| 2012/0205176 A1 | 8/2012 | Ha | |

(56) References Cited

U.S. PATENT DOCUMENTS

| | | | |
|---|---|---|---|
| 2012/0215355 A1* | 8/2012 | Bewley | B25J 5/005 700/258 |
| 2012/0219395 A1 | 8/2012 | Inaguma et al. | |
| 2012/0239284 A1 | 9/2012 | Field | |
| 2012/0290162 A1 | 11/2012 | Stevens | |
| 2012/0313335 A1* | 12/2012 | Zanderlehn | B60G 5/02 280/5.28 |
| 2013/0032422 A1 | 2/2013 | Chen | |
| 2013/0032423 A1 | 2/2013 | Chen | |
| 2013/0080015 A1* | 3/2013 | Strothmann | B60L 15/10 701/72 |
| 2013/0081885 A1* | 4/2013 | Connor | B60B 15/06 180/8.2 |
| 2013/0105239 A1 | 5/2013 | Fung | |
| 2013/0146409 A1 | 6/2013 | Boyle | |
| 2013/0188809 A1 | 7/2013 | Jones | |
| 2013/0218380 A1 | 8/2013 | Phillips et al. | |
| 2013/0228385 A1 | 9/2013 | Chen | |
| 2013/0231814 A1* | 9/2013 | Sarokhan | B25J 9/1694 701/22 |
| 2013/0253769 A1* | 9/2013 | Kamo | A61G 5/1086 701/42 |
| 2013/0332064 A1* | 12/2013 | Funk | G01C 21/00 701/409 |
| 2014/0005933 A1* | 1/2014 | Fong | G01C 21/32 701/447 |
| 2014/0018994 A1* | 1/2014 | Panzarella | G01C 21/20 701/25 |
| 2014/0058600 A1 | 2/2014 | Hoffmann | |
| 2014/0083225 A1 | 3/2014 | Downs | |
| 2014/0088761 A1* | 3/2014 | Shamlian | G05D 1/0227 700/253 |
| 2014/0187237 A1 | 7/2014 | Li | |
| 2014/0202777 A1* | 7/2014 | Lee | A61G 5/1075 180/9.32 |
| 2014/0246257 A1* | 9/2014 | Jacobsen | B62D 37/04 180/14.2 |
| 2014/0246258 A1* | 9/2014 | Wyrobek | B25J 5/007 180/21 |
| 2014/0277888 A1 | 9/2014 | Dastoor | |
| 2014/0371979 A1* | 12/2014 | Drew | G07C 5/008 701/32.3 |
| 2015/0006005 A1* | 1/2015 | Yu | G06Q 50/28 701/22 |
| 2015/0060162 A1* | 3/2015 | Goffer | A61G 5/1078 180/41 |
| 2015/0112264 A1 | 4/2015 | Kamen et al. | |
| 2015/0119289 A1 | 4/2015 | Chen | |
| 2015/0123453 A1 | 5/2015 | Benoit, Jr. | |
| 2015/0197247 A1 | 7/2015 | Ichinokawa | |
| 2015/0198440 A1 | 7/2015 | Pearlman | |
| 2015/0231891 A1 | 8/2015 | Yashiro et al. | |
| 2015/0245962 A1 | 9/2015 | Furuta | |
| 2015/0246703 A1 | 9/2015 | Oishi et al. | |
| 2015/0289653 A1 | 10/2015 | Hector et al. | |
| 2016/0014252 A1 | 1/2016 | Biderman et al. | |
| 2016/0031497 A1* | 2/2016 | Luo | B62D 57/024 701/22 |
| 2016/0035161 A1 | 2/2016 | Friedli et al. | |
| 2016/0069691 A1* | 3/2016 | Fong | G05D 1/0274 701/447 |
| 2016/0101685 A1 | 4/2016 | Darpino et al. | |
| 2016/0144505 A1* | 5/2016 | Fong | B25J 9/1697 700/250 |
| 2016/0170411 A1 | 6/2016 | Wei | |
| 2016/0264019 A1 | 9/2016 | Drako | |
| 2016/0291848 A1 | 10/2016 | Hall et al. | |
| 2016/0362147 A1* | 12/2016 | Mailey | B62D 55/075 |
| 2017/0052033 A1* | 2/2017 | Fong | G05B 15/00 |
| 2017/0176188 A1* | 6/2017 | Georgy | H04W 72/042 |
| 2017/0225321 A1* | 8/2017 | Deyle | B25J 9/1679 |
| 2017/0240169 A1 | 8/2017 | Coulter et al. | |
| 2017/0243365 A1* | 8/2017 | Nuijten | G01B 11/00 |
| 2017/0259811 A1* | 9/2017 | Coulter | B60T 7/102 |
| 2017/0300058 A1 | 10/2017 | Peret et al. | |
| 2018/0024553 A1 | 1/2018 | Kong | |
| 2018/0056985 A1* | 3/2018 | Coulter | A61G 5/061 |
| 2018/0102227 A1 | 4/2018 | Poon | |
| 2018/0143801 A1 | 5/2018 | Stucker et al. | |
| 2018/0164829 A1 | 6/2018 | Oshima et al. | |
| 2018/0185212 A1* | 7/2018 | Lucas | A61G 5/061 |
| 2018/0203522 A1 | 7/2018 | Stucki et al. | |
| 2018/0253220 A1 | 9/2018 | Tuhami | |
| 2019/0025853 A1* | 1/2019 | Julian | G06T 7/74 |
| 2019/0046373 A1* | 2/2019 | Coulter | H04L 9/3239 |
| 2019/0224057 A1* | 7/2019 | Jordan | G06K 9/00805 |
| 2019/0231617 A1* | 8/2019 | Cazali | A61G 5/06 |
| 2019/0269567 A1* | 9/2019 | Kao | A61G 5/04 |

FOREIGN PATENT DOCUMENTS

| | | |
|---|---|---|
| CA | 2897221 | 3/2006 |
| CA | -2897542 A1 * | 1/2016 |
| CN | 101056680 | 10/2007 |
| CN | 104071275 | 10/2014 |
| DE | 2048593 | 5/1971 |
| DE | 3103961 | 9/1982 |
| DE | 3128112 | 2/1983 |
| DE | 3242880 | 6/1983 |
| DE | 3411489 | 10/1984 |
| DE | 4110905 | 10/1991 |
| DE | 4404594 | 8/1995 |
| DE | 19625498 | 11/1997 |
| DE | 29808091 | 8/1998 |
| DE | 29808096 | 8/1998 |
| DE | 10209093 | 9/2003 |
| EP | 0109927 | 5/1984 |
| EP | 0193473 | 9/1986 |
| EP | 0537698 | 4/1993 |
| EP | 0551986 | 7/1993 |
| EP | 0663313 | 7/1995 |
| EP | 0746089 | 12/1996 |
| EP | 0958978 | 11/1999 |
| EP | 1063530 | 12/2000 |
| EP | 1759973 | 3/2007 |
| EP | 1791609 | 6/2007 |
| EP | 1805071 | 7/2007 |
| EP | 1791609 | 11/2011 |
| FR | 980237 | 5/1951 |
| FR | 2502090 | 9/1982 |
| GB | 152664 | 1/1922 |
| GB | 1213930 | 11/1970 |
| GB | 2139576 | 11/1984 |
| GB | 2388579 | 11/2003 |
| JP | 52-44933 | 4/1977 |
| JP | 57-87766 | 1/1982 |
| JP | 57-110569 | 7/1982 |
| JP | 59-73372 | 4/1984 |
| JP | 60-255580 | 12/1985 |
| JP | 62-12810 | 1/1987 |
| JP | 63-305082 | 12/1988 |
| JP | H01-316810 | 12/1989 |
| JP | 2-190277 | 7/1990 |
| JP | 4-201793 | 7/1992 |
| JP | 5-213240 | 8/1993 |
| JP | 6-171562 | 12/1994 |
| JP | 61-05415 | 12/1994 |
| JP | 7255780 | 10/1995 |
| JP | 09-010375 | 1/1997 |
| JP | 9-248320 | 9/1997 |
| JP | 10-023613 | 1/1998 |
| JP | 2000-070308 | 7/2000 |
| JP | 2000-288032 | 10/2000 |
| JP | 2005-022631 | 1/2005 |
| JP | 4572594 | 1/2006 |
| JP | 2007-069688 | 3/2007 |
| JP | D1314974 | 11/2007 |
| JP | D1323922 | 3/2008 |
| JP | 4687784 | 7/2010 |
| JP | 2010-240011 | 10/2010 |
| JP | 2010-274759 | 12/2010 |
| JP | 2011-246124 | 12/2011 |

(56) References Cited

FOREIGN PATENT DOCUMENTS

| | | |
|---|---|---|
| JP | 5243795 | 7/2013 |
| JP | 2014-019212 | 2/2014 |
| JP | 2014-174275 | 9/2014 |
| JP | 2014-195403 | 10/2014 |
| JP | 2014-204544 | 10/2014 |
| JP | 2014-218247 | 11/2014 |
| JP | 2015-070897 | 4/2015 |
| JP | 2015-171895 | 10/2015 |
| JP | 2016-084135 | 5/2016 |
| JP | 2018-062344 | 4/2018 |
| TW | D124942 | 6/2006 |
| TW | D124943 | 6/2006 |
| WO | WO 1986/05752 | 10/1986 |
| WO | WO 1989/06117 | 7/1989 |
| WO | WO 1996/23478 | 8/1996 |
| WO | PCT/US97/08916 | 5/1997 |
| WO | PCT/US97/12145 | 7/1997 |
| WO | PCT/US98/21200 | 10/1998 |
| WO | WO 1998/46474 | 10/1998 |
| WO | PCT/US99/06625 | 3/1999 |
| WO | WO 1999/11488 | 3/1999 |
| WO | PCT/US99/29183 | 12/1999 |
| WO | PCT/US00/06629 | 3/2000 |
| WO | PCT/US00/06668 | 3/2000 |
| WO | 0023315 A2 | 4/2000 |
| WO | WO 2000/023315 | 4/2000 |
| WO | PCT/US00/15144 | 6/2000 |
| WO | PCT/US00/40770 | 8/2000 |
| WO | 0054719 A1 | 9/2000 |
| WO | WO 2000/054719 | 9/2000 |
| WO | WO/2000/054721 | 9/2000 |
| WO | PCT/US00/42698 | 12/2000 |
| WO | WO 2000/075001 | 12/2000 |
| WO | 0102920 A1 | 1/2001 |
| WO | WO 2001/002920 | 1/2001 |
| WO | PCT/US01/42657 | 10/2001 |
| WO | WO 2002/030730 | 4/2002 |
| WO | WO 2002/30730 | 4/2002 |
| WO | WO/2002/030730 | 4/2002 |
| WO | WO/2002/072383 | 9/2002 |
| WO | WO 2002/072383 | 9/2002 |
| WO | PCT/US03/18940 | 6/2003 |
| WO | PCT/US03/21625 | 7/2003 |
| WO | PCT/US03/21662 | 7/2003 |
| WO | WO 2003/068342 | 8/2003 |
| WO | WO/2003/103559 | 12/2003 |
| WO | WO/2003/106250 | 12/2003 |
| WO | WO 2003/106250 | 12/2003 |
| WO | WO 2004/007264 | 1/2004 |
| WO | WO/2004/078603 | 9/2004 |
| WO | PCT/US05/32797 | 9/2005 |
| WO | PCT/US05/36797 | 10/2005 |
| WO | PCT/US05/36798 | 10/2005 |
| WO | WO 2006/031917 | 3/2006 |
| WO | WO 2006/042302 | 4/2006 |
| WO | WO 2009/052471 | 4/2009 |
| WO | WO 2001/002920 | 1/2010 |
| WO | WO 2010/084421 | 7/2010 |
| WO | WO/2012/090248 | 7/2012 |
| WO | WO/2013/096789 | 6/2013 |
| WO | WO 2013/096789 | 6/2013 |
| WO | WO 2015/167411 | 11/2015 |
| WO | PCT/US17/19214 | 2/2017 |
| WO | PCT/US17/27410 | 4/2017 |
| WO | PCT/US17/33705 | 5/2017 |
| WO | WO 2017/147347 | 8/2017 |
| WO | WO 2017/156586 | 9/2017 |
| WO | WO 2017/180868 | 10/2017 |
| WO | WO 2017/201513 | 11/2017 |

OTHER PUBLICATIONS

Written Opinion of the International Searching Authority, Int. App. # PCT/US2017/019214, priority date Feb. 23, 2016.

Invitation to pay additional fees and partial search report, Int. App. # PCT/US2017/033705, Intl. filing date May 20, 2017.

Adhikari, B., A Single Subject Participatory Action Design Method for Powered Wheelchairs Providing Automated Back-in Parking Assistance to Cognitively Impaired Older Adults: A pilot study, Department of Computer Science, The University of British Columbia, Vancouver, Canada, Jan. 5, 2015, slide deck.

Adhikari, B., A Single Subject Participatory Action Design Method for Powered Wheelchairs Providing Automated Back-in Parking Assistance to Cognitively Impaired Older Adults: A pilot study, Master's Thesis, Department of Comptuer Science, The University of British Columbia, Vancouver, Canada, Dec. 2014.

Brown, Jr. et al., "A Single-Wheel, Gyroscopically Stabilized Robot," IEEE Robotics & Automation Magazine, Sep. 1997.

Dejun Yin and Yoichi Hori, "A Novel Traction Control for Electric Vehicle without Chassis Velocity, Motion Control", Federico Casolo (Ed.), InTech, DOI: 10.5772/6962. Available from: https://mts.intechopen.com/books/motion-control/a-novel-traction-control-for-electric-vehicle-without-chassis-velocity, 2010.

Elnagar, A., "Prediction of Moving Objects in Dynamic Environments Using Kalman Filters," Proceedings of 2001 IEEE International Symposium on Computational Intelligence in Robotics and Automation, Jul. 29-Aug. 1, 2001.

Fresk, et al., "Full Quaternion Based Attitude Control for a Quadrator", 2013 European Control Conference (EDD), Jul. 17-19, 2013, Zurich, Switzerland, pp. 3864-3869.

Grasser, F. et al., "Joe: A Mobile, Inverted Pendulum," IEEE Transactions on Industrial Electronics, vol. 49, No. 1, Feb. 2002.

Ha, et al. "Trajectory Tracking Control for Navigation of Self-Contained Mobile Inverse Pendulum" Intelligent Robots and Systems '94. 'Advanced Robotic Systems and the Real World', IROS '94. Proceedings of the IEEE/RSJ/GI International Conference on, vol. 3, no., pp. 1875-1882, Sep. 12-16, 1994.

Ha, et al., "Trajectory Tracking Control for Navigation of the Inverse Pendulum Type Self-Contained Mobile Robot" Robotics and Autonomous Systems 17, 65-80 (1996).

Helgesson, L., "Pitch and roll estimating Kalman filter for stabilizing quadrocopters", http://lhe1ge.se/2012/04/pitch-and-roll-estimating-kalman-filter-for-stabilizing-quadrocopters/, Oct. 15, 2012.

How et al., "Clinical Evaluation of the Intelligent Wheelchair System", Proceedings of Festival of international Conference on Caregiving, Disability, Aging and Technology, Toronto, Canada, 2011.

I-Real, Personal Mobility Device, https://www.youtube.com/watch?v=WAGpx1UpdWw, Published on Jan. 15, 2013, appeared first in Apr. 2012, D1 Grand Prix event, Odaiba, JP.

Ishida and Miyamoto, "Collision-Detecting Device for Omnidirectional Electric Wheelchair", Research Article, ISRN Robotics, vol. 2013, Article ID 672826, Nov. 1, 2012.

I-swing, Single Person Vehicle, https://www.youtube.com/watch?feature=player_embedded&y=1QSybf7sLtg, Published on Sep. 14, 2016, Featured on Hacked Gadgets, http://hackedgadgets.com.

I-Unit, Wheelchair, https://www.youtube.com/watch?v=Rbrrlrh3GBE, Published on Jun. 6, 2006, Filmed at Megaweb Center at Tokyo.

Johnson, R.C., "Unicycles and Bifurcations", American J. of Physics, vol. 66, No. 7, 589-92 (Oct. 22, 2002).

Kanoh, "Applied Control of Inverted Pendulum", Computrol, vol. 2, (1983), pp. 69-75.

Kawaji, S., "Stabilization of Unicycle Using Spinning Motion", Denki Gakkai Ronbushi, D, vol. 107, Issue 1, Japan (1987), pp. 21-28.

Koyanagi et al., "A Wheeled Inverse Pendulum Type Self-Contained Mobile Robot", The Society of Instrument and Control Engineers, Special issue of the 31st SICE Annual Conference, Japan 1992, pp. 51-56.

Koyanagi et al., "A Wheeled Inverse Pendulum Type Self-Contained Mobile Robot and its Two Dimensional Trajectory Control", Proceeding of the Second International Symposium on Measurement and Control in Robotics, Japan 1992, pp. 891-897.

Koyanagi et al., "A Wheeled Inverse Pendulum Type Self-Contained Mobile Robot and its Posture Control and Vehicle

(56) References Cited

OTHER PUBLICATIONS

Control", The Society of Instrument and Control Engineers, Special issue of the 31st SICE Annual Conference, Japan, 1992, pp. 13-16.
Lam, H. K. et al., "Fuzzy Model Reference Control of Wheeled Mobile Robots," The 27th Annual Conference of the IEEE Industrial Electronics Society (2001).
Liu, H.S. et al., "Accelerometer for Mobile Robot Positioning," IEEE Transactions on Industry Applications, vol. No. 3, Oct. 1999.
Momoi & Yamafuji, "Motion Control of the Parallel Bicycle-Type Mobile Robot Composed of a Triple Inverted Pendulum", Paper Read at Meeting of Japan Society of Mechanical Engineering (Series C), vol. 57, No. 541, (Sep. 1991), pp. 154-159.
Montella, C., et al., "To the Bookstore! Autonomous Wheelchair Navigation in an Urban Environment", Lehigh University, published in FSR, 2012, Part of the Springer Tracts in Advanced Robotics book series (STAR, vol. 92), first online Dec. 31, 2013.
News article, "Amazing Wheelchair Goes Up and Down Stairs".
Oishi et al., "Building a Smart Wheelchair on a Flexible Software Platform", RESNA International Conference on Technology and Aging, 2011.
Osaka et al., "Stabilization of unicycle", Systems and Control, vol. 25, No. 3, Japan Mar. 1981, pp. 159-166.
Roy et al., "Five-Wheel Unicycle System", Medical & Biological Engineering & Computing, vol. 23, No. 6, United Kingdom Nov. 1985, pp. 593-596. Entire document can be purchased via: https://link.springer.com/article/10.1007%2FBF02455316.
Sabatini, A, "Quaternion-based Extended Kalman Filter for Determining Orientation by Inertial and Magnetic Sensing", IEEE Transactions on Biomedical Engineering, vol. 53:7, Jul. 2006, pp. 1346-1356.
Schoonwinkel, A., "Design and Test of a Computer-Stabilized Unicycle", Stanford University (1988), UMI Dissertation Services, Dissertation Abstracts International, vol. 49/03-B, Stanford University 1987, pp. 890-1294.
Sheng et al., "Postural Stability of a Human Riding a Unicycle and Its Emulation by a Robot," IEEE Transactions on Robotics and Automation, vol. 13:5, Oct. 1997.
Sheng, Zaiquan; Yamafuji, Kazuo: "Realization of a Human Riding a Unicycle by a Robot". Proceedings of the 1995 IEEE International Conference on Robotics and Automation, vol. 2, 1995, pp. 1319-1326.
Stew's Hovercraft Page, http://www.stewcam.com/hover-craft.html.
Takahashi et al., "Back and Forward Moving Scheme of Front Wheel Raising for Inverse Pendulum Control Wheel Chair Robot", Proceedings of the 2001 IEEE International Conference of Robotics & Automation, Seoul, Korea, May 21-26, 2001, pp. 3189-3194.
Takahashi et al., "Front Wheel Raising and Inverse Pendulum Control of Power Assist Wheel Chair Robot", IEEE, 1999, pp. 668-673.
Tanaka et al., "A Mobile Robot for Service Use: Behaviour Simulation System and Intelligent Control," Proceedings of the 1997 IEEE/RSJ International Conference on Intelligent Robots and Systems, 1997.
Tecknico's Home Page, "Those Amazing Flying Machines", http://www.swiftsite.com/technico, May 24, 1999.
Ulyanov et al., "Fuzzy Intelligent Emotion and Instinct Control of a Robotic Unicycle," Proceedings of the 1996 4th International Workshop on Advanced Motion Control, Mar. 18-21, 1996.
Ulyanov et al., "Soft computing for the intelligent robust control of a robotic unicycle with a new physical measure for mechanical controllability". Soft Computing vol. 2:2, Jun. 1998, pp. 73-88.
Viswanathan et al., "Navigation Assistance for Intelligent Wheelchairs", 3rd International Conference on Technology and Aging/ RESNA, Toronto, 2011.
Vos et al., "Dynamics and Nonlinear Adaptive Control of an Autonomous Unicycle—Theory and Experiment", American Institute of Aeronautics and Astronautics, A90-26772 10-39, Washington, D.C. 1990, Abstract only.
Vos, D., Dynamics and Nonlinear Adaptive Control of an Autonomous Unicycle, Massachusetts Institute of Technology, Jun. 7, 1989.
Vos, D., "Nonlinear Control of an Autonomous Unicycle Robot: Practical Issues", Massachusetts Institute of Technology, Jun. 5, 1992.
Wang et al., "Real-time Model-based Electrical Powered Wheelchair Control", Med Eng Phys. Dec. 2009: 31(10): 1244-1254.
Watson Industries, Inc., "Single Axis Vertical Reference System Owner's Manual ADS-C132-1A", Apr. 20, 2015, pp. 3-4.
Welch et al., "An Introduction to the Kalman Filter," SIGGRAPH 2001, Department of Computer Science University of North Carolina at Chapel Hill, http://www.cs.unc.edu/~{welch,gb}, 2001.
WO 2000/073101, IPER of the International Search Authority, filing date Mar. 14, 2000.
WO 2000/075001, IPER of the International Search Authority, filing date Jun. 1, 2000.
WO2002/030730, IPER of the International Search Authority, filing date Oct. 11, 2001.
WO2004/007264, Initial Publication with ISR, International Publication dated Jan. 22, 2004.
WO 2017/147347 Written Opinion of the International Search Authority, Int. App. #PCT/US2017/019214, dated Feb. 23, 2016.
WO 2017/201513, Invitation to pay additional fees and partial search report, Int. App. #PCT/US2017/033705, Intl. filing date May 20, 2017.
WO 2017/201513, Written Opinion of the International Searching Authority, Int. App. #PCT/US2017/033705, Intl. filing date May 20, 2017.
Yamafuji & Kawamura, "Study on the Postural and Driving Control of Coaxial Bicycle", Paper Read at Meeting of Japan Society of Mechanical Engineering (Series C), vol. 54, No. 501, (May 1988), pp. 1114-1121, Abstract in English.
Yamafuji & Kawamura, "Study of Postural and Driving Control of Coaxial Bicycle", Papers Read at Meeting of Japan Society of Mechanical Engineering (vol. C), vol. 54, No. 501 (May 1988), Paper No. 87-0901A.
Yamafuji et al., "Synchronization and Steering Control of Parallel Bicycle", Paper Read at Meeting of Japan Society of Mechanical Engineering (Series C), vol. 55, No. 513, (May 1989), pp. 1229-1234.
Yamafuji, "A Proposal for Modular-Structured Mobile Robots for Work that Principally Involve a Vehicle with Two Parallel Wheels", Automation Technology, vol. 20, pp. 113-118 (1988).
Yun et al., "Implementation and Experimental Results of a Quarternion-Based Kalman Filter for Human Body Motion Tracking", Proceedings of the 2005 IEEE International Conference on Robotics and Automation, Barcelona, Spain, Apr. 2005, pp. 317-322.
Yun et al., "Design, Implementation and Experimental Results of a Quarternion-Based Kalman Filter for Human Body Motion Tracking", IEEE Transactions on Robotics, vol. 22, No. 6, Dec. 2006, pp. 1216-1227.
Zenkov, DV, AM Bloch, and JE Marsden [2001] "The Lyapunov-Malkin Theorem and Stabilization of the Unicycle with Rider". Systems and Control Letters, vol. 45, No. 4, Apr. 5, 2002, pp. 293-302(10).
Zenkov, DV, AM Bloch, NE Leonard and JE Marsden, "Matching and Stabilization of Low-Dimensional Nonholonomic Systems". Proc. CDC, 39, (2000), 1289-1295.
U.S. Appl. No. 08/021,789, filed Feb. 24, 1993.
U.S. Appl. No. 08/250,693, filed May 27, 1994.
U.S. Appl. No. 08/384,705, filed Feb. 3, 1995.
U.S. Appl. No. 08/479,901, filed Jun. 7, 1995.
U.S. Appl. No. 08/484,182, filed Jun. 7, 1995.
U.S. Appl. No. 08/474,313, filed Jun. 7, 1995.
U.S. Appl. No. 08/880,574, filed Jun. 23, 1997.
U.S. Appl. No. 09/325,463, filed Jun. 3, 1999.
U.S. Appl. No. 09/386,686, filed Aug. 31, 1999.
U.S. Appl. No. 60/102,154, filed Sep. 28, 1998.
U.S. Appl. No. 09/168,551, filed Oct. 8, 1998.
U.S. Appl. No. 09/456,347, filed Dec. 8, 1999.
U.S. Appl. No. 09/276,326, filed Mar. 25, 1999.
U.S. Appl. No. 09/325,976, filed Jun. 4, 1999.

(56) References Cited

OTHER PUBLICATIONS

U.S. Appl. No. 09/325,978, filed Jun. 4, 1999.
U.S. Appl. No. 09/458,148, filed Dec. 9, 1999.
U.S. Appl. No. 09/428,007, filed Oct. 27, 1999.
U.S. Appl. No. 09/687,757, filed Oct. 13, 2000.
U.S. Appl. No. 09/524,931, filed Mar. 14, 2000.
U.S. Appl. No. 09/635,936, filed Aug. 10, 2000.
U.S. Appl. No. 09/687,789, filed Oct. 13, 2000.
U.S. Appl. No. 09/687,557, filed Oct. 13, 2000.
U.S. Appl. No. 09/757,230, filed Jan. 9, 2001.
U.S. Appl. No. 09/784,529, filed Feb. 15, 2001.
U.S. Appl. No. 09/813,713, filed Mar. 21, 2001.
U.S. Appl. No. 09/862,839, filed May 22, 2001.
U.S. Appl. No. 10/044,590, filed Jan. 11, 2002.
U.S. Appl. No. 10/051,333, filed Jan. 18, 2002.
U.S. Appl. No. 10/307,892, filed Dec. 2, 2002.
U.S. Appl. No. 10/308,888, filed Dec. 3, 2002.
U.S. Appl. No. 10/939,955, filed Sep. 13, 2004.
U.S. Appl. No. 10/806,755, filed Mar. 23, 2004.
U.S. Appl. No. 10/166,553, filed Jun. 10, 2002.
U.S. Appl. No. 10/234,025, filed Sep. 3, 2002.
U.S. Appl. No. 10/272,480, filed Oct. 16, 2002.
U.S. Appl. No. 10/618,082, filed Jul. 11, 2003.
U.S. Appl. No. 10/460,970, filed Jun. 13, 2003.
U.S. Appl. No. 10/460,053, filed Jun. 12, 2003.
U.S. Appl. No. 10/462,225, filed Jun. 13, 2003.
U.S. Appl. No. 10/462,379, filed Jun. 16, 2003.
U.S. Appl. No. 10/374,689, filed Feb. 26, 2003.
U.S. Appl. No. 10/436,889, filed May 13, 2003.
U.S. Appl. No. 10/394,860, filed Mar. 21, 2003.
U.S. Appl. No. 10/617,608, filed Jul. 11, 2003.
U.S. Appl. No. 10/669,879, filed Sep. 23, 2003.
U.S. Appl. No. 09/321,401, filed May 28, 1999.
U.S. Appl. No. 09/322,431, filed May 28, 1999.
U.S. Appl. No. 09/930,127, filed Aug. 15, 2001.
U.S. Appl. No. 10/419,994, filed Apr. 21, 2003.
U.S. Appl. No. 10/818,386, filed Apr. 5, 2004.
U.S. Appl. No. 10/947,122, filed Sep. 22, 2004.
U.S. Appl. No. 10/990,715, filed Nov. 17, 2004.
U.S. Appl. No. 11/144,309, filed Jun. 3, 2005.
U.S. Appl. No. 11/249,170, filed Oct. 11, 2005.
U.S. Appl. No. 11/273,581, filed Nov. 14, 2005.
U.S. Appl. No. 11/296,878, filed Dec. 8, 2005.
U.S. Appl. No. 11/471,241, filed Jun. 20, 2006.
U.S. Appl. No. 11/591,284, filed Oct. 31, 2006.
U.S. Appl. No. 11/593,415, filed Nov. 6, 2006.
U.S. Appl. No. 11/852,767, filed Sep. 10, 2007.
U.S. Appl. No. 11/863,640, filed Sep. 28, 2007.
U.S. Appl. No. 11/928,757, filed Oct. 30, 2007.
U.S. Appl. No. 11/926,606, filed Oct. 29, 2007.
U.S. Appl. No. 11/926,737, filed Oct. 29, 2007.
U.S. Appl. No. 12/772,791, filed May 3, 2010.
U.S. Appl. No. 12/266,013, filed Nov. 6, 2008.
U.S. Appl. No. 12/491,532, filed Jun. 25, 2009.
U.S. Appl. No. 12/563,853, filed Sep. 21, 2009.
U.S. Appl. No. 12/702,832, filed Feb. 9, 2010.
U.S. Appl. No. 12/708,058, filed Feb. 18, 2010.
U.S. Appl. No. 12/879,650, filed Sep. 10, 2010.
U.S. Appl. No. 13/332,896, filed Dec. 21, 2011.
U.S. Appl. No. 13/585,041, filed Aug. 14, 2012.
U.S. Appl. No. 13/692,591, filed Dec. 3, 2012.
U.S. Appl. No. 14/236,381, filed Jan. 31, 2014.
U.S. Appl. No. 13/857,737, filed Apr. 5, 2013.
U.S. Appl. No. 14/446,969, filed Jul. 30, 2014.
U.S. Appl. No. 08/863,674, filed May 27, 1997.
U.S. Appl. No. 14/589,116, filed Jan. 5, 2015.
U.S. Appl. No. 14/618,374, filed Feb. 10, 2015.
U.S. Appl. No. 14/618,464, filed Feb. 10, 2015.
U.S. Appl. No. 14/619,763, filed Feb. 11, 2015.
U.S. Appl. No. 14/619,806, filed Feb. 11, 2015.
U.S. Appl. No. 14/620,284, filed Feb. 12, 2015.
U.S. Appl. No. 14/626,606, filed Feb. 19, 2015.
U.S. Appl. No. 14/626,646, filed Feb. 19, 2015.
U.S. Appl. No. 14/621,587, filed Feb. 13, 2015.
U.S. Appl. No. 14/621,671, filed Feb. 13, 2015.
U.S. Appl. No. 14/942,209, filed Nov. 16, 2015.
U.S. Appl. No. 62/298,721, filed Feb. 23, 2016.
U.S. Appl. No. 62/322,622, filed Apr. 14, 2016.
U.S. Appl. No. 15/150,723, filed May 10, 2016.
U.S. Appl. No. 62/339,723, filed May 10, 2016.
U.S. Appl. No. 62/403,030, filed Sep. 30, 2016.
U.S. Appl. No. 15/262,535, filed Sep. 12, 2016.
U.S. Appl. No. 29/579,669, filed Sep. 30, 2016.
U.S. Appl. No. 29/579,671, filed Sep. 30, 2016.
U.S. Appl. No. 60/819,165, filed Jul. 7, 2006.
U.S. Appl. No. 12/776,618, filed May 10, 2010.
U.S. Appl. No. 11/249,136, filed Oct. 11, 2005.
U.S. Appl. No. 12/337,249, filed Dec. 17, 2008.
U.S. Appl. No. 15/385,077, filed Dec. 20, 2016.
U.S. Appl. No. 29/604,818, filed May 20, 2017.
U.S. Appl. No. 15/487,980, filed Apr. 4, 2017.
U.S. Appl. No. 29/604,819, filed May 20, 2017.
U.S. Appl. No. 29/610,809, filed Jul. 15, 2017.
PCT/US2017/027410, Written Opinion of the International Search Authority, dated Dec. 4, 2017.
PCT/US2017/033705, Written Opinion of the International Search Authority, dated Nov. 23, 2017.
Cho et al, Sloped Terrain Segmentation for Autonomous Drive Using Sparse 3D Point Cloud, The Scientific World Journal, 2014, https://www.hindawi.com/journals/tswj/2014/582753/.
Derry et al., Automated Doorway Detection for Assistive Shared-Control Wheelchairs, 2013 IEEE International Conference on Robotics and Automation, May 6-19, 2013, https://cpb-us-e1.wpmucdn.com/sites.northwestern.edu/dist/5/1812/files/2016/05/13iera_derry.pdf.
Meeussen et al., Autonomous Door Opening and Plugging in with a Personal Robot, Willow Garage, USA, IEEE International Conference on Robotics and Automation, May 3-7, 2010, http://www.willowgarage.com/sites/default/files/m2.pdf.
Wolstenholme, Kevin. "Updating Glide—The Full Breawkdown." RisingHigh Academy, published Aug. 26, 2017 (Retrieved from the Internet Sep. 26, 2019). Internet URL: https://risinghighacademy.com/category/games/(Year:2017).
Bob_Schor. "Re: Cannot get latch mechanical action on Boolean button . . . " NI Community, published Jun. 2, 2018 (Retrieved from the Internet Sep. 26, 2019). Internet URL: https://forums.ni.com/t5/LabVIEW/Cannot-get-latch-mechanical-action-on-boolean-button-inside-a/td-p/3799821?profile.language=en (Year: 2018).
Umpad, Leomar. "How Do I Use My Samsung Galaxy Device as a TV Remote Control?" Tech Recipes,published Nov. 27, 2014 (Retrieved from the Internet Sep. 27, 2019). Internet URL: <https://www.Tech-recipes.com/rx/51556/how-do-i-use-my-samsung-galaxy-device-as-a-tv-remote-control/> (Year: 2014).
"BTCR9 Fansyn Bluetooth . . . " Fanimation, published Feb. 4, 2017 (Retrieved from the Internet Sep. 27, 2019). Internet URL: https://web.archive.org/web/20170204193258/https://www.fanimation.com/products/index.php/controls-remotes/fansync-bluetooth-receiver-transmitter-downlight.html(Year : 2017).
PCT/US2017/019214, Written Opinion of the International Search Authority, dated Aug. 31, 2017.
U.S. Appl. No. 29/579,660, filed Sep. 30, 2016.
U.S. Appl. No. 29/579,662, filed Sep. 30, 2016.
U.S. Appl. No. 29/579,664, filed Sep. 30, 2016.
U.S. Appl. No. 29/579,667, filed Sep. 30, 2016.
U.S. Appl. No. 15/600,703, filed May 20, 2017.
U.S. Appl. No. 29/604,817, filed May 20, 2017.
U.S. Appl. No. 15/441,190, filed Feb. 23, 2017.
U.S. Appl. No. 15/787,613, filed Oct. 18, 2017.
U.S. Appl. No. 16/035,205, filed Jul. 13, 2018.
U.S. Appl. No. 29/661,806, filed Aug. 30, 2018.

(56) References Cited

OTHER PUBLICATIONS

U.S. Appl. No. 29/661,813, filed Aug. 30, 2018.
U.S. Appl. No. 16/200,088, filed Nov. 26, 2018.
U.S. Appl. No. 29/688,319, filed Apr. 19, 2019.

* cited by examiner

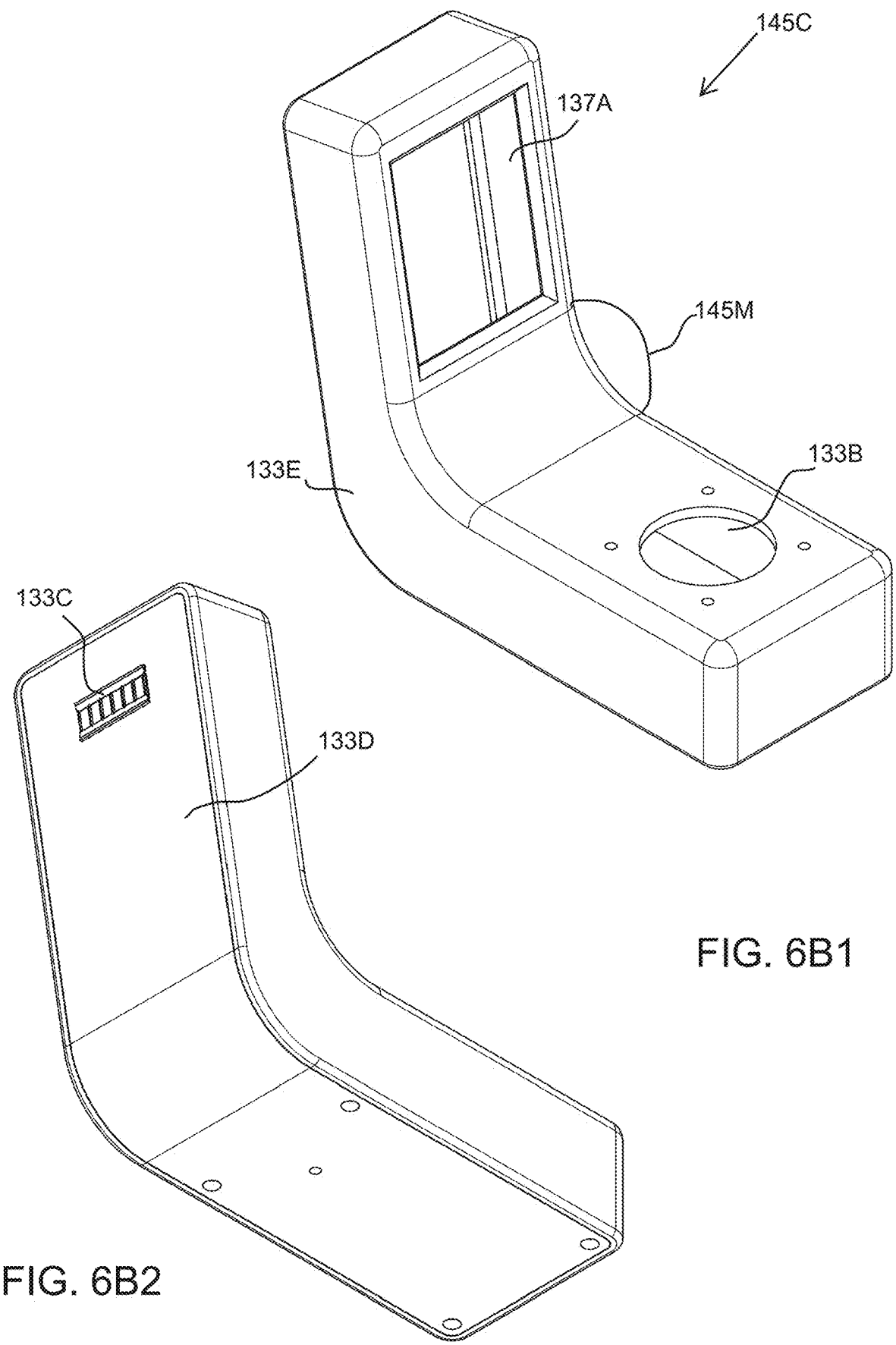
FIG. 6B1
FIG. 6B2

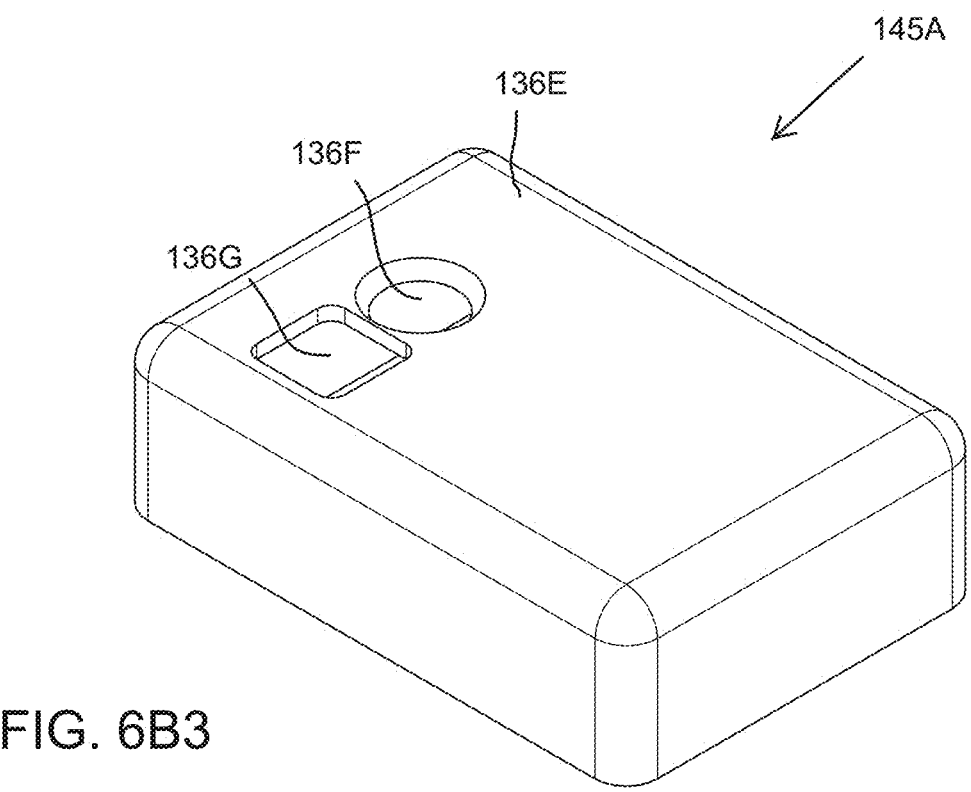
FIG. 6B3
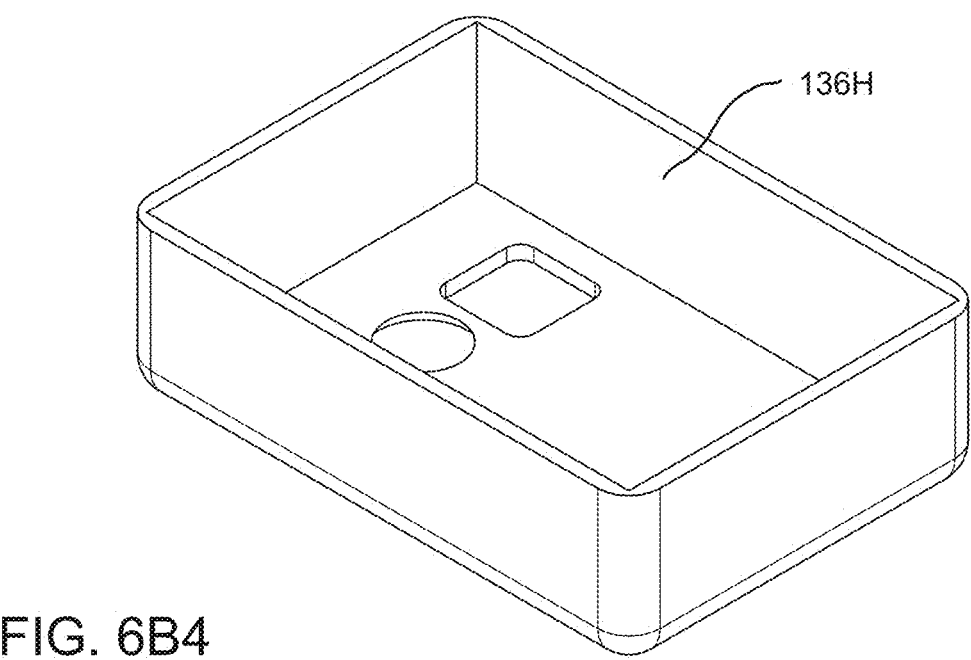
FIG. 6B4

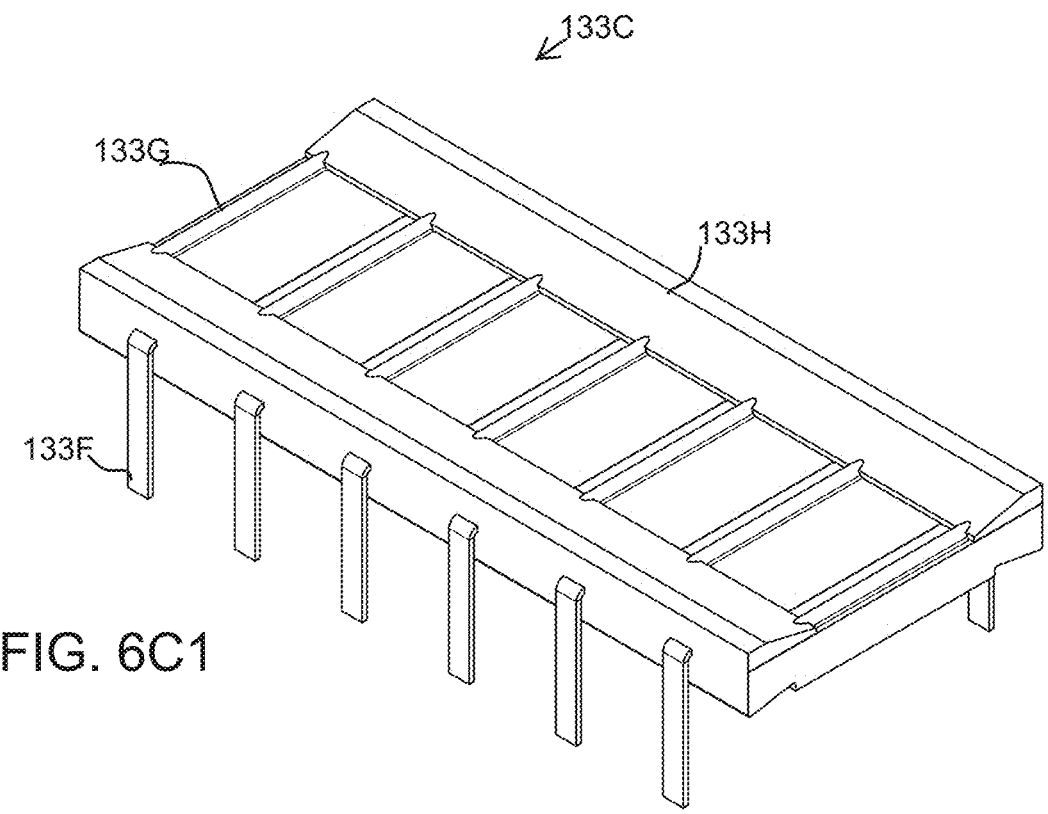
FIG. 6C1
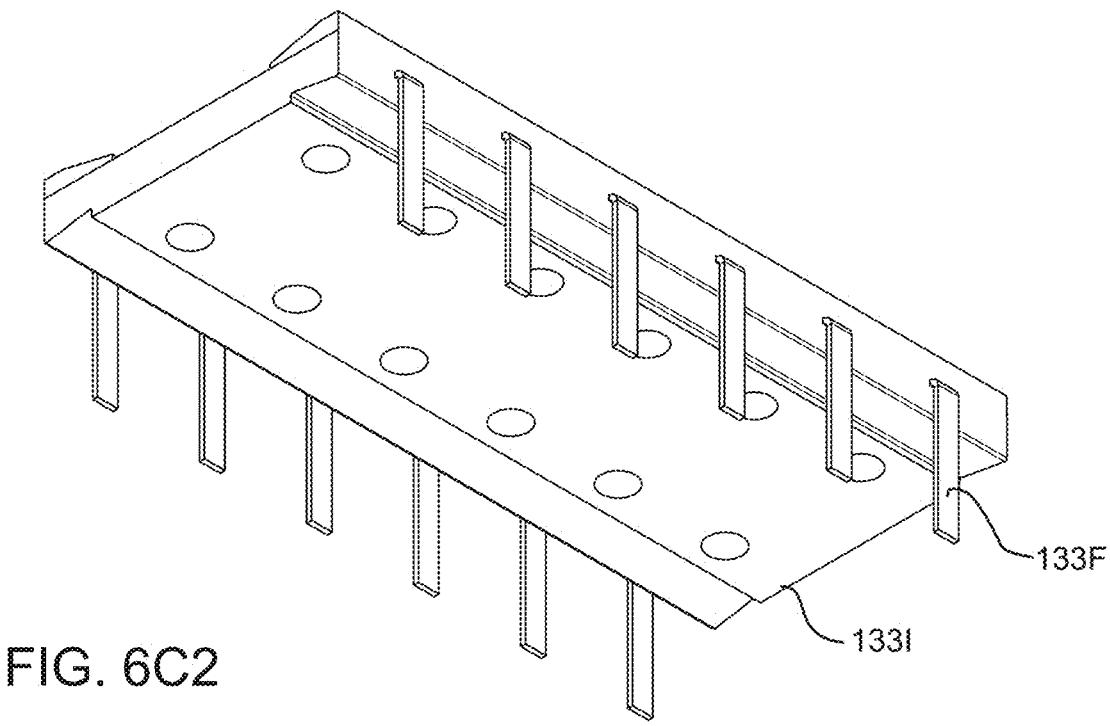
FIG. 6C2

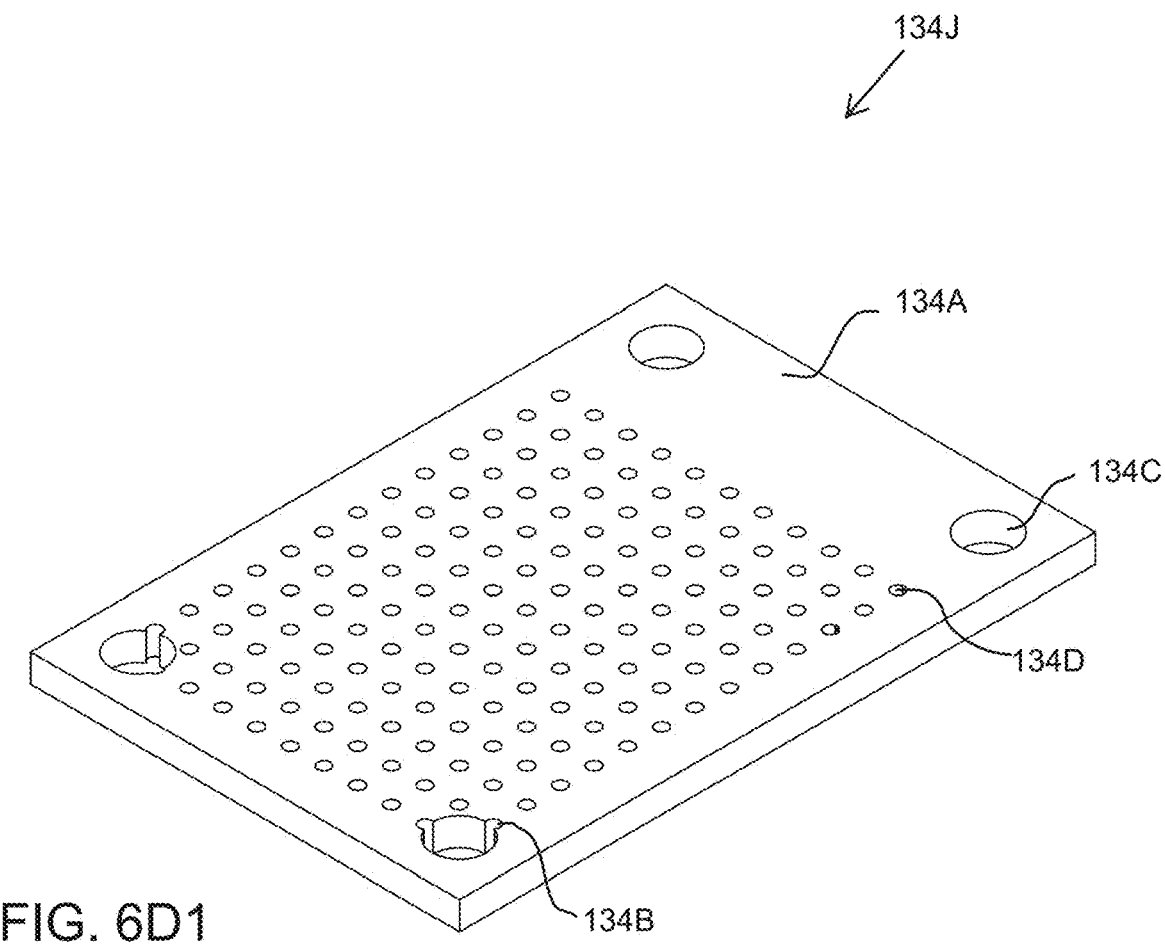
FIG. 6D1
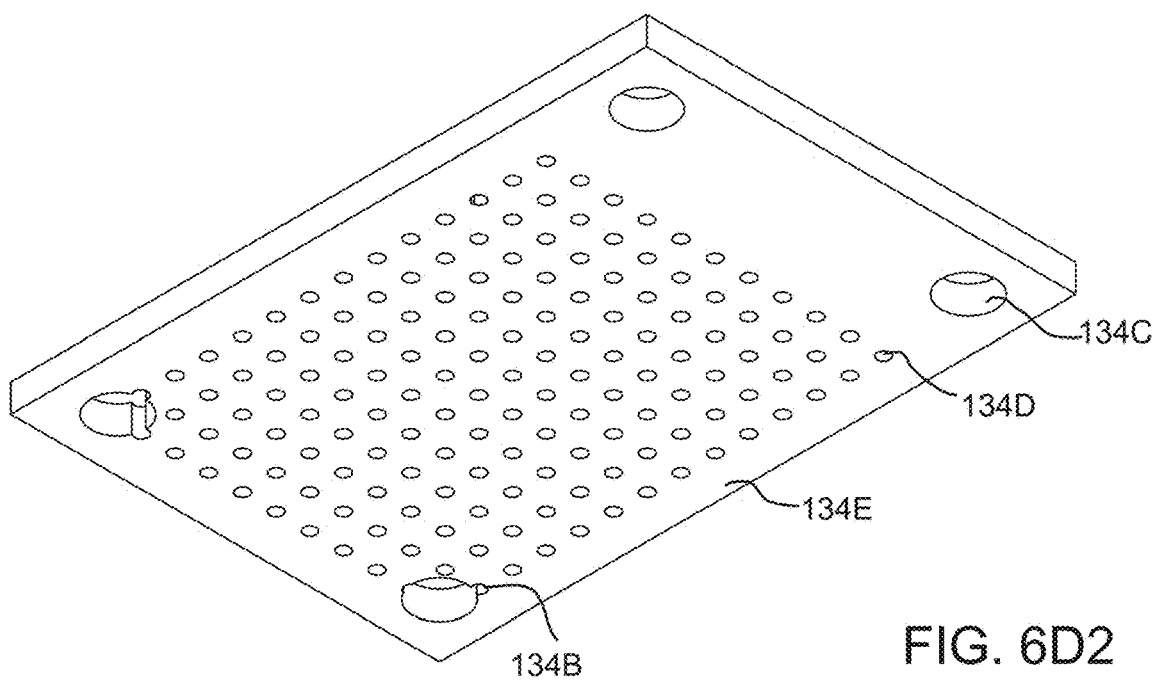
FIG. 6D2

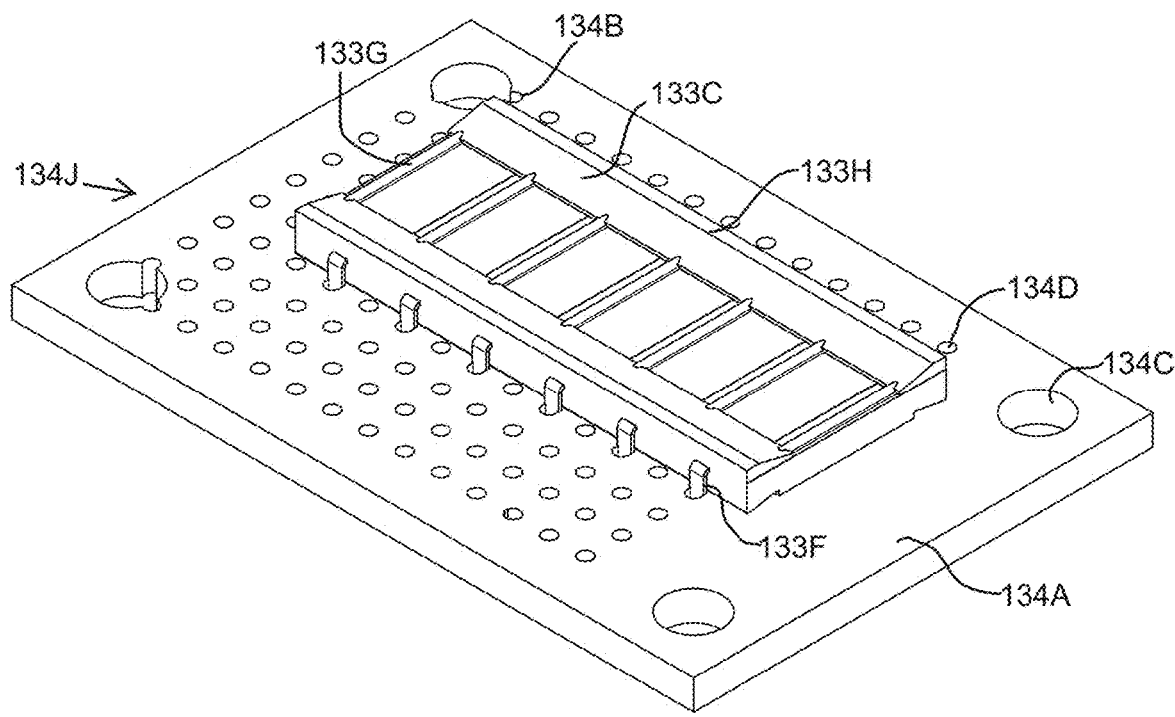
FIG. 6D3
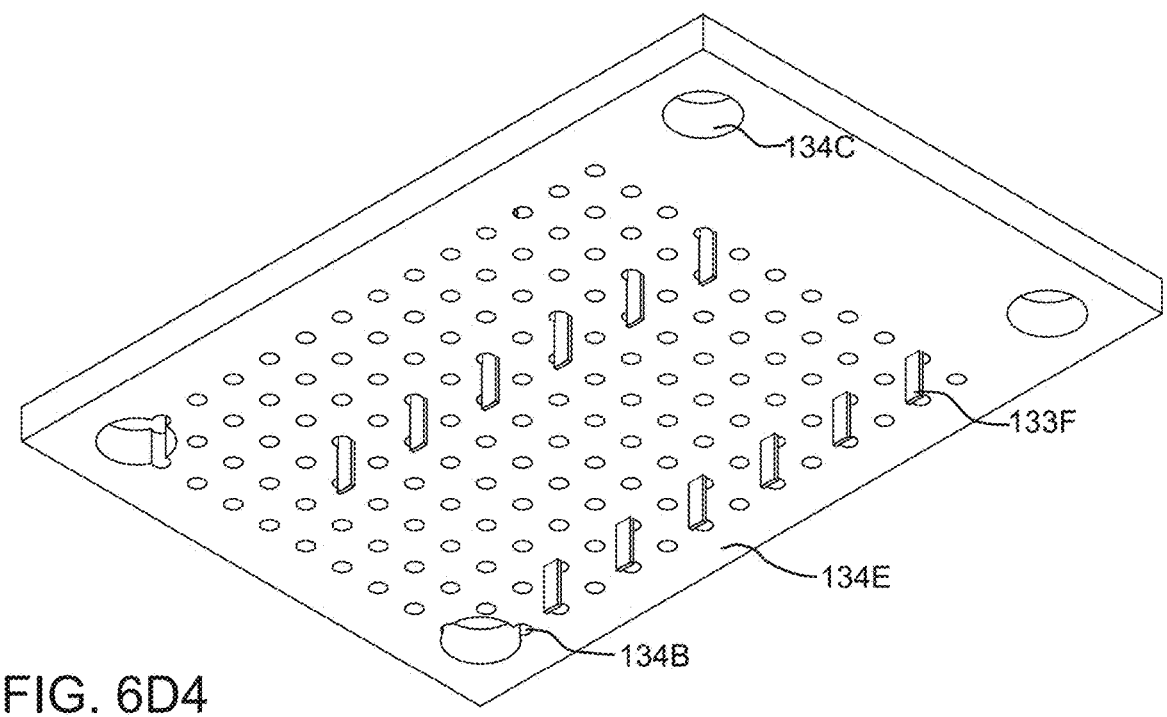
FIG. 6D4

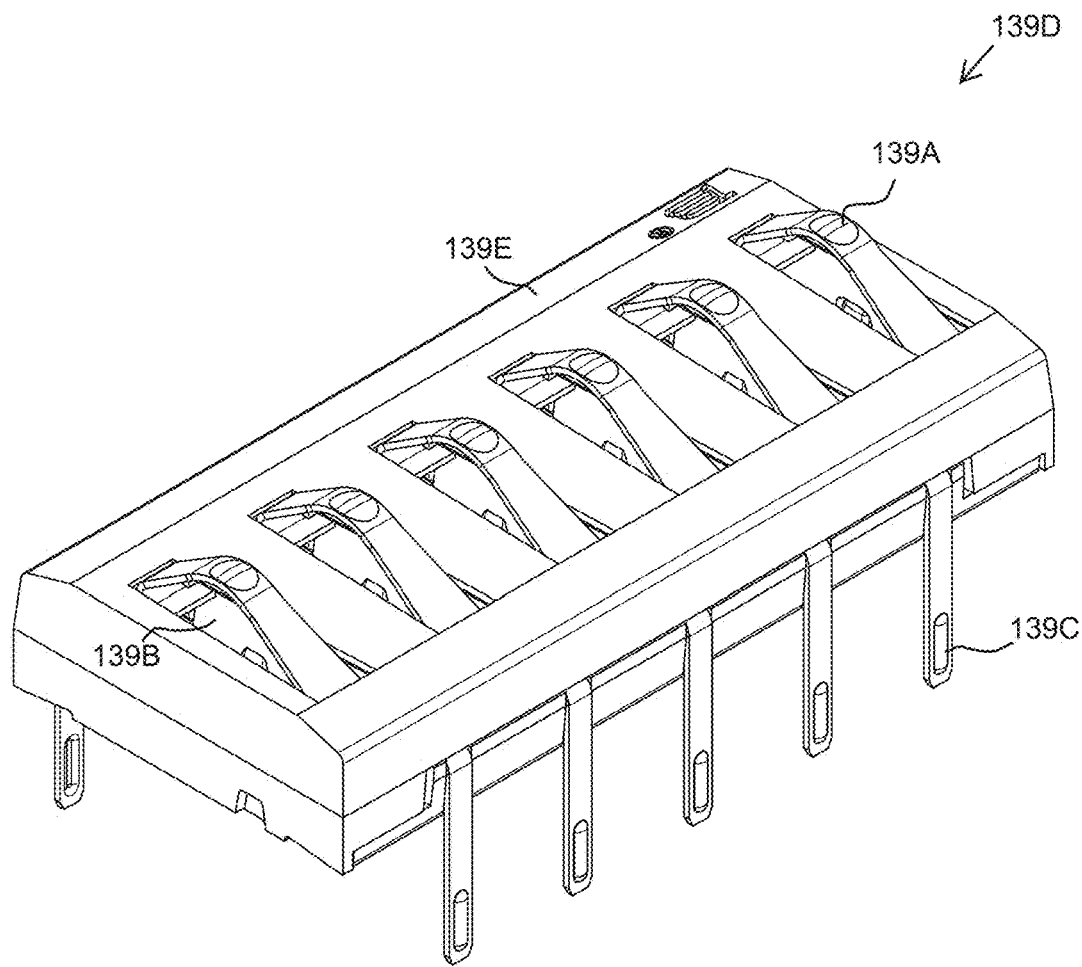
FIG. 6D5
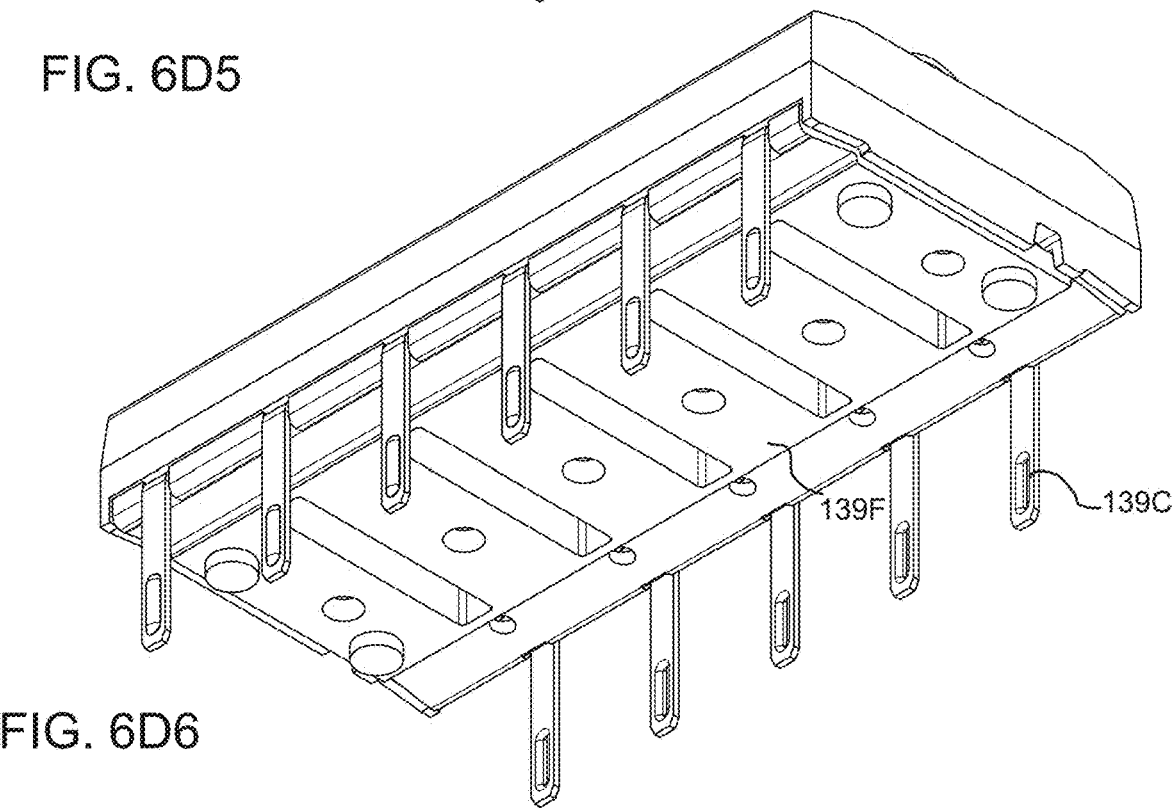
FIG. 6D6

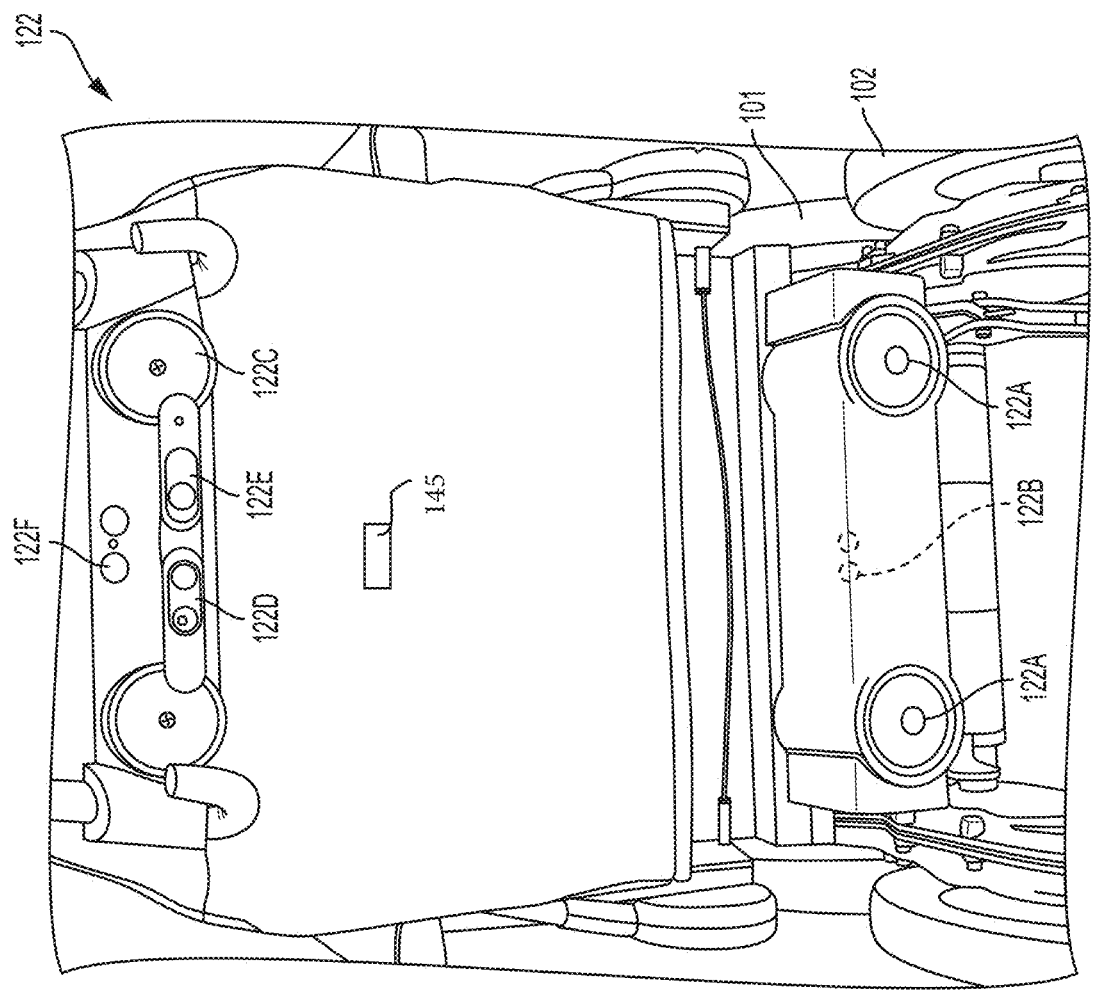

| PACKET | TRANSMITTING DEVICE |
|---|---|
| MASTER SYNC PACKET | BUS MASTER |
| USER CONTROL PACKETS | UC |
| POWER SOURCE CONTROLLER PACKETS | PSC A, PSC B |
| POWER BASE PROCESSOR PACKETS | PBP A1, PBP A2, PBP B1, PBP B2 |

FIG. 7A

| Byte # | Data | Destination |
|---|---|---|
| 0 | Status | All |
| 1 | Error Device ID | Power base processors (PBP) |
| 2 | Mode Requested | PBP |
| 3 | Control Out Byte | PBP |
| 4 | Commanded Velocity | PBP |
| 5 | Commanded Turn Rate | PBP |
| 6 | Seat Control Byte | PBP |
| 7 | System data | All |

FIG. 7B

| Data | Bit | Meaning |
|---|---|---|
| Request Type | 7 | 0 = Normal Request<br>Mode being requested should be processed by the PBP as a maintenance of current mode or a normal mode change request.<br>1 = Special Request<br>This bit indicates a special mode request that requires situation-dependant consideration. |
| Requested Mode | 6:0 | mode byte codes set in association with possible modes |

FIG. 7C

| Data | Bit | Meaning |
|---|---|---|
| OK to Power Down | 7 | 0 = Not OK |
| Drive Selection | 6 | 0 = Drive 1<br>1 = Drive 2 |
| Emergency Power Off Request | 5 | 0 = Normal<br>1 = EPO request sequence is in process (clears when aborted/completed) |
| Calibration State | 4 | 1 = Request for User Calibration state<br>Note: Transition is only valid in Utility mode. |
| Mode Restriction | 3 | 0 = No restriction<br>1 = Balance critical functions should be restricted |
| User Training | 2 | 0 = Disabled<br>1 = Enabled |
| Joystick centered | 1:0 | 00 = Invalid<br>10 = Centered<br>01 = Not Centered<br>11 = Invalid |

801A — OK to Power Down
801B — Drive Selection
801C — Emergency Power Off Request
801D — Calibration State
801E — Mode Restriction
801F — User Training
801G — Joystick centered

FIG. 7D

| Data | Bit | Meaning |
|---|---|---|
| Frame Lean Command | 7:6 | 00 = Invalid<br>10 = Lean Forward<br>01 = Lean Rearward<br>11 = Idle |
| Reserved | 5:2 | - |
| Seat Height Command | 1:0 | 00 = Invalid<br>10 = Lower Seat Down<br>01 = Raise Seat Up<br>11 = Idle |

FIG. 7E

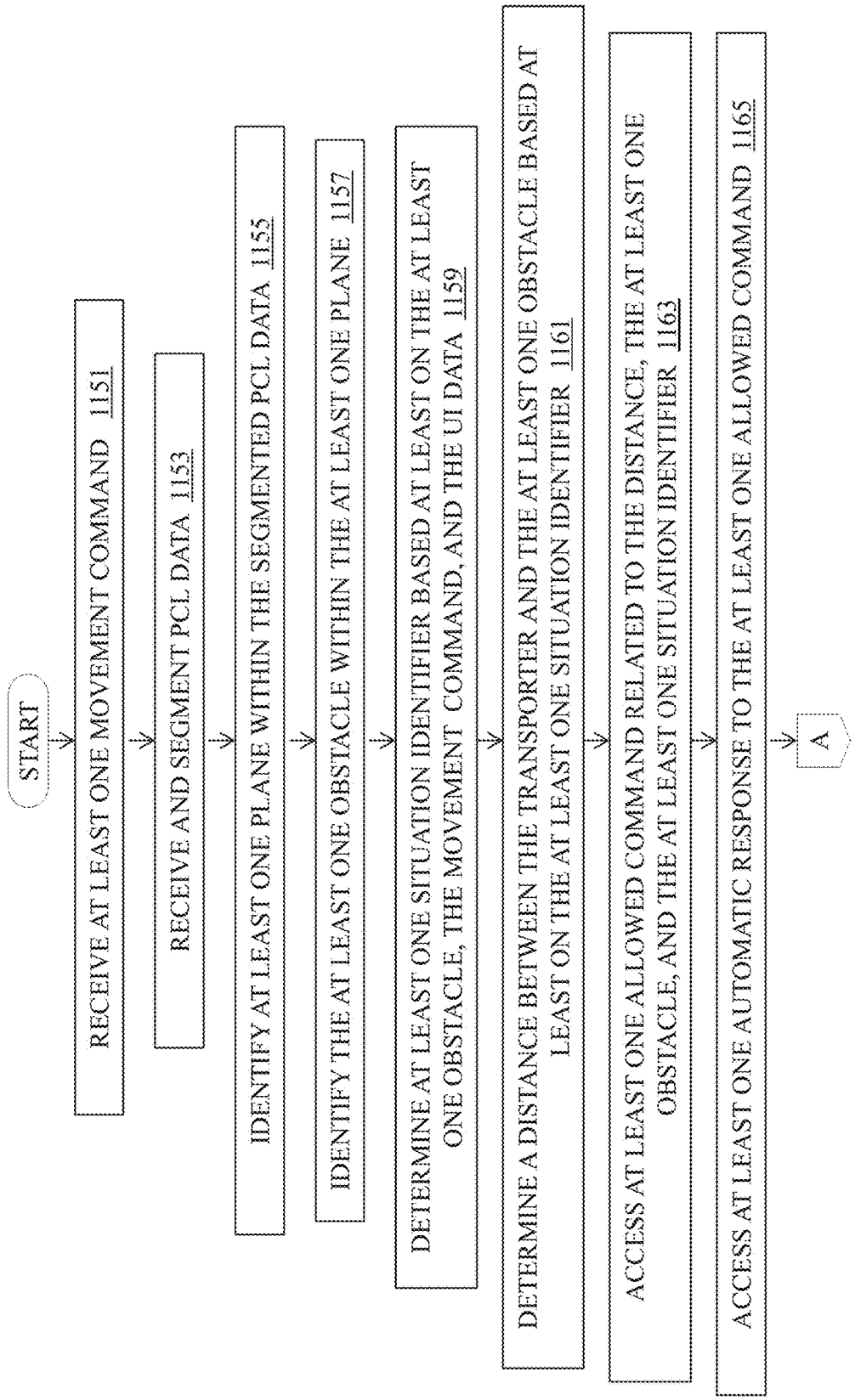

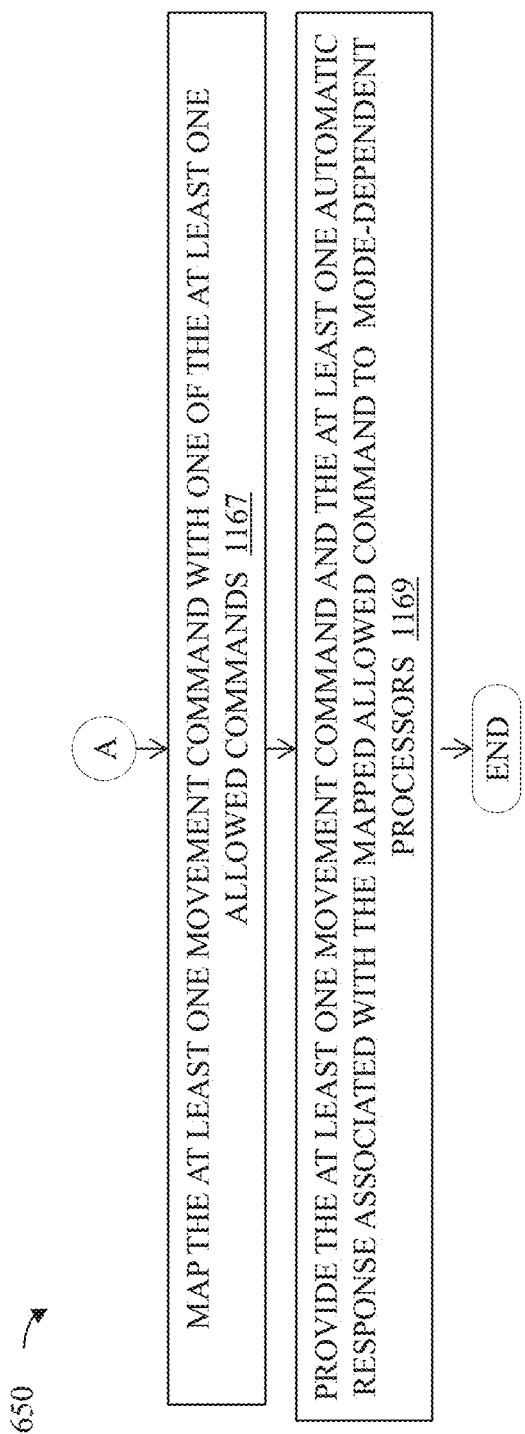
FIG. 11A2

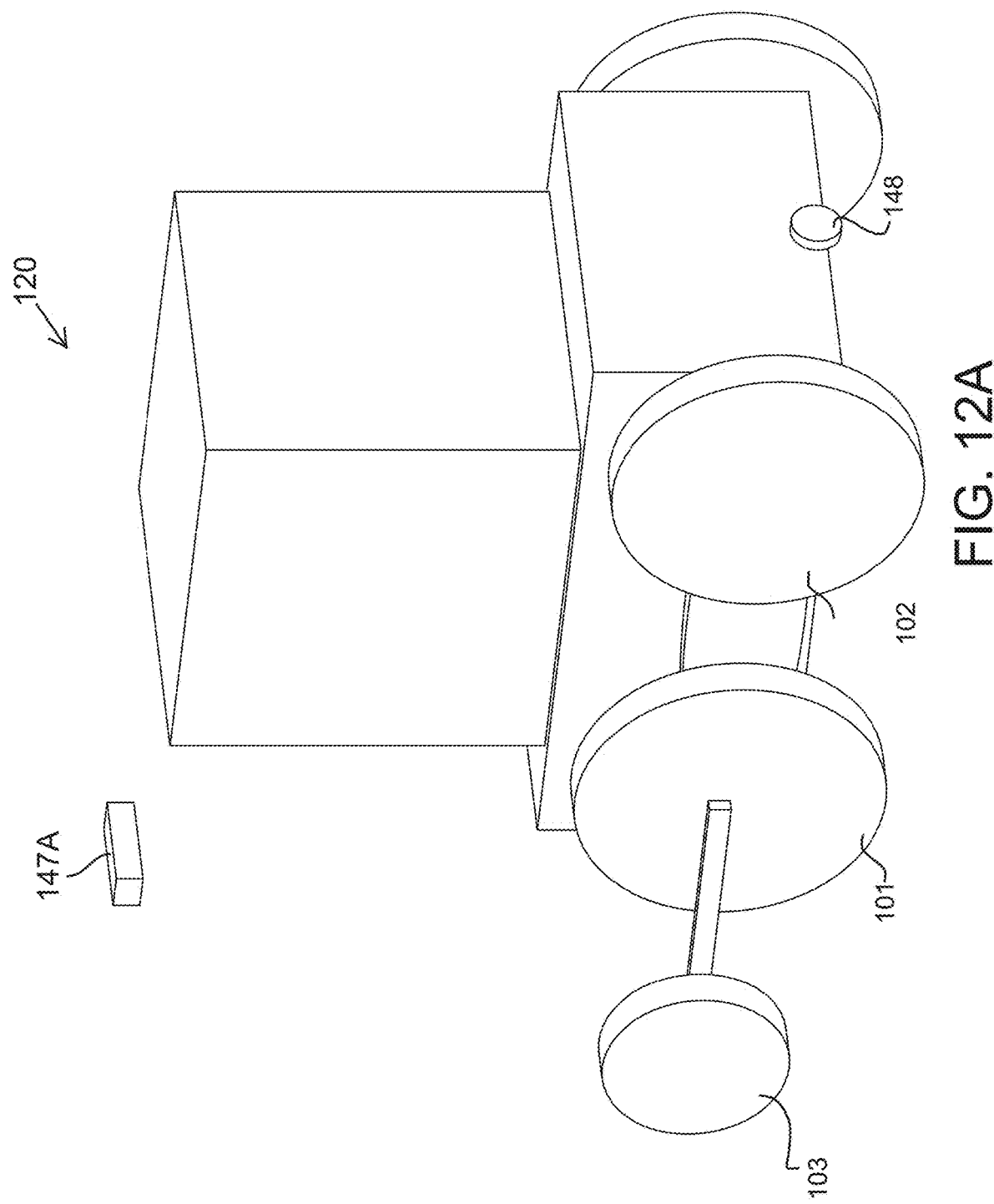

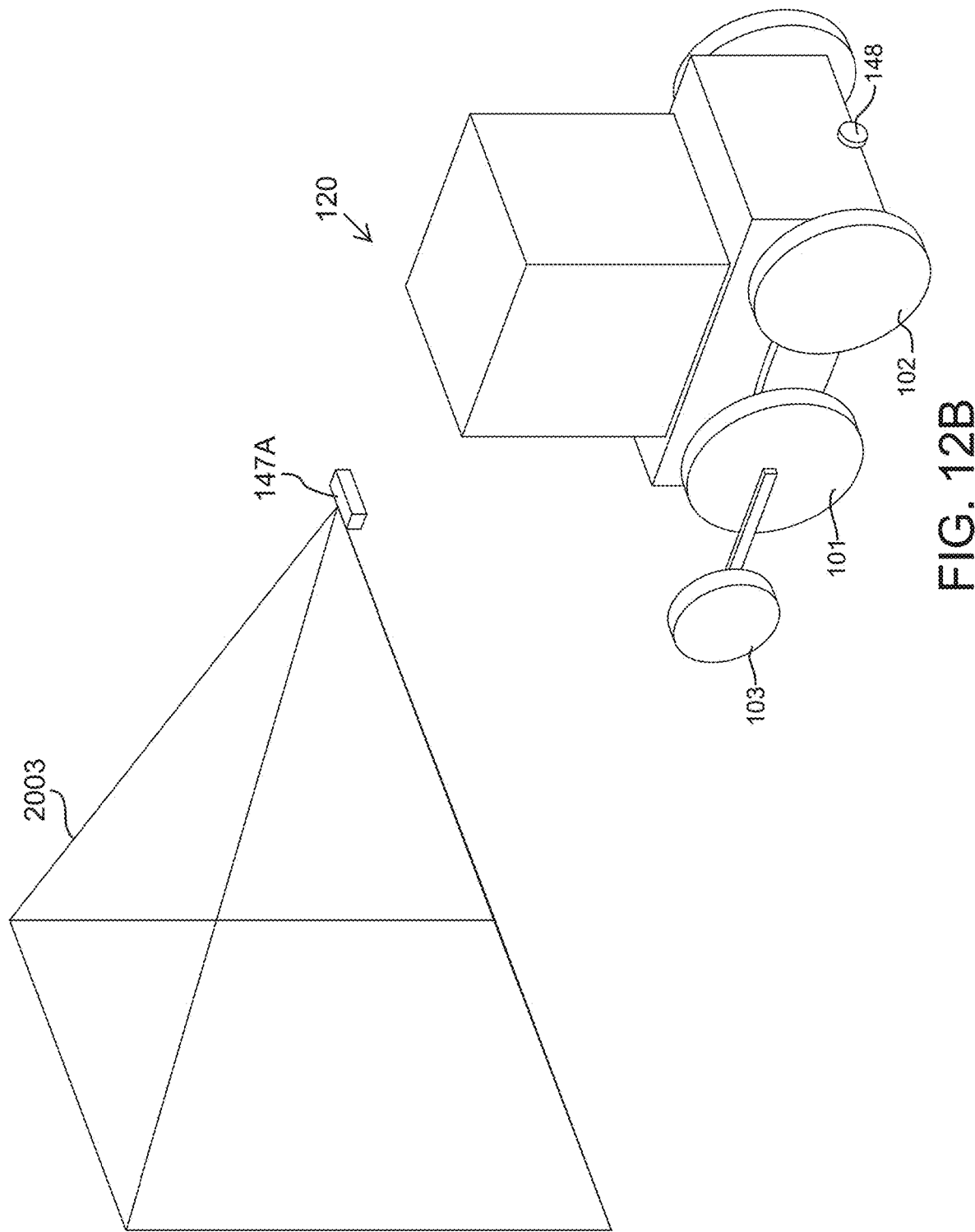

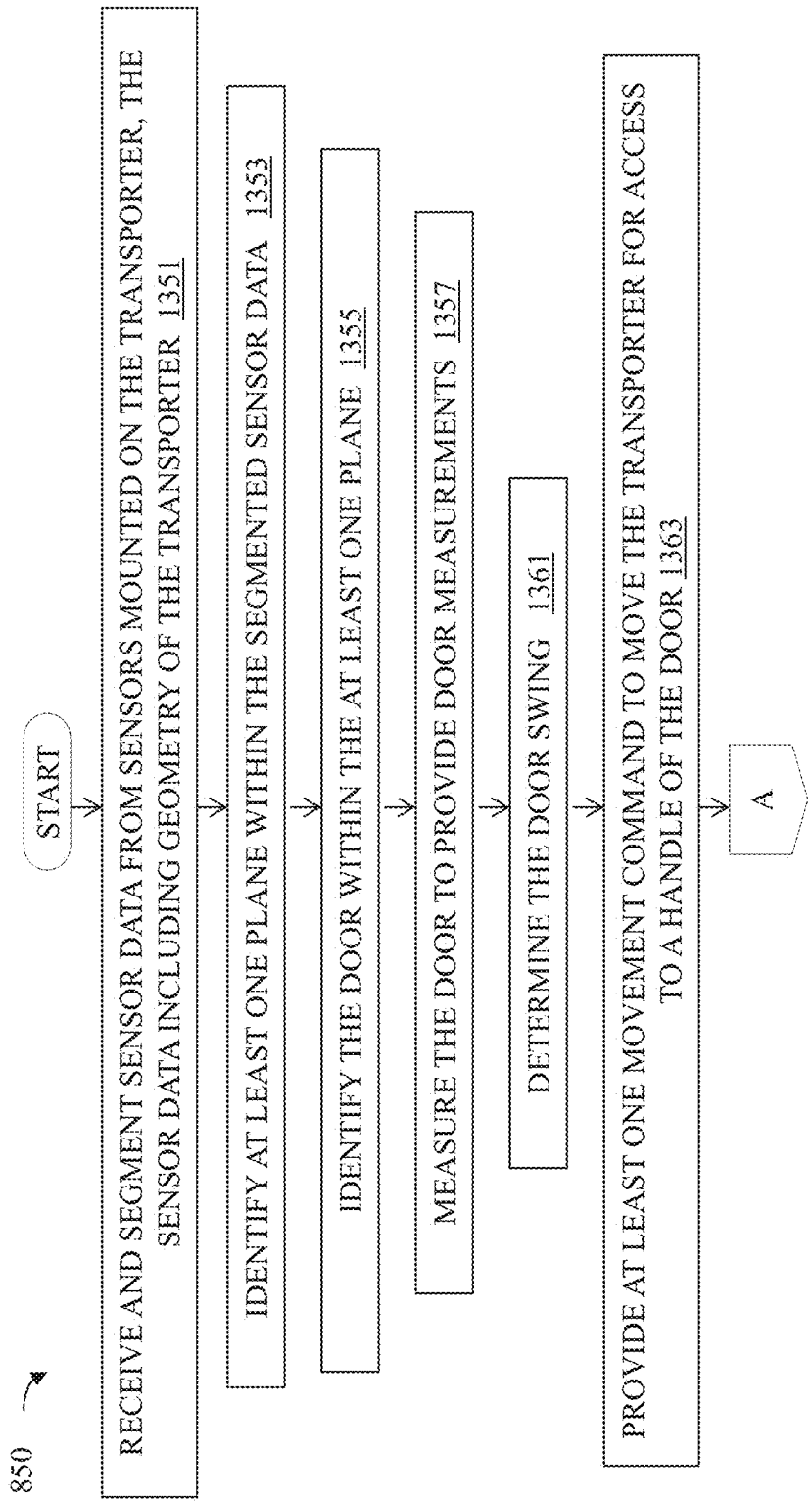
FIG. 14A1

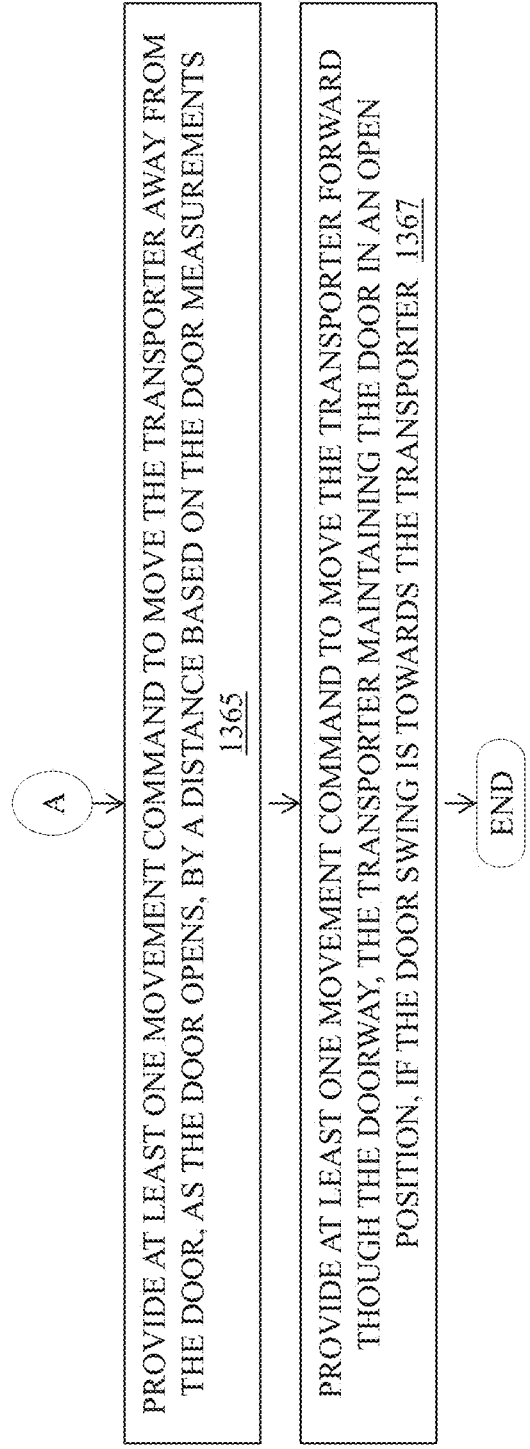
FIG. 14A2

950

START

PROVIDE AT LEAST ONE MOVEMENT COMMAND TO CAUSE THE TRANSPORTER TO TRAVERSE THE DOOR THRESHOLD ENTERING THE REST ROOM 1451

PROVIDE AT LEAST ONE MOVEMENT COMMAND TO POSITION THE TRANSPORTER FOR ACCESSING AN EGRESS HANDLE OF THE DOOR 1453

PROVIDE AT LEAST ONE MOVEMENT COMMAND TO MOVE THE TRANSPORTER AWAY FROM THE DOOR, AS THE DOOR CLOSES, IF THE DOOR SWING IS TOWARDS THE TRANSPORTER 1455

PROVIDE AT LEAST ONE MOVEMENT COMMAND TO MOVE THE TRANSPORTER TOWARD THE DOOR, AS THE DOOR CLOSES, IF THE DOOR SWING IS AWAY FROM THE TRANSPORTER 1457

PROVIDE AT LEAST ONE MOVEMENT COMMAND TO POSITION THE TRANSPORTER ALONGSIDE A FIRST REST ROOM FIXTURE 1459

PROVIDING AT LEAST ONE MOVEMENT COMMAND TO STOP THE TRANSPORTER 1461

PROVIDING AT LEAST ONE MOVEMENT COMMAND TO POSITION THE TRANSPORTER NEAR A SECOND REST ROOM FIXTURE 1463

PROVIDE AT LEAST ONE MOVEMENT COMMAND TO TRAVERSE THE DOOR THRESHOLD TO EXIT THE REST ROOM STALL 1465

END

FIG. 15A

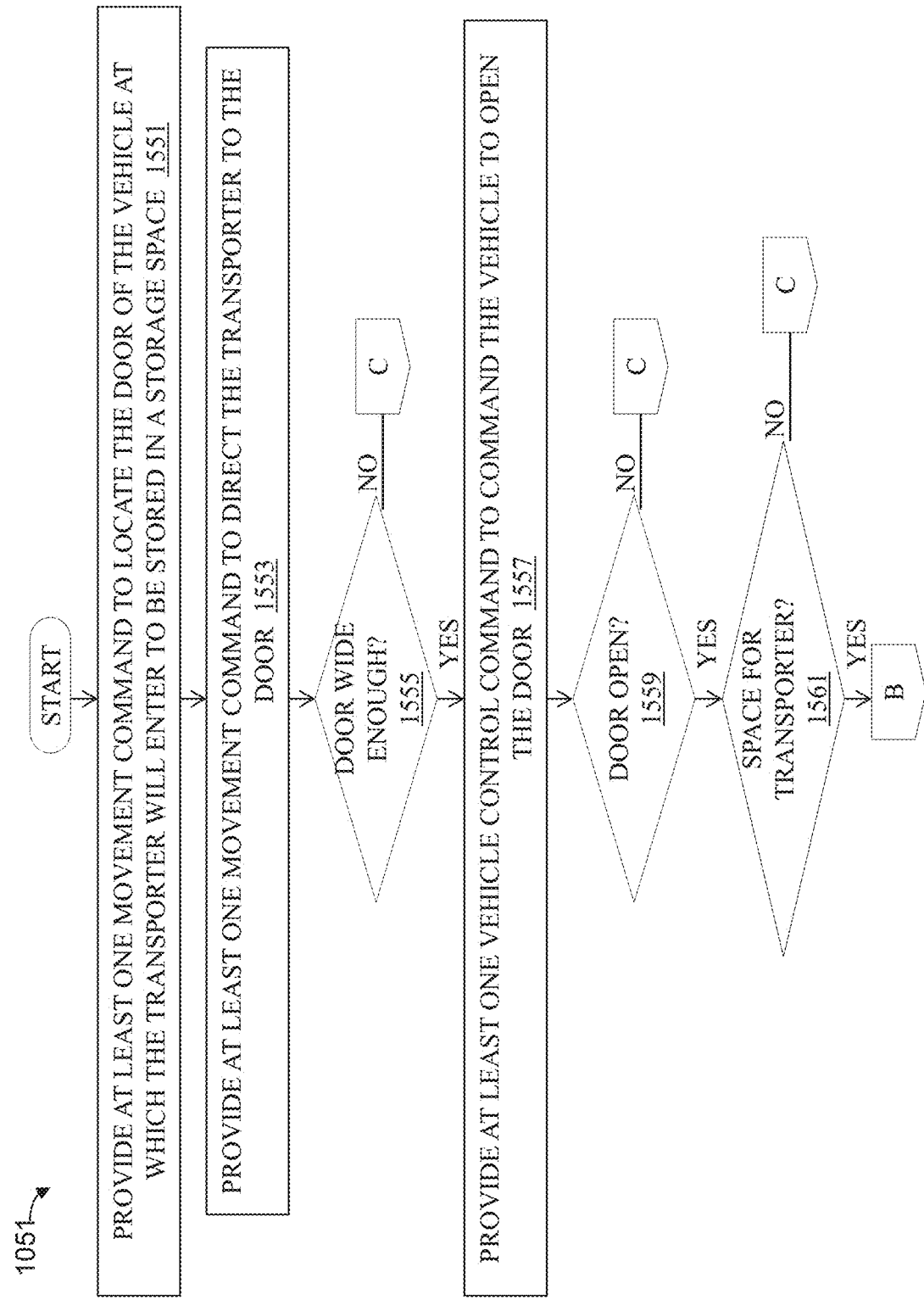

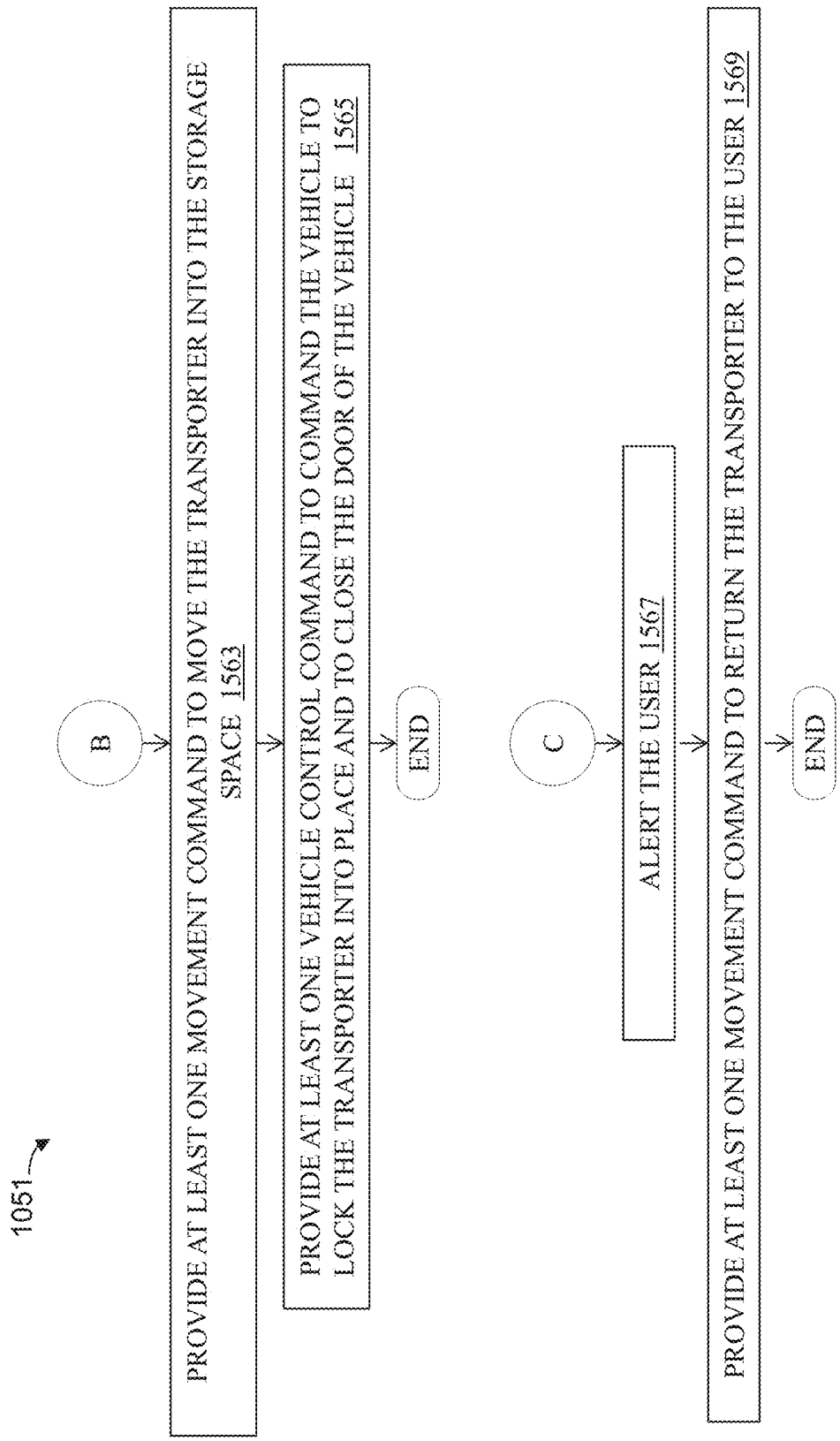
FIG. 16A2

USER CONTROL DEVICE FOR A TRANSPORTER

CROSS REFERENCE TO RELATED APPLICATIONS

This application claims the benefit of U.S. Provisional Application Ser. No. 62/322,522, filed Apr. 14, 2016, entitled USER CONTROL DEVICE FOR A TRANSPORTER, which is incorporated herein by reference in its entirety.

BACKGROUND

The present teachings relate generally to personal vehicles, and more specifically to user control devices for vehicles that have heightened requirements for safety and reliability. Currently, personal vehicles can ascend and descend stairs. Such devices can include a plurality of wheels that can rotate about axes that are fixed with respect to a cluster arm. The cluster arm can rotate about an axis so that wheels rest on successive stairs. Currently, a user can board or disembark from an automobile or other enclosed vehicle and can load a personal vehicle into or out of the enclosed vehicle.

What is needed is a user control device that can automatically determine locations of key features of the environment of the personal vehicle and can automatically cause the personal vehicle to react to the key features.

SUMMARY

The user control device of the present teachings can include, but is not limited to including, a user control processor (UCP) assist that can provide enhanced functionality to a user of a personal vehicle such as the transporter of the present teachings, for example, but not limited to, assisting a user of the transporter in avoiding obstacles, traversing doors, traversing stairs, traveling on elevators, and parking/transporting the transporter. The UCP assist can receive user input and/or input from power base processors (PBPs) that can control the transporter, and can enable the invocation of a processing mode that has been automatically or manually selected. A command processor can enable the invoked mode by generating movement commands based at least on previous movement commands, data from the user, and data from sensors. The command processor can receive user data that can include signals from a joystick that can provide an indication of a desired movement direction and speed of the transporter. User data can also include mode selections into which the transporter could be transitioned. Modes such as door mode, rest room mode, enhanced stair mode, elevator mode, mobile storage mode, and static storage/charging mode can be selected. Any of these modes can include a move-to-position mode, or the user can direct the transporter to move to a certain position. UCP assist can generate commands such as movement commands that can include, but are not limited to including, speed and direction, and the movement commands can be provided to the PBPs which can transmit this information to wheel motor drives and cluster motor drives.

Sensor data can be collected by sensor-handling processors that can include, but are not limited to including, a transporter geometry processor, a point cloud library (PCL) processor, a simultaneous location and mapping (SLAM) processor, and an obstacle processor. The movement commands can also be provided to the sensor handling processors. The sensors can provide environmental information that can include, for example, but not limited to, obstacles and geometric information about the transporter. The sensors can include at least one time-of-flight sensor that can be mounted anywhere on transporter. There can be multiple sensors mounted on the transporter. The PCL processor can gather and process environmental information, and can produce PCL data that can be processed by a PCL library.

The transporter geometry processor of the present teachings can receive transporter geometry information from the sensors, can perform any processing necessary to prepare the transporter geometry information for use by the mode-dependent processors, and can provide the transporter geometry information to mode-dependent processors. The geometry of the transporter can be used for automatically determining whether or not the transporter can fit in and/or through a space such as, for example, a stairway and a door. The SLAM processor can determine navigation information based on, for example, but not limited to, user information, environmental information, and movement commands. The transporter can travel in a path at least in part set out by navigation information. An obstacle processor can locate obstacles and distances to the obstacles. Obstacles can include, but are not limited to including, doors, stairs, automobiles, and miscellaneous features in the vicinity of the path of the transporter.

The method for obstacle processing of the present teachings can include, but is not limited to including, receiving movement commands and user information, receiving and segmenting PCL data, identifying at least one plane within the segmented PCL data, and identifying at least one obstacle within the at least one plane. The method for obstacle processing can further include determining at least one situation identifier based at least on the obstacles, user information, and movement commands, and determining the distance between the transporter and the obstacles based at least on the situation identifier. The method for obstacle processing can also include accessing at least one allowed command related to the distance, the obstacle, and the situation identifier. The method for obstacle processing can still further include accessing an automatic response to the allowed command, mapping the movement command with one of the allowed commands, and providing the movement command and the automatic response associated with the mapped allowed command to the mode-dependent processors.

The obstacles can be stationary or moving. The distance can include a fixed amount and/or can be a dynamically-varying amount. The movement command can include, but is not limited to including, a follow command, a pass-the-obstacle command, a travel-beside-the-obstacle command, and a do-not-follow-the-obstacle command. The obstacle data can be stored and retrieved locally and/or in a cloud-based storage area, for example. The method can optionally include storing the obstacle data and allowing access to the stored obstacle data by systems external to the transporter. The method for obstacle processing can optionally include collecting sensor data from a time-of-flight camera mounted on the transporter, analyzing the sensor data using a point cloud library (PCL), tracking the moving object using SLAM based on the location of the transporter, identifying a plane within the obstacle data using, and providing the automatic response associated with the mapped allowed command to the mode-dependent processors. The method for obstacle processing can optionally receive a resume command, and provide, following the resume command, a movement command and the automatic response associated with the mapped allowed command to the mode-dependent processors. The automatic response can include a speed control command.

The obstacle processor of the present teachings can include, but is not limited to including, a nav/PCL data processor. The nav/PCL processor can receive the movement commands and the user information, and can receive and segment PCL data from a PCL processor, identify a plane within the segmented PCL data, and identify obstacles within the plane. The obstacle processor can include a distance processor. The distance processor can determine a situation identifier based on user information, the movement command, and the obstacles. The distance processor can determine the distance between the transporter and the obstacles based at least on the situation identifier. The moving object processor and/or the stationary object processor can access the allowed command related to the distance, the obstacles, and the situation identifier. The moving object processor and/or the stationary object processor can access an automatic response from an automatic response list associated with the allowed command. The moving object processor and/or the stationary object processor can access the movement command and map the movement command with one of the allowed commands. The moving object processor and/or stationary object processor can provide movement commands and the automatic response associated with the mapped allowed command to the mode-dependent processors. The movement command can include a follow command, a pass command, a travel-beside command, a move-to-position command, and a do-not-follow command. The nav/PCL processor can store obstacles in local storage and/or on storage cloud, and can allow access to the stored obstacles by systems external to the transporter.

The method of the present teachings for navigating stairs can include, but is not limited to including, receiving a stair command, and receiving environmental information from sensors mounted on the transporter and/or the obstacle processor. The method for navigating stairs can include locating, based on the environmental information, staircases within environmental information, and receiving a selection of one of the staircases located by the sensors and/or the obstacle processor. The method for navigating stairs can also include measuring the characteristics of the selected staircase, and locating, based on the environmental information, obstacles, if any, on the selected staircase. The method for navigating stairs can also include locating, based on the environmental information, a last stair of the selected staircase, and providing movement commands to move the transporter on the selected staircase based on the measured characteristics, the last stair, and the obstacles, if any. The method for navigating stairs can continue providing movement commands until the last stair is reached. The characteristics can include, but are not limited to including, the height of the stair riser of the selected staircase, the surface texture of the riser, and the surface temperature of the riser. Alerts can be generated if the surface temperature falls outside of a threshold range and the surface texture falls outside of a traction set.

The method can optionally include locating the at least one staircase based on GPS data, building a map of the selected staircase using SLAM, saving the map, and updating the map while the transporter is moving. The method can optionally include accessing a geometry of the transporter, comparing the geometry to the at least one characteristic of the selected staircase, and modifying the movement of the transporter based on the comparing step. The characteristic can include, but is not limited to including, the height of at least one riser of the selected staircase, the surface texture of the at least one riser, and the surface temperature of the at least one riser. The method can optionally include generating an alert if the surface temperature falls outside of a threshold range and the surface texture falls outside of a traction set. The threshold range can include, but is not limited to including, temperatures below 33° F. The traction set can include, but is not limited to including, a carpet texture. The method can optionally include determining, based on the sensor data, the topography of an area surrounding the selected staircase, and generating an alert if the topography is not flat. The method can optionally include accessing a set of extreme circumstances.

The navigating stair processor of the present teachings can include, but is not limited to including, a staircase processor receiving at least one stair command included in user information, and a staircase locator receiving, through, for example, the obstacle processor, environmental information from sensors mounted on the transporter. The staircase locator can locate, based on environmental information, the staircases within the environmental information, and can receive the choice of a selected staircase. The stair characteristics processor can measure the characteristics of the selected staircase, and can locate, based on environmental information, obstacles, if any, on the selected staircase. The stair movement processor can locate, based on environmental information, a last stair of the selected staircase, and can provide to movement processor movement commands to instruct the transporter to move on the selected staircase based on the characteristics, the last stair, and the obstacles, if any. The staircase locator can locate staircases based on GPS data, and can build and save a map of the selected staircase. The map can be saved for use locally and/or by other devices unrelated to the transporter. The staircase processor can access the geometry of the transporter, compare the geometry to the characteristics of the selected staircase, and modify the navigation of the transporter based on the comparison. The staircase processor can optionally generate an alert if the surface temperature of the risers of the selected staircase falls outside of a threshold range and the surface texture of selected staircase falls outside of a traction set. The stair movement processor can determine, based on the environmental information, the topography of an area surrounding the selected staircase, and can generate an alert if the topography is not flat. The stair movement processor can access a set of extreme circumstances that can be used to modify the movement commands generated by the stair movement processor.

When the transporter traverses the threshold of a door, where the door can include a door swing, a hinge location, and a doorway, the method of the present teachings for navigating a door can include receiving and segmenting environmental information from sensors mounted on the transporter. The environmental information can include the geometry of the transporter. The method can include identifying a plane within the segmented sensor data, and identifying the door within the plane. The method for navigating a door can include measuring the door based on the environmental information. The method for navigating a door can include determining the door swing and providing movement commands to move the transporter for access to a handle of the door. The method for navigating a door can include providing movement commands to move the transporter away from the door as the door opens by a distance based on the door measurements. The method for navigating a door can include providing movement commands to move the transporter forward through the doorway. The transporter can maintain the door in an open position if the door swing is towards the transporter.

The method of the present teachings for processing sensor data can determine, through information from the sensors, the hinge side of the door, the direction and angle of the door, and the distance to the door. The movement processor of the present teachings can generate commands to PBPs such as start/stop turning left, start/stop turning right, start/stop moving forward, start/stop moving backwards, and can facilitate door mode by stopping the transporter, cancelling the goal that the transporter can be aiming to complete, and centering the joystick. The door processor of the present teachings can determine whether the door is, for example, a push to open, a pull to open, or a slider. The door processor can determine the width of the door based on the current position and orientation of the transporter, and can determine the x/y/z location of the door pivot point. If the door processor determines that the number of valid points in the image of the door derived from the set of obstacles and/or PCL data is greater than a threshold, the door processor can determine the distance from the transporter to the door. The door processor can determine if the door is moving based on successive samples of PCL data from the sensor processor. In some configurations, the door processor can assume that a side of the transporter is even with the handle side of the door, and can use that assumption, along with the position of the door pivot point, to determine the width of the door. The door processor can generate commands to move the transporter through the door based on the swing and the width of the door. The transporter itself can maintain the door in an open state while the transporter traverses the threshold of the door.

In some configurations, the transporter can automatically negotiate the use of rest room facilities. The doors to the rest room and to the rest room stall can be located as discussed herein, and the transporter can be moved to locations with respect to the doors as discussed herein. Fixtures in the rest room can be located as obstacles as discussed herein, and the transporter can be automatically positioned in the vicinity of the fixtures to provide the user with access to, for example, the toilet, the sink, and the changing table. The transporter can be automatically navigated to exit the rest room stall and the rest room through door and obstacle processing discussed herein. The transporter can automatically traverse the threshold of the door based on the geometry of the transporter.

The method of the present teachings for automatically storing the transporter in a vehicle, such as, for example, but not limited to, an accessible van, can assist a user in independent use of the vehicle. When the user exits the transporter and enters the vehicle, possibly as the vehicle's driver, the transporter can remain parked outside of the vehicle. If the transporter is to accompany the user in the vehicle for later use, the mobile park mode of the present teachings can provide movement commands to the transporter to cause the transporter to store itself either automatically or upon command, and to be recalled to the door of the vehicle as well. The transporter can be commanded to store itself through commands received from external applications, for example. In some configurations, a computer-driven device such as a cell phone, laptop, and/or tablet can be used to execute one or more external applications and generate information that could ultimately control the transporter. In some configurations, the transporter can automatically proceed to mobile park mode after the user exits the transporter. Movement commands can include commands to locate the door of the vehicle at which the transporter will enter to be stored, and commands to direct the transporter to the vehicle door. Mobile park mode can determine error conditions such as, for example, but not limited to, if the vehicle door is too small for the transporter to enter, and mobile park mode can alert the user of the error condition through, for example, but not limited to, an audio alert through audio interface and/or a message to one or more external applications. If the vehicle door is wide enough for the transporter to enter, mobile park mode can provide vehicle control commands to command the vehicle to open the vehicle door. Mobile park mode can determine when the vehicle door is open and whether or not there is space for the transporter to be stored. Mobile park mode can invoke the method for obstacle processing to assist in determining the status of the vehicle door and if there is room in the vehicle to store the transporter. If there is enough room for the transporter, mobile park mode can provide movement commands to move the transporter into the storage space in the vehicle. Vehicle control commands can be provided to command the vehicle to lock the transporter into place, and to close the vehicle door. When the transporter is again needed, one or more external applications, for example, can be used to bring the transporter back to the user. The status of the transporter can be recalled, and vehicle control commands can command the vehicle to unlock the transporter and open the door of the vehicle. The vehicle door can be located and the transporter can be moved through the vehicle door and to the passenger door to which it had been summoned by, for example, one or more external applications. In some configurations, the vehicle can be tagged in places such as, for example, the vehicle entry door where the transporter can be stored.

The method of the present teachings for storing/recharging the transporter can assist the user in storing and possibly recharging the transporter, possibly when the user is sleeping. After the user exits the transporter, commands can be initiated by one or more external applications, to move the perhaps riderless transporter to a storage/docking area. In some configurations, a mode selection by the user while the user occupies the transporter can initiate automatic storage/docking functions after the user has exited the transporter. When the transporter is again needed, commands can be initiated by one or more external applications to recall the transporter to the user. The method for storing/recharging the transporter can include, but is not limited to including, locating at least one storage/charging area, and providing at least one movement command to move the transporter from a first location to the storage/charging area. The method for storing/recharging the transporter can include locating a charging dock in the storage/charging area and providing at least one movement command to couple the transporter with the charging dock. The method for storing/recharging the transporter can optionally include providing at least one movement command to move the transporter to the first location when the transporter receives an invocation command. If there is no storage/charging area, or if there is no charging dock, or if the transporter cannot couple with the charging dock, the method for storing/recharging the transporter can optionally include providing at least one alert to the user, and providing at least one movement command to move the transporter to the first location.

The method of the present teachings for negotiating an elevator while maneuvering the transporter can assist a user in getting on and off the elevator in the transporter. When the elevator is, for example, automatically located, and when the user selects the desired elevator direction, and when the elevator arrives and the door opens, movement commands can be provided to move the transporter into the elevator. The geometry of the elevator can be determined and movement commands can be provided to move the transporter into a location that makes it possible for the user to select a desired activity from the elevator selection panel. The location of the transporter can also be appropriate for exiting the elevator. When the elevator door opens, movement commands can be provided to move the transporter to fully exit the elevator.

BRIEF DESCRIPTION OF THE DRAWINGS

The present teachings will be more readily understood by reference to the following description, taken with the accompanying drawings, in which:

FIGS. 6B1 and 6B2 are schematic representations of the manual interface cover and UCP assist connection of the present teachings;

FIGS. 6B3 and 6B4 are schematic representations of the UCP assist holder of the present teachings;

FIGS. 6C1 and 6C2 are schematic representations of the UCP assist connection device of the present teachings;

FIGS. 6D1 and 6D2 are schematic representations of the mounting board for the UCP assist connection device of the present teachings;

FIGS. 6D3 and 6D4 are schematic representations of the UCP assist connection device mounted on the mounting board for the UCP assist connection device;

FIGS. 6D5 and 6D6 are schematic representations of another configuration of the UCP assist connection device of the present teachings;

FIG. 6E is a line drawing of a configuration of the positioning of sensors of the transporter of the present teachings;

FIGS. 7A-7E are charts of communications packet information of the present teachings;

FIGS. 11A1-11A2 are schematic block diagrams of a method of obstacle detection of the present teachings;

FIGS. 12A-12D are computer-generated representations of the transporter configured with a sensor;

FIGS. 14A1-14A2 are schematic block diagrams of a method of door traversal of the present teachings;

FIG. 15A is a schematic block diagram of a method of rest room navigation of the present teachings;

FIGS. 16A1-16A2 are schematic block diagrams of a method of mobile storage of the present teachings;

DETAILED DESCRIPTION

The configuration of a user control device of the present teachings is discussed in detail below in relation to a transporter, for example, but not limited to, a wheelchair. Various types of transporters can interface with the user control device. The user control device can communicate with the transporter via electrical interface(s) that can facilitate communication and data processing among the user interface device and controllers that can control the movement of the transporter. The user control device can perform automated actions based on the environment in which the transporter operates and the user's desired movement of the transporter. External applications can enable monitoring and control of the transporter.

Figure 1:
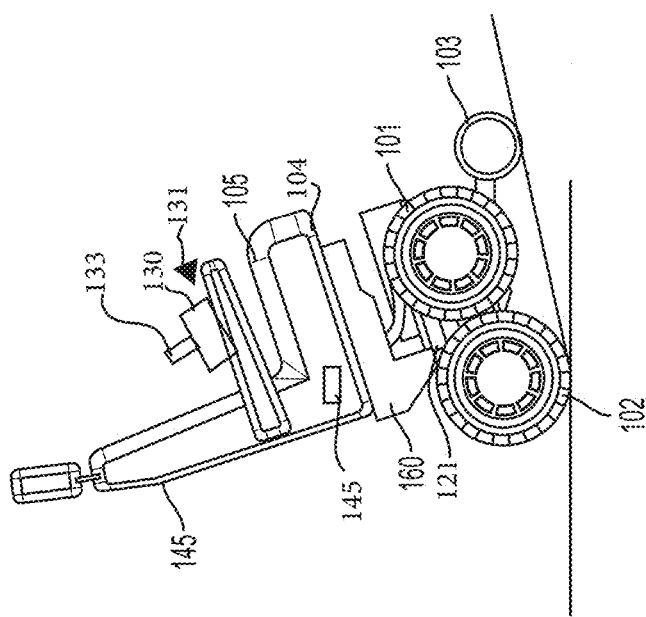
FIG. 1 is a schematic representation of a transporter of the present teachings.

Referring now to FIG. 1, transporter 120 can include, but is not limited to including, user control device 131, seat 105, chassis 104, power base 160, first wheels 101, second wheels 102, third wheels 103, and cluster 121. UCD 131 can receive user and sensor input and can provide that information to power base 160. UCD 131 can include, but is not limited to including, UCP 130 and UCP assist 145. UCP assist can also be located independently from UCP 130, and can be positioned anywhere on transporter 120 including, but not limited to, on the side and on the back of transporter 120. Power base 160 can control, for example, the movements of wheels 101 and 102, cluster 121, and seat 105 based on inputs from UCD 131 and other factors including, but not limited to, automated enforcement of requirements for, for example, safety and reliability.

Continuing to refer to FIG. 1, transporter 120 can operate in functional modes such as, for example, but not limited to, standard mode 201 (FIG. 3A) in which transporter 120 can operate on drive wheels 101 and caster wheels 103, and enhanced mode 217 (FIG. 3A) in which transporter 120 can operate on drive wheels 101/102, can be dynamically stabilized through onboard sensors, and can operate having elevated chassis 104, casters 103, and seat 105. Transporter 120 can also operate in balance mode 219 (FIG. 3A) in which transporter 120 can operate on drive wheels 102, can have an elevated height of seat 105, and can be dynamically stabilized through onboard sensors. Transporter 120 can further operate in stair mode 215 (FIG. 3A) in which transporter 120 can use wheel clusters 121 (FIG. 1) to climb and descend stairs and can be dynamically stabilized. Transporter 120 can still further operate in remote mode 205 (FIG. 3A) in which transporter 120 can operate on drive wheels 101/102 and can be unoccupied. Transporter 120 can optionally operate in docking mode 203 (FIG. 3A) in which transporter 120 can operate on drive wheels 101/102 and caster wheels 103, thereby lowering chassis 104. Some of the modes of transporter 120 are described in U.S. Pat. No. 6,343,664, entitled Operating Modes for Stair Climbing in Cluster-wheel Vehicle, issued Feb. 2, 2002, which is incorporated herein by reference.

Figure 2A:
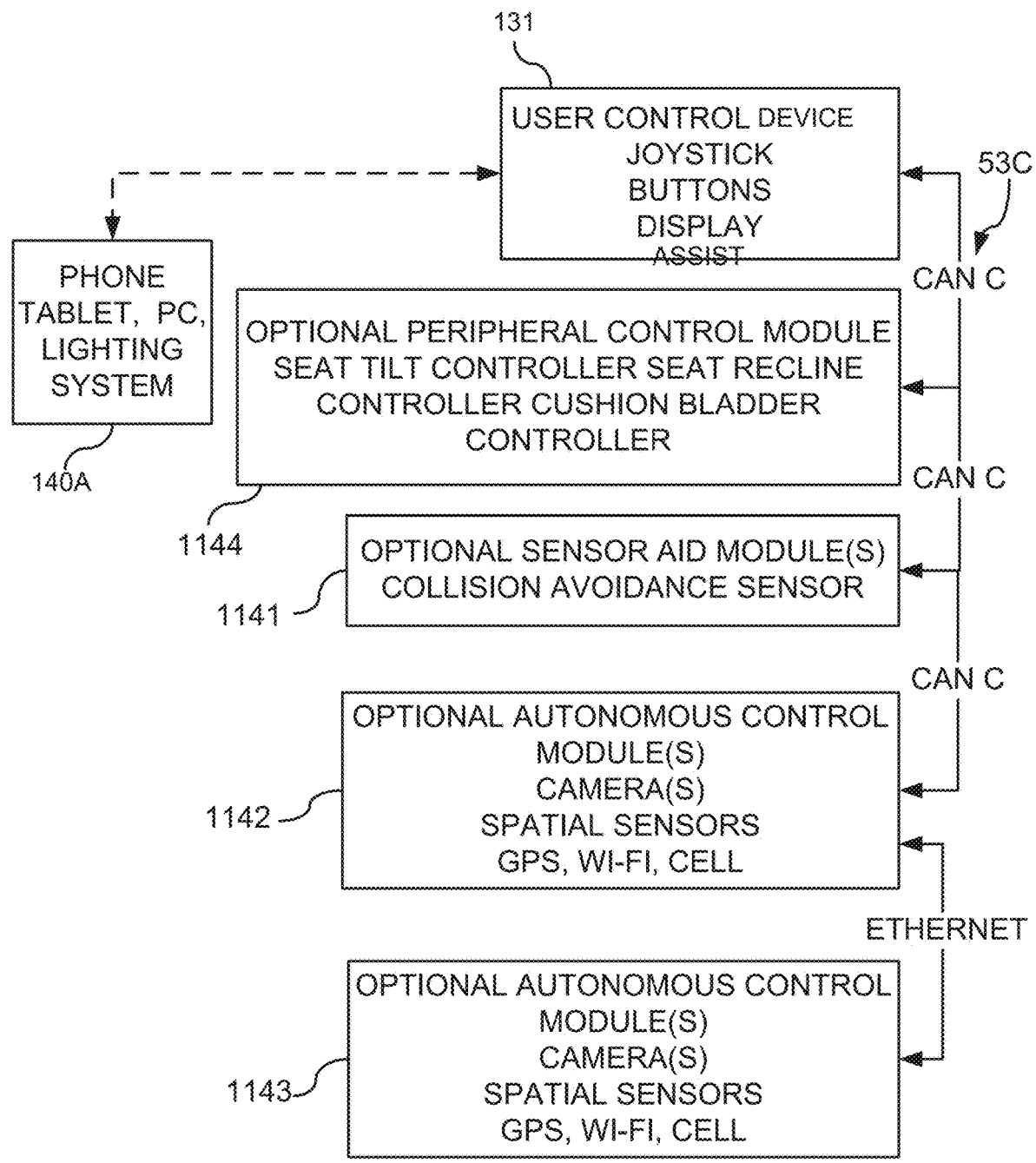
FIGS. 2A-2D are schematic block diagrams of the components of the transporter of the present teachings.
Figure 2B:
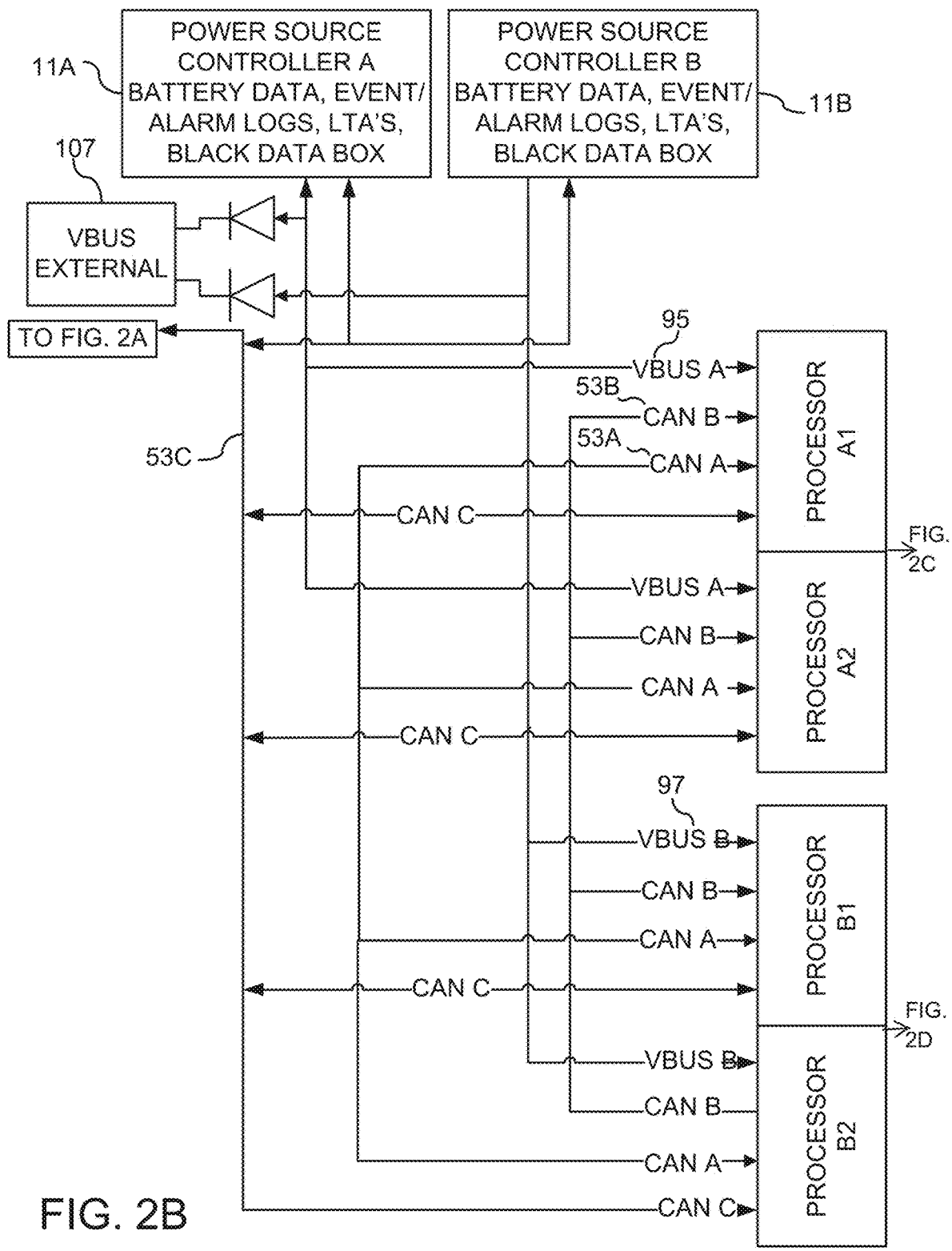
Figure 4:
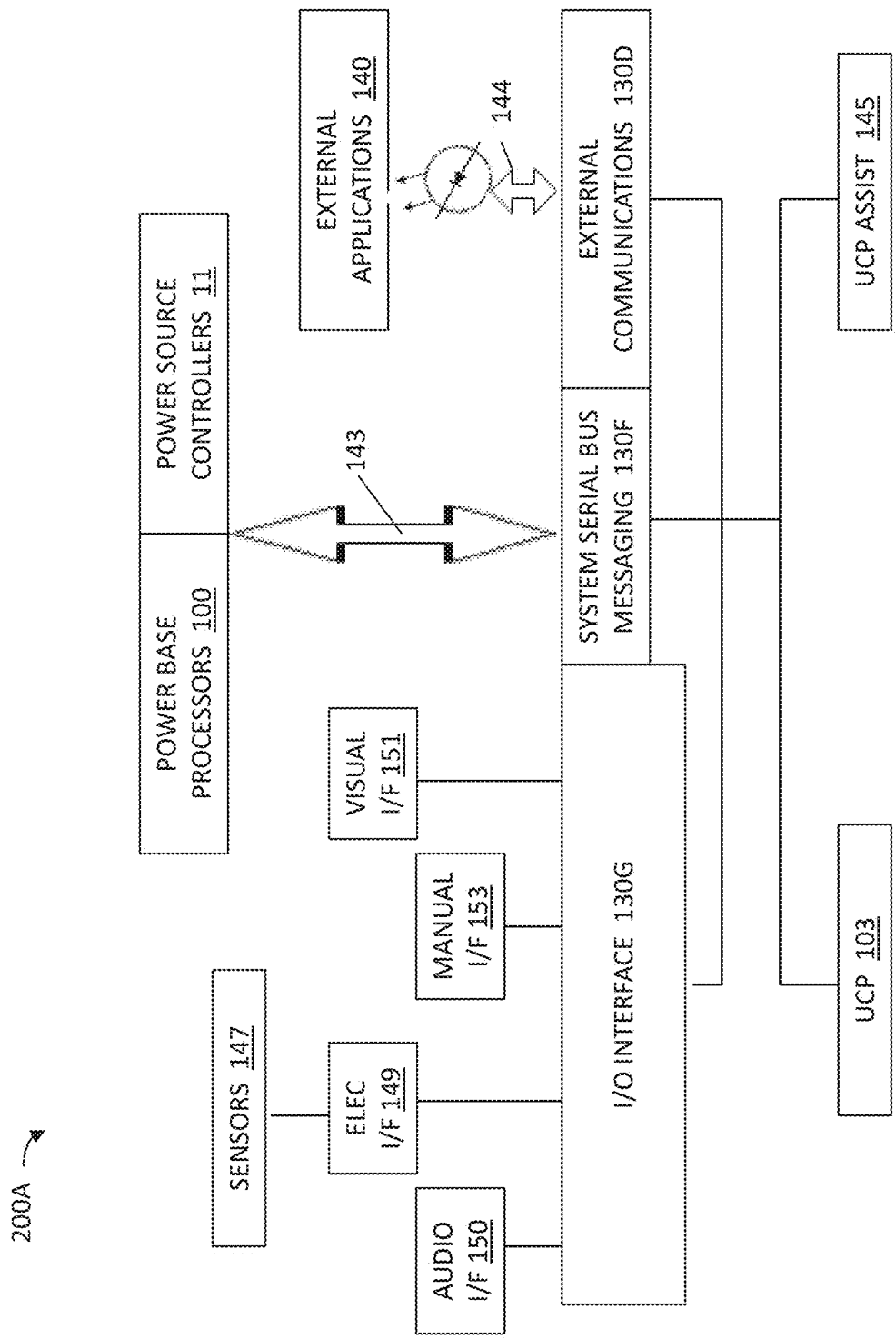
FIG. 4 is a schematic block diagram of the electronic components of the transporter of the present teachings.

Referring now primarily to FIGS. 2A-2D, power base 160 (FIG. 1) can include, but is not limited to including, at least one processor 43A-43D (FIGS. 2C/2D), at least one motor drive 1050, 19, 21, 25, 27, 31, 33, 37 (FIGS. 2C/2D), at least one inertial system 1070, 23, 29, 35 (FIGS. 2C/2D), and at least one power source controller 11A/B (FIG. 2B). Power base 160 (FIG. 1) can be communicatively coupled with, for example, but not limited to, UCD 131 (FIG. 2A) through, for example, but not limited to, electronic communications means 53C and a protocol such as, for example, a controller area network (CAN) bus protocol. UCD 131 (FIG. 2A) can be optionally communicatively coupled with electronic devices 140A (FIG. 2A) such as, for example, but not limited to, computers such as tablets and personal computers, telephones, and lighting systems, and can possibly be executing external applications 140 (FIG. 4). UCD 131 (FIG. 2A) can include, but is not limited to including, at least one manual interface such as, for example, joystick 133 (FIG. 5B) and at least one push button 141A/B/C (FIG. 6), at least one visual interface such as, for example, display (FIG. 5A), and, optionally, at least one UCP assist 145 (FIG. 4). UCD 131 (FIG. 2A) can optionally be communicatively coupled with peripheral control module 1144, sensor aid modules 1141, and autonomous control modules 1142/1143. Communications can be enabled by, for example, but not limited to, a CANbus protocol and an Ethernet protocol. Other protocols can be used.

Figure 2C:
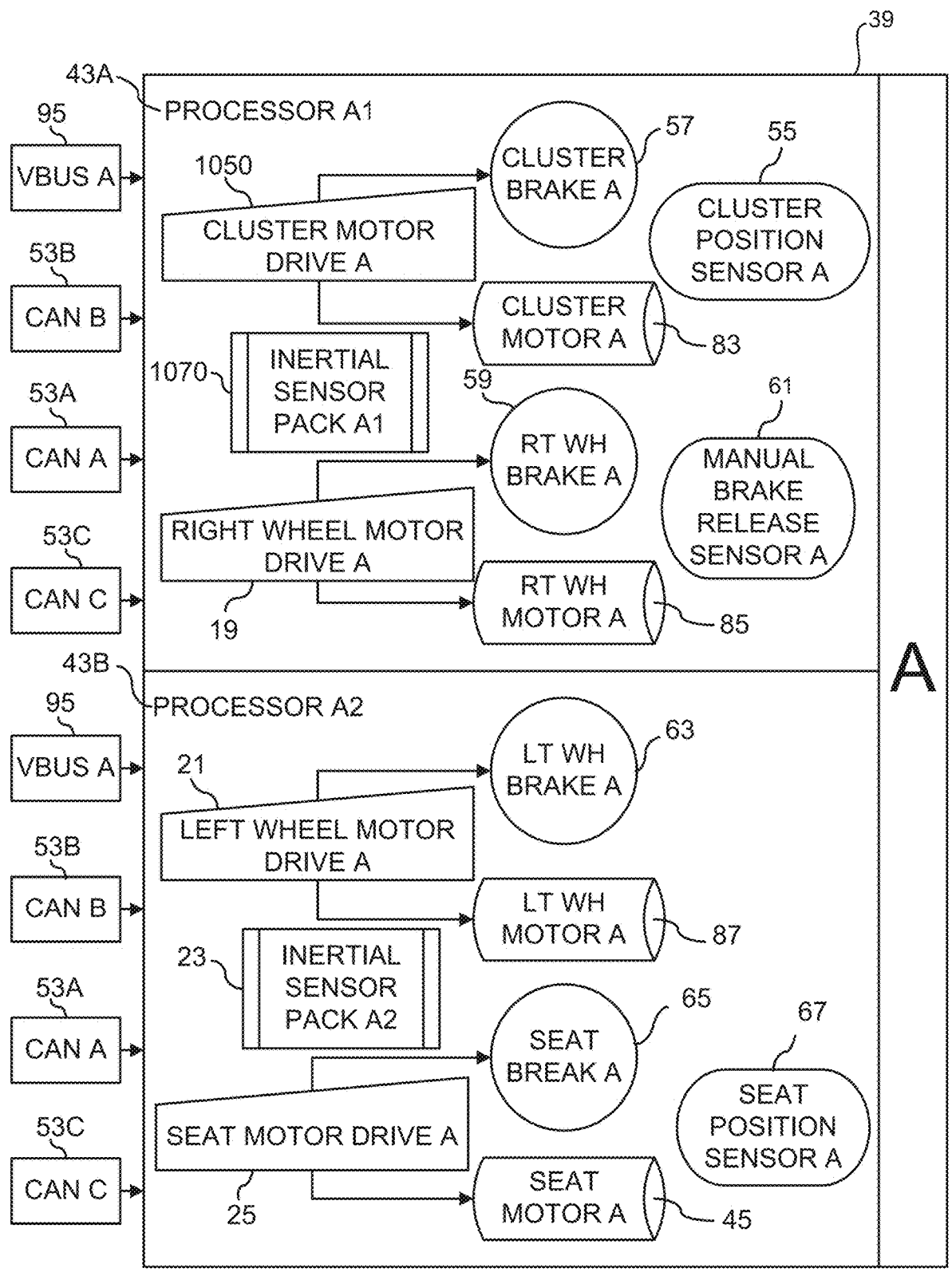

Continuing to refer primarily to FIGS. 2A-2D, in some configurations, each at least one processor 43A-43D (FIGS. 2C/2D) can include, but is not limited to including, at least one cluster motor drive 1050, 27 (FIGS. 2C/2D), at least one right wheel motor drive 19, 31 (FIG. 2C), at least one left wheel motor drive 21, 33 (FIGS. 2C/2D), at least one seat motor drive 25, 37 (FIGS. 2C/D), and at least one inertial sensor pack 1070, 23, 29, 35 (FIGS. 2C/2D). Power base 160 can further include at least one cluster brake 57, 69 (FIGS. 2C/2D), at least one cluster motor 83, 89 (FIGS. 2C/2D), at least one right wheel brake 59, 73 (FIG. 2C/2D), at least one left wheel brake 63, 77 (FIGS. 2C/2D), at least one right wheel motor 85, 91 (FIGS. 2C/2D), at least one left wheel motor 87, 93 (FIGS. 2C/2D), at least one seat motor 45, 47 (FIGS. 2C/2D), at least one seat brake 65, 79 (FIGS. 2C/2D), at least one cluster position sensor 55, 71 (FIGS. 2C/2D), and at least one manual brake release 61, 75 (FIGS. 2C/2D).

Figure 2D:
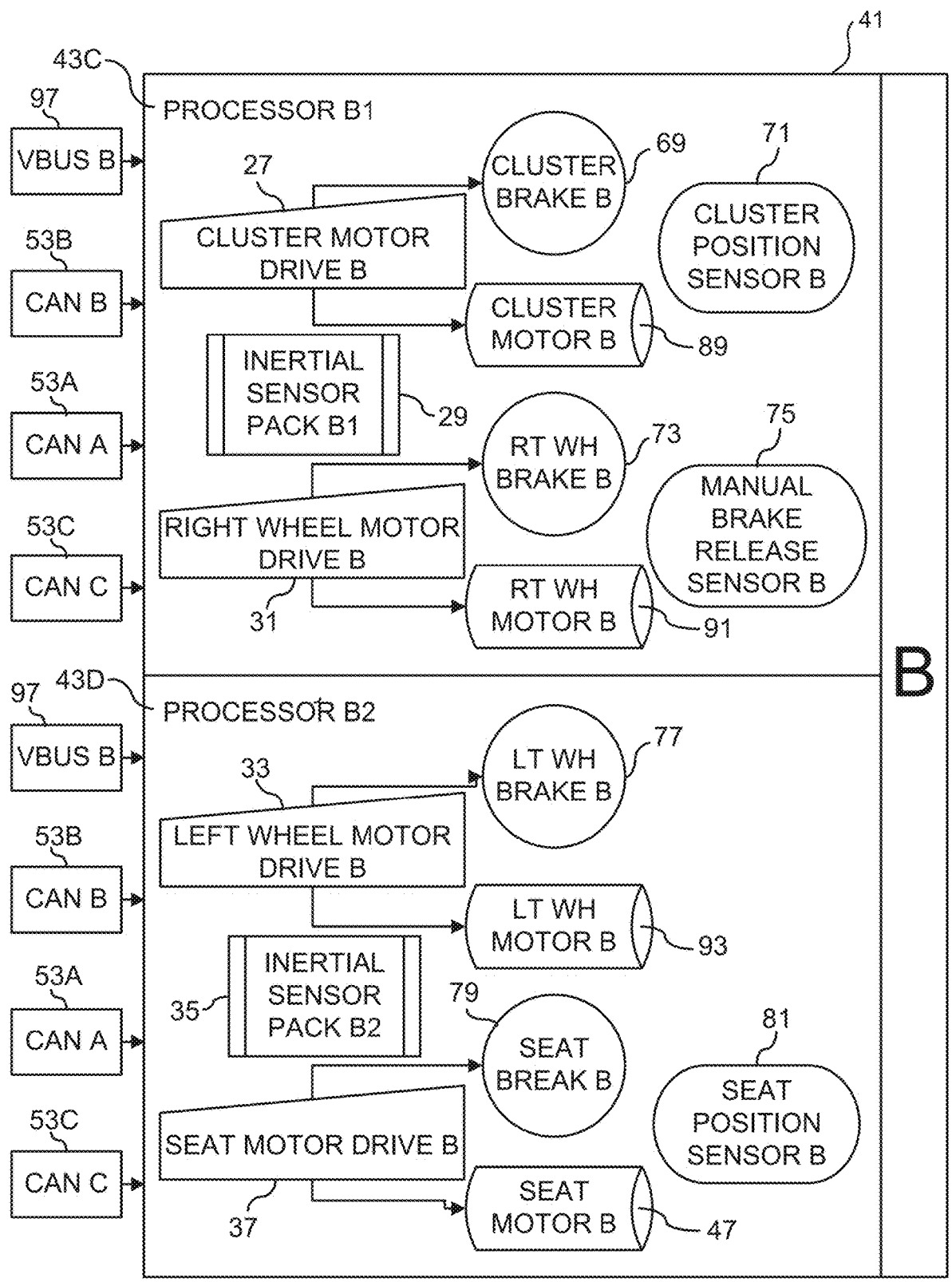

Continuing to refer primarily to FIGS. 2A-2D, power base 160 (FIG. 2C) can be used to drive cluster 121 (FIG. 1) of wheels 101/102 (FIG. 1) forming a ground-contacting module. The ground-contacting module can be mounted on cluster 121 (FIG. 1), and each wheel 101/102 (FIG. 1) of the ground-contacting module can be driven by a wheel motor drive such as, for example, right wheel motor drive A 19 (FIG. 2C), or redundant right wheel motor drive B 31 (FIG. 2D). Cluster 121 (FIG. 1) can rotate about a cluster axis, the rotation being governed by, for example, cluster motor drive A 1050 (FIG. 2C), or redundant cluster motor drive B 27 (FIG. 2D). At least one of the sensors such as, for example, but not limited to, at least one cluster position sensor 55/71 (FIGS. 2C/2D), at least one manual brake release sensor 61/75 (FIGS. 2C/2D), at least one motor current sensor (not shown), and at least one inertial sensor pack 17, 23, 29, 35 (FIGS. 2C/2D) can sense the state of transporter 120 (FIG. 1).

Continuing to still further refer to FIGS. 2A-2D, processors 43A-43D (FIGS. 2C/2D) can be electronically coupled to UCD 131 (FIG. 2A) for receiving control input, as well as to other controllers for controlling peripheral and extraordinary functions of transporter 120 (FIG. 1). Communications 53A-53C (FIG. 2B) among UCD 131 (FIG. 2A), power source controllers 11A/11B (FIG. 2B), and each of processors 43A-43D (FIGS. 2C/D) can be according to any protocol including, but not limited to, a CANbus protocol. At least one Vbus 95, 97 (FIG. 2B) can connect at least power source controller 11A/B (FIG. 2B) to power base 160 (FIG. 2C) and components external to power base 160 (FIG. 2C) through external Vbus 107 (FIG. 2B). In some configurations, processor A1 43A (FIG. 2C) can be the master of CANbus A 53A (FIG. 2B). Slaves on CANbus A 53A (FIG. 2B) can be processor A2 43B (FIG. 2C), processor B1 43C (FIG. 2D), and processor B2 43D (FIG. 2D). In some configurations, processor B1 43C (FIG. 2D) can be the master of CANbus B 53B (FIG. 2B). Slaves on CANbus B 53B (FIG. 2B) can be processor B2 43C (FIG. 2D), processor A1 43A (FIG. 2C), and processor A2 43B (FIG. 2C). UCD 131 (FIG. 2A) can be the master of CANbus C 53C (FIG. 2B). Slaves on CANbus C 53C (FIG. 2B) can be power source controller 11A/B (FIG. 2B), processor A1 43A (FIG. 2C), processor A2 43B (FIG. 2C), processor B1 43C (FIG. 2D), and processor B2 43D (FIG. 2D). The master node (any of processors 43A-43D (FIG. 2C/D) or UCD 131 (FIG. 2A)) can send data to or request data from the slaves.

Referring now primarily to FIGS. 2C/2D, in some configurations, power base 160 can include redundant processor sets A/B 39/41 that can control clusters 121 (FIG. 1) and rotating drive wheels 101/102 (FIG. 1). Right/left wheel motor drives A/B 19/21, 31/33 can drive right/left wheel motors A/B 85/87, 91/93 that drive wheels 101/102 (FIG. 1) on the right and left sides of transporter 120 (FIG. 1). Wheels 101/102 (FIG. 1) can be coupled to drive together. Turning can be accomplished by driving left wheel motors A/B 87/93 and right wheel motors A/B 85/91 at different rates. Cluster motor drive A/B 1050/27 can drive cluster motors A/B 83/89 that can rotate the wheel base in the fore/aft direction which can allow transporter 120 (FIG. 1) to remain level while front wheels 101 (FIG. 1) are higher or lower than rear wheels 102 (FIG. 1). Cluster motors A/B 83/89 can keep transporter 120 (FIG. 1) level when climbing up and down curbs, and can rotate the wheel base repeatedly to climb up and down stairs. Seat motor drive A/B 25/37 can drive seat motors A/B 45/47 that can raise and lower seat 105 (FIG. 1).

Continuing to further refer to FIGS. 2C/2D, cluster position sensors A/B 55/71 can sense the position of cluster 121 (FIG. 1) of wheels 101/102 (FIG. 1). The signals from cluster position sensors A/B 55/71 and seat position sensors A/B 67/81 can be communicated among processors 43A-43D and can be used by processor set A/B 39/41 to determine signals to be sent to, for example, right wheel motor drive A/B 19/31, cluster motor drive A/B 15/27 and seat motor drive A/B 25/37. The independent control of clusters 121 (FIG. 1) and drive wheels 101/102 (FIG. 1) can allow transporter 120 (FIG. 1) to operate in several modes, thereby allowing processors 43A-43D to switch between modes, for example, in response to the local terrain. The mode switch can occur, for example, automatically and/or at the request of a user.

Continuing to still further refer to FIGS. 2C/2D, inertial sensor packs 1070, 23, 29, 35 can sense, for example, but not limited to, the orientation of transporter 120 (FIG. 1). Each processor 43A-43D can include, in inertial sensor packs 1070, 23, 29, 35, accelerometers and gyroscopes. In some configurations, each inertial sensor pack 1070, 23, 29, 35 can include, but is not limited to including, four sets of three-axis accelerometers and three-axis gyros. The accelerometer and gyro data can be fused on each of processors 43A-43D. Each processor 43A-43D can produce a gravity vector that can be used to compute the orientation and inertial rotation rates of power base 160 (FIG. 1). The fused data can be shared across processors 43A-43D and can be subjected to threshold criteria. The threshold criteria can be used to improve the accuracy of device orientation and inertial rotation rates. For example, fused data from certain of processors 43A-43D that exceed certain thresholds can be discarded. The fused data from each of processors 43A-43D that are within pre-selected limits can be, for example, but not limited to, averaged or processed in any other form. Inertial sensor packs 1070, 23, 29, 35 can include, but are not limited to including, sensors such as, for example, ST®microelectronics LSM330DLC, or any sensor supplying a 3D digital accelerometer and a 3D digital gyroscope, or further, any sensor that can measure gravity and body rates. Sensor data can be subject to processing, for example, but not limited to, filtering to improve control of transporter 120 (FIG. 1).

Continuing to still further refer primarily to FIGS. 2C/2D, power base 160 (FIG. 1) can include sensors such as, for example, but not limited to, ALLEGRO™ ACS709 current sensor IC, or any sensor that can sense at least a pre-selected number of motor currents, has bi-directional sensing, has user-selectable over-current fault setting, and can handle peak currents above a pre-selected fault limit. Cluster position sensors A/B 55/71, seat position sensors A/B 67/81, and manual brake release sensors A/B 61/75 can include but are not limited to including, Hall sensors.

Figure 3A:
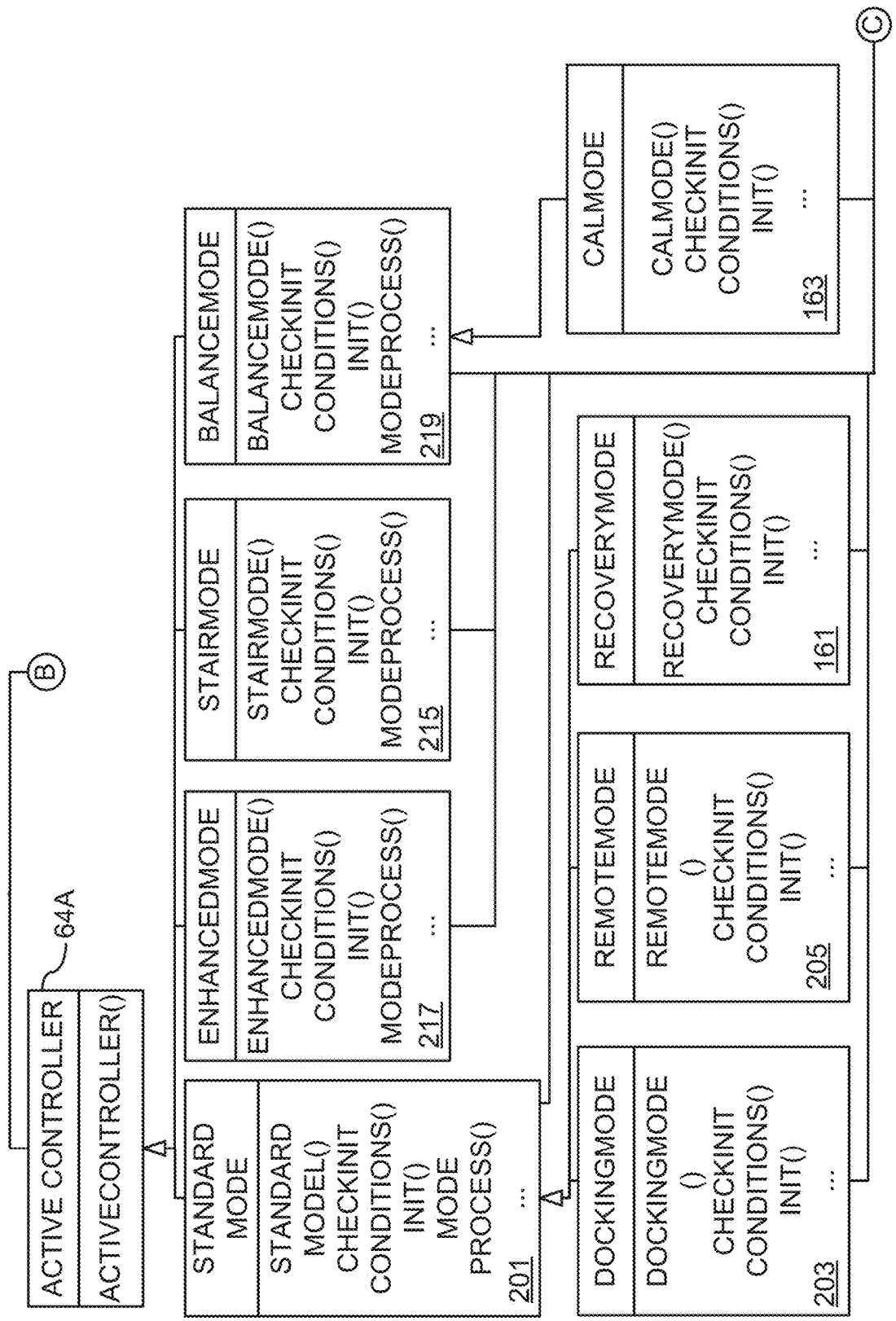
FIGS. 3A-3B are schematic block diagrams of mode processing of the present teachings.
Figure 3B:
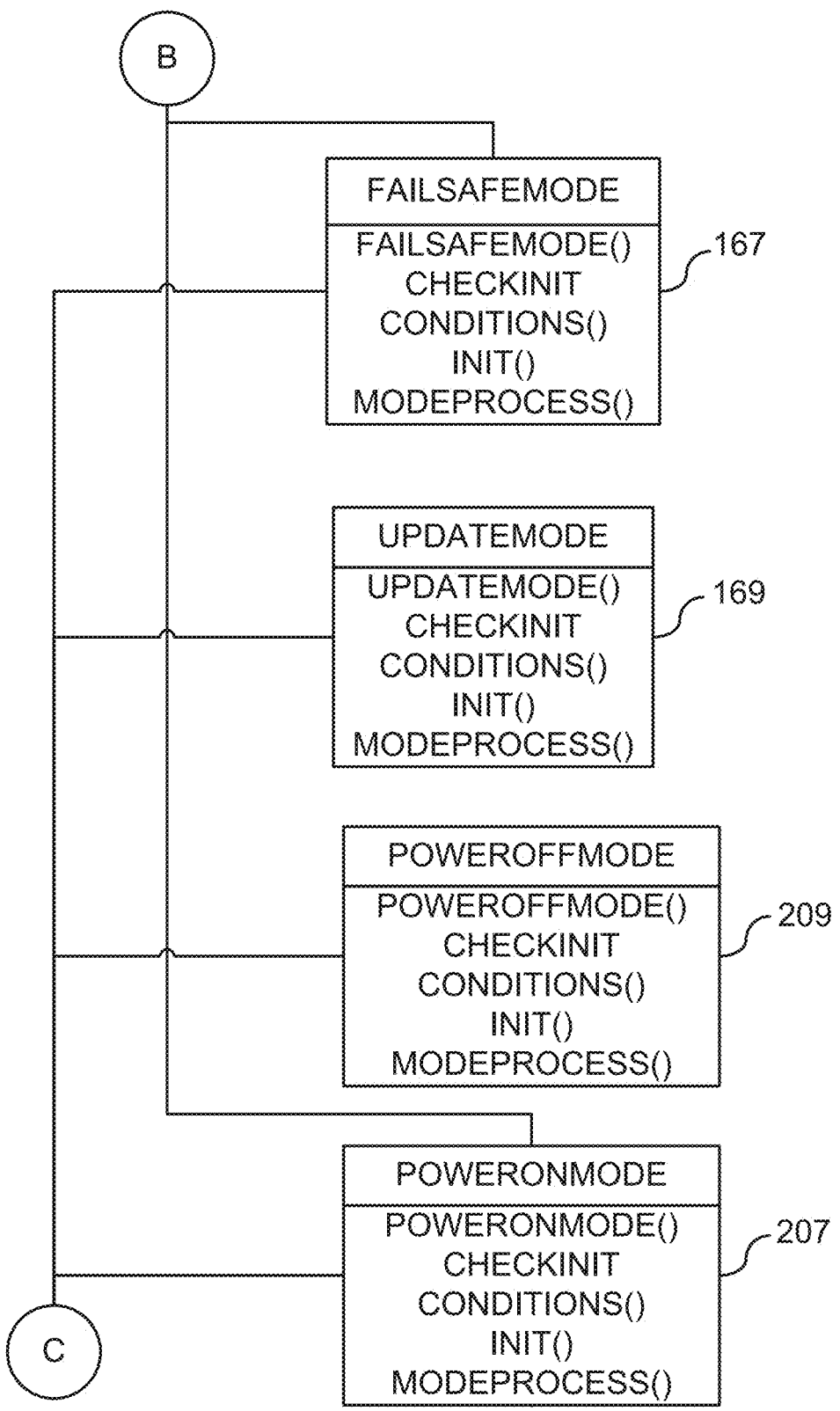

Referring now primarily to FIG. 3A, in some configurations, power base processors 100 (FIG. 4) can support at least one operating mode, and active controller 64A can enable navigation among modes. The at least one operating mode can include, but is not limited to including, standard mode 201 (described with respect to FIG. 1), enhanced mode 217 (described with respect to FIG. 1), balance mode 219 (described with respect to FIG. 1), stair mode 215 (described with respect to FIG. 1), docking mode 203 (described with respect to FIG. 1), and remote mode 205 (described with respect to FIG. 1). Service modes can include, but are not limited to including, recovery mode 161, failsafe mode 167 (FIG. 3B), update mode 169 (FIG. 3B), self-test mode 171 (FIG. 3B), calibrate mode 163, power on mode 207 (FIG. 3B), and power off mode 209 (FIG. 3B). With respect to recovery mode 161, if a power off occurs when transporter 120 (FIG. 1) is not in one of a pre-selected set of modes, such as for example, but not limited to, standard mode 201, docking mode 203, or remote mode 205, transporter 120 (FIG. 1) can enter recovery mode 161 to safely reposition transporter 120 (FIG. 1) into the driving position of standard mode 201. During recovery mode 161, power base processors 100 (FIG. 4) can select certain components to activate such as, for example, seat motor drive A/B 25/37 (FIG. 2C/2D) and cluster motor drive A/B 1050/27 (FIG. 2C/2D). Functionality can be limited to, for example, controlling the position of seat 105 (FIG. 1) and cluster 121 (FIG. 1).

Referring now primarily to FIG. 3B, transporter 120 (FIG. 1) can be transitioned into failsafe mode 167 when transporter 120 (FIG. 1) can no longer effectively operate. In failsafe mode 167, at least some active operations can be halted to protect against potentially erroneous or uncontrolled motion. Transporter 120 (FIG. 1) can be transitioned from standard mode 201 (FIG. 3A) to update mode 169 to, for example, but not limited to, enable communications with external applications 140 (FIG. 4) that can be executing external to power base 160 (FIG. 1). Transporter 120 (FIG. 1) can be transitioned to self-test mode 171 when transporter 120 (FIG. 1) is first powered. In self-test mode 171, electronics in power base 160 (FIG. 1) can perform self diagnostics and can synchronize with one another. In some configurations, system self-tests can be performed to check the integrity of systems that are not readily testable during normal operation, for example, memory integrity verification tests and disable circuitry tests. While in self-test mode 171, operational functions can be disabled.

Referring now primarily to FIG. 4, transporter control system 200A can include, but is not limited to including, at least one power base processor 100 and at least one power source controller 11 that can bi-directionally communicate over serial bus 143 with system serial bus messaging system 130F. System serial bus messaging 130F can bi-directionally communicate with I/O interface 130G, external communications 130D, UCP 130, and UCP assist 145. UCP 130 and UCP assist 145 can access peripherals, processors, and controllers through interface modules that can include, but are not limited to including, input/output (I/O) interface 130G, system serial bus (SSB) messaging interface 130F, and external communications interface 130D. In some configurations, I/O interface 130G can transmit/receive messages to/from, for example, but not limited to, at least one of audio interface 150, electronic interface 149, manual interface 153, and visual interface 151. Audio interface 150 can transmit data from, for example, UCP 130 to audio devices such as, for example, speakers that can project, for example, alerts when transporter 120 (FIG. 1) requires attention. Electronic interface 149 can transmit/receive messages to/from, for example, but not limited to, sensors 147. Sensors 147 can include, but are not limited to including, time-of-flight cameras and other sensors. Manual interface 153 can transmit/receive messages to/from, for example, but not limited to, joystick 133 (FIG. 5B) and/or switches/buttons 141/B/C (FIG. 6), and/or information lighting such as LED lights, and/or display 137 (FIG. 5A) having, for example, a touch screen. UCP 130 and UCP assist 145 can transmit/receive information to/from I/O interface 130G, system serial bus messaging 130F, external communications 130D, and each other.

Continuing to refer primarily to FIG. 4, system serial bus interface 130F can enable communications among UCP 130, UCP assist 145, power base processors (PBPs) 100 (also shown, for example, as processor A1 43A (FIG. 2C), processor A2 43B (FIG. 2C), processor B1 43C (FIG. 2D), and processor B2 43D (FIG. 2D)), and power source controllers 11 (also shown, for example, as power source controller A 11A (FIG. 2B) and power source controller B 11B (FIG. 2B)). Messages described herein can be exchanged among UCP 130, UCP assist 145, and PBPs 100 using, for example, but not limited to, system serial bus 143. External communications interface 130D can enable communications among, for example, UCP 130, UCP assist 145, and external applications 140 using wireless communications 144 such as, for example, but not limited to, BLUETOOTH® technology. UCP 130 and UCP assist 145 can transmit/receive messages to/from sensors 147 that can be used to enable automatic and/or semi-automatic control of transporter 120 (FIG. 1).

Figure 5A:
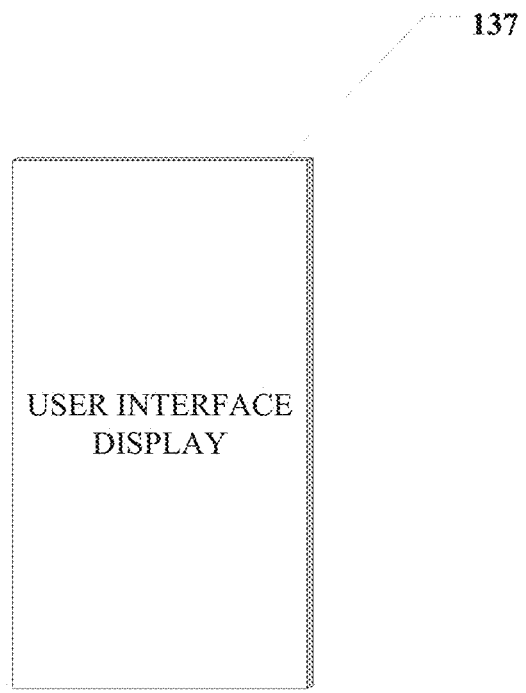
FIG. 5A is a line-drawing representation of an exemplary visual interface of the present teachings.
Figure 5B:
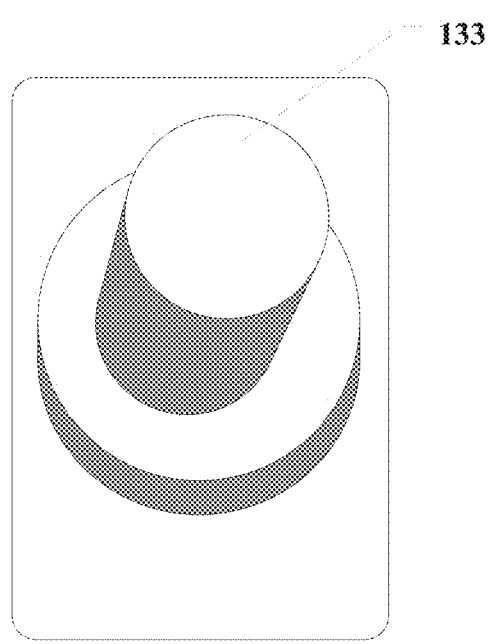
FIG. 5B is a line-drawing representation of an exemplary manual interface of the present teachings.
Figure 6:
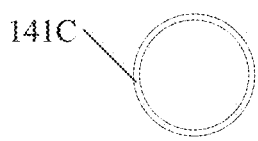
FIG. 6 is a line-drawing representation of exemplary manual interface switches/buttons of the present teachings.
Figure 6:
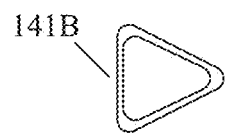
Figure 6:

Referring now primarily to FIGS. 5A, 5B, and 6, switches and buttons 141A/B/C (FIG. 6) associated with transporter 120 (FIG. 1) can generate, upon activation, signals to I/O interface 130G (FIG. 4). The signals can be decoded and debounced by, for example, UCP 130 (FIG. 4) and/or PBPs 100 (FIG. 4). Examples of functions that can be enabled by switches/buttons 141A/B/C (FIG. 6) can include, but are not limited to including, height of seat 105 (FIG. 1), lean of seat 105 (FIG. 1), mode selection, drive setting menu selection, disabling joystick 133 (FIG. 5B), selection confirmation, power off request, alarm status acknowledgement, and horn actuation. An alert, such as a flashing icon, can be provided to bring a condition to the attention of the user. The conditions can include, but are not limited to including, low battery, service required, temperature out of range, parking brake manually overridden that could be inhibiting a user-requested a power off, and a critical fault, warning, or alert. Switches/buttons 141A/B/C (FIG. 6) can have functionality that is context-dependant and can have secondary functionality that occurs if, for example, switches/button 141A/B/C (FIG. 6) are depressed for a certain period of time. Certain switches/buttons 141A/B/C (FIG. 6) can be disabled if, for example, a mode change occurs and/or the battery charger is connected. When joystick 133 (FIG. 5B) is disabled, certain other functions can be disabled such as, for example, but not limited to, mode selection, drive menu selection, and adjustments to seat 105 (FIG. 1). Disabled switches/buttons 141A/B/C (FIG. 6) can be re-enabled under certain conditions such as, for example, when associated switches/buttons 141A/B/C (FIG. 6) are released. In some configurations, button 141C (FIG. 6) can provide a way to indicate power on, and can also provide an indication of device status and/or a means to acknowledge device status. In some configurations, button 141B (FIG. 6) can provide, for example, a hazard flasher and/or a power on flasher. In some configurations, button 141A (FIG. 6) can provide a means to enable a horn and/or a confirmation of a selection.

Figure 6A:
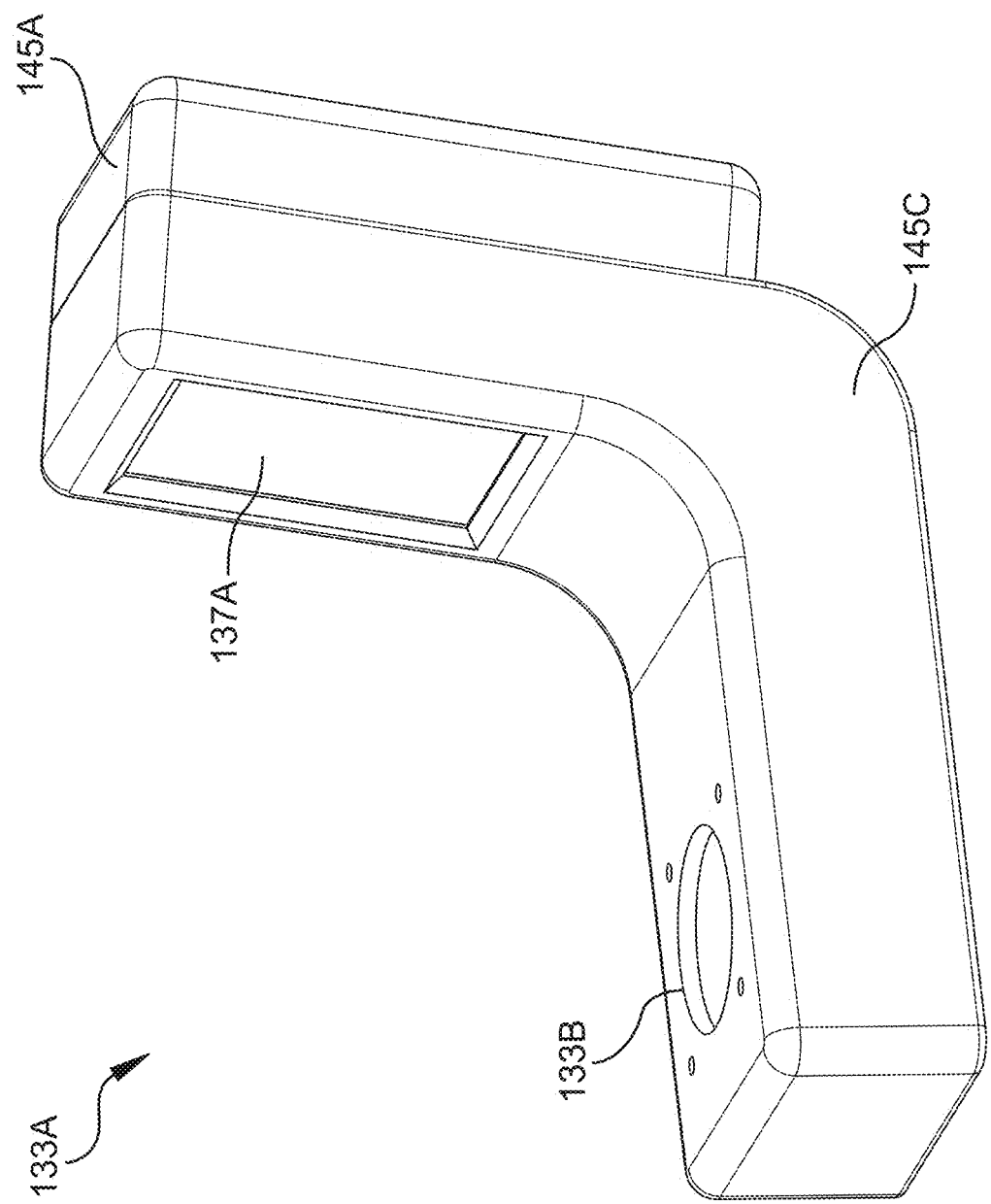
FIG. 6A is a schematic representation of the user control device case of the present teachings.

Referring now primarily to FIG. 6A, UCD holder 133A can house manual and visual interfaces such as, for example, joystick 133 (FIG. 5B), display 137 (FIG. 5A), and associated electronics. Connector 133C (FIG. 6B2) can allow connection to UCP assist 145 (FIG. 4). In some configurations, UCP assist holder 145A can be attached to visual/manual interface holder 145C tool-lessly. UCP assist holder 145A can house UCP assist 145 that can include sensor 147A (FIG. 12A). Sensor 147A (FIG. 12A) can include, but is not limited to including, an OPT8241 time-of-flight sensor from TEXAS INSTRUMENTS®, or any device that can provide a three-dimensional location of the data sensed by sensor 147A (FIG. 12A). UCP assist holder 145A and connector 133C (FIG. 6B2) can be located anywhere on transporter 120 (FIG. 1) and may not be limited to being mounted on visual/manual interface holder 145C.

Referring now primarily to FIGS. 6B1 and 6B2, manual/visual interface holder 145C can include, but is not limited to including, visual interface viewing window 137A (FIG. 6B1) and manual interface mounting cavity 133B (FIG. 6B1) available on first side 133E (FIG. 6B1) of manual/visual interface holder 145C. Connector 133C (FIG. 6B2) can be provided on second side 133D (FIG. 6B2) of manual/visual interface holder 145C. Any of viewing window 137A (FIG. 6B1), manual interface mounting cavity 133B (FIG. 6B1), and connector 133C (FIG. 6B2) can be located on any part of manual/visual interface holder 145C, or can be absent altogether. Manual/visual interface holder 145C, visual interface viewing window 137A (FIG. 6B1), manual interface mounting cavity 133B (FIG. 6B1), and connector 133C (FIG. 6B2) can be any size. Manual/visual interface holder 145C can be constructed of any material suitable for mounting visual interface viewing window 137A (FIG. 6B1), manual interface mounting cavity 133B (FIG. 6B1), and connector 133C (FIG. 6B2). Angle 145M can be associated with various orientations of UCD holder 133A and thus can be various values. UCD holder 133A can have a fixed orientation or can be hinged.

Referring now primarily to FIGS. 6B3 and 6B4, UCP assist holder 145A can include, but is not limited to including, filter cavity 136G and lens cavity 136F providing visibility to, for example, but not limited to, a time-of-flight sensor optical filter and lens such as, for example, but not limited to, OPT8241 3D time-of-flight sensor by TEXAS INSTRUMENTS®. UCP assist holder 145A can be any shape and size and can be constructed of any material, depending on the mounting position on transporter 120 and the sensors, processors, and power supply, for example, provided within UCP assist holder 145A. Rounded edges on cavities 136G and 136F, on casing 136E, as well as on holder 145A can be replaced by any shape of edge. Cavity 136H can house controlling electronics.

Referring now primarily to FIGS. 6C1 and 6C2, connector 133C can include, but is not limited to including, connector lead 133G (FIG. 6C1) on connector first side 133H (FIG. 6C1) and connector pins 133F that can protrude from connector second side 133I (FIG. 6C2). Connector lead 133G (FIG. 6C1) and connector pins 133F can be any size and shape, and there can be any number of connector leads 133G (FIG. 6C1) and connector pins 133F. Further, there can be any number of connectors 133C.

Referring now primarily to FIGS. 6D1 and 6D2, mounting board 134J can include, but is not limited to including, pin holes 134D, mounting holes 134C, and alignment features 134B. Mounting board first side 134A can be identical to mounting board second side 134E, or mounting board first side 134A can have different features from mounting board second side 134E. Mounting holes 134C, pin holes 134D, and alignment features 134B can be any size and/or shape, and there can be any number of mounting holes 134C, pin holes 134D and alignment features 134B. Mounting board 134J can be used to mount connector 133C (FIGS. 6C1/6C2). In some configurations, mounting board 134J can include pin holes 134D that can accommodate connector pins 133F (FIGS. 6C1/6C2). Mounting board 134J can be provided in multiple pieces and shapes to accommodate connector(s) 133C (FIGS. 6C1/6C2).

Referring now to FIGS. 6D3 and 6D4, connector pins 133F can be inserted into pin holes 134D to mount connector 133C on mounting board 134J. Connector leads 133G can project from mounting board first side 134A (FIG. 6D3), and connector pins 133F can protrude from mounting board second side 134E (FIG. 6D4). Connector 133C can be positioned anywhere on mounting board 134J, and can cross multiple mounting boards 134J. Multiple of connectors 133C can be mounted on mounting board 134J.

Referring now primarily to FIGS. 6D5 and 6D6, in some configurations, second configuration connector 139D can be mounted on mounting board 134J (FIG. 6D1) to mount UCP assist holder 145A (FIG. 6A). Arched lead 139A on second configuration connector first side 139E can form cavity 139B into which mated connectors (not shown) from UCP assist holder 145A (FIG. 6A) can be inserted. Second configuration connector second side 139F can include protruding of second configuration connector pins 139C that can be inserted into mounting board 134J (FIG. 6D1).

Referring now primarily to FIG. 6E, transporter 120 (FIG. 1) can be fitted with any number of sensors 147 (FIG. 4) in any configuration. In some configurations, some of sensors 147 (FIG. 4) can be mounted on transporter rear 122 to accomplish specific goals, for example, backup safety. Stereo color cameras/illumination 122A, ultrasonic beam range finder 122B, time-of-flight cameras 122D/122E, and single point LIDAR sensors 122F can be mounted, for example, but not limited to, to cooperatively sense obstacles behind transporter 120 (FIG. 1). PBPs 100 (FIG. 4) and/or UCP assist 145 (FIG. 4) can receive messages that can include information from the cameras and sensors, and can enable transporter 120 (FIG. 1) to react to what might be happening out of the view of the user. Transporter 120 (FIG. 1) can also include reflectors 122C that can be optionally fitted with further sensors. Stereo color cameras/illumination 122A can also be used as taillights. Other types of cameras and sensors can be mounted on transporter 120 (FIG. 1). Information from the cameras and sensors can be used to enable a smooth transition to balance mode 219 (FIG. 3A) by providing information to UCP assist 145 (FIG. 4) to enable UCP assist 145 (FIG. 4) to locate any obstacles that might impeded the transition to balance mode 219 (FIG. 3A).

Referring now primarily to FIG. 7A, SSB 143 (FIG. 4) can provide communications through use of, for example, a CAN Bus protocol. Devices connected to SSB 143 (FIG. 4) can be programmed to respond/listen to specific messages received, processed, and transmitted by SSB messaging 130F (FIG. 4). Messages can include packets, which can include, but are not limited to including, eight bytes of data and a CAN Bus device identification that can identify the source of the packet. Devices receiving CAN bus packets can ignore invalid CAN bus packets. When an invalid CAN bus packet is received, the received device can take alternative measures, depending on, for example, the current mode of transporter 120 (FIG. 1), the previous CAN bus messages, and the receiving device. The alternate measures can, for example, maintain stability of transporter 120 (FIG. 1). The bus master of SSB 143 (FIG. 4) can transmit master sync packet 901 to establish a bus alive sequence on a frame basis and synchronize the time base.

Referring now primarily to FIG. 7B, user control panel packet #1 903 (FIG. 7A) can include eight bytes and can have, for example, packet format 701. Packet format 701 can include, but is not limited to including, status 701A, error device identification 701B, mode requested 701C, control out byte 701D, commanded velocity 701E, commanded turn rate 701F, seat control byte 701G, and system data 701H. Status 701A can include, but is not limited to including, possibilities such as, for example, self test in progress, device okay, non-fatal device failure (data OK), and fatal device failure in which receiving devices can ignore the data in the packet. If UCP 130, for example, receives a device failure status, UCP 130 can post an error to, for example, a graphical user interface (GUI) on display 137 (FIG. 5A). Error device ID 701B can include the logical ID of the device for which received communications has been determined to be erroneous. Error device ID 701B can be set to zero when no errors are received.

Referring now primarily to FIG. 7C, mode requested code 701C (FIG. 7B) can be defined such that a single bit error may not indicate another valid mode. For example, mode codes can include, but are not limited to including, self-test, standard, enhanced, stair, balance, docking, remote, calibration, update, power off, power on, fail safe, recovery, flasher, door, mobile storage, static storage/charging, rest room, elevator, and enhanced stair, the meanings of which are discussed herein. Mode requested code 701C can indicate if the mode being requested should be processed to (1) either maintain the current mode or execute an allowed mode change or (2) enable situation-dependent processing. In some configurations, special situations can require automatic control of transporter 120 (FIG. 1). For example, transporter 120 (FIG. 1) can transition from stair mode 215 (FIG. 3A) automatically to enhanced mode 217 (FIG. 3A) when transporter 120 (FIG. 1) has reached a top landing of a staircase. In some configurations, PBPs 100 (FIG. 4) and/or UCP assist 145 (FIG. 4) can, for example, but not limited to, modify the response of PBPs 100 (FIG. 4) to commands from joystick 133 (FIG. 1), for example, by setting transporter 120 (FIG. 1) to a particular mode. In some configurations, transporter 120 (FIG. 1) can automatically be set to a slow driving mode when transporter 120 (FIG. 1) is transitioned out of stair mode 215 (FIG. 3A). In some configurations, when transporter 120 (FIG. 1) transitions from stair mode 215 (FIG. 3A) automatically to enhanced mode 217 (FIG. 3A), joystick 133 (FIG. 1) can be disabled. When a mode is selected by any of UCP assist 145 (FIG. 4), UCP 130 (FIG. 4) through, for example, but not limited to, user entry, and/or PBPs 100 (FIG. 4), mode availability can be determined based at least in part on current operating conditions.

Figure 8:
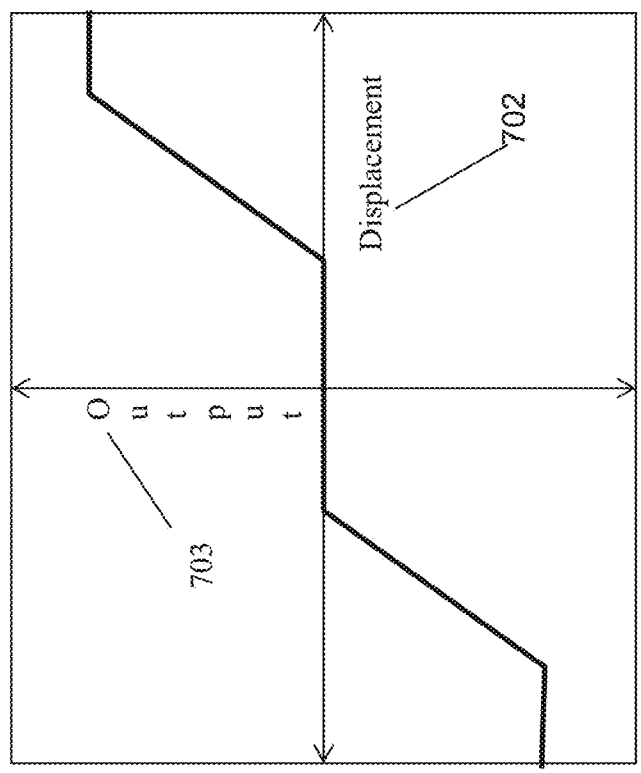
FIG. 8 is a graph of a manual interface response template of the present teachings.

Continuing to refer primarily to FIG. 7C, in some configurations, if a transition is not allowed to a user-selected mode from the current mode, the user can be alerted. Certain modes and mode transitions can require user notification and possibly user assistance. For example, adjustments to seat 105 (FIG. 1) can be needed when positioning transporter 120 (FIG. 1) for a determination of the center of gravity of transporter 120 (FIG. 1) along with the load on transporter 120 (FIG. 1). The user can be prompted to perform specific operations based on the current mode and/or the mode to which the transition can occur. In some configurations, transporter 120 (FIG. 1) can be configured for, for example, but not limited to, fast, medium, medium dampened, or slow speed templates. The speed of transporter 120 (FIG. 1) can be modified by using, for example, speed template 700 (FIG. 8) relating output 703 (FIG. 8) (and wheel commands) to joystick displacement 702 (FIG. 8).

Referring now to FIG. 7D, control out byte 701D (FIG. 7B) can include, but is not limited to including, bit definitions such as, for example, but not limited to, OK to power down 801A, drive selection 801B, emergency power off request 801C, calibration state 801D, mode restriction 801E, user training 801F, and joystick centered 801G. In some configurations, OK to power down 801A can be defined to be zero if power down is not currently allowed, and drive selection 801B can be defined to specify motor drive 1 (bit 6=0) or motor drive 2 (bit 6=1). In some configurations, emergency power off request 801C can be defined to indicate if an emergency power off request is normal (bit 5=0), or an emergency power off request sequence is in process (bit 5=1), and calibration state 801D can be defined to indicate a request for user calibration (bit 4=1). In some configurations, mode restriction 801E can be defined to indicate whether or not there are restrictions for entering a particular mode. If the mode can be entered without restriction, bit 3 can be zero. If there are restrictions to entering a mode, for example, but not limited to, balance-critical modes can require certain restrictions to maintain the safety of the passenger of transporter 120 (FIG. 1), bit 3 can be one. User training 801F can be defined to indicate if user training is possible (bit 2=1), or not (bit 2=0), and joystick centered 801G can be defined to indicate if joystick 133 (FIG. 1) is centered (bits 0-1=2), or not (bits 0-1=1).

Referring again primarily to FIG. 7B, commanded velocity 701E can be, for example, a value representing forward or reverse speed. Forward velocity can be a positive value and reverse velocity can be a negative value, for example. Commanded turn rate 701F can be a value representing a left or right commanded turn rate. A left turn can be a positive value and a right turn can be a negative value. The value can represent the differential velocity between the left and right of wheels 101/102 (FIG. 1) equivalently scaled to commanded velocity 701E.

Referring again primarily to FIG. 7D, joystick 133 (FIG. 1) can have multiple redundant hardware inputs. Signals such as, for example, commanded velocity 701E (FIG. 7B), commanded turn rate 701F (FIG. 7B), and joystick-centered 801G can be received and processed. Commanded velocity 701E (FIG. 7B) and commanded turn rate 701F (FIG. 7B) can be determined from a first of the multiple hardware inputs, and joystick-centered 801G can be determined from a second of the hardware inputs. Values of joystick-centered 801G can indicate when a non-zero of commanded velocity 701E (FIG. 7B) and a non-zero of commanded turn rate 701F (FIG. 7B) are valid. Fault conditions for joystick 133 (FIG. 1) in, for example, the X and Y directions can be detected. For example, each axis of joystick 133 (FIG. 1) can be associated with dual sensors. Each sensor pair input (X (commanded velocity 701E (FIG. 7B)) and Y (command turn rate 701F (FIG. 7B)) can be associated with an independent A/D converter, each with a voltage reference channel check input. In some configurations, commanded velocity 701E (FIG. 7B) and commanded turn rate 701F (FIG. 7B) can be held to zero by the secondary input to avoid mismatch. If joystick-centered 801G is within a minimum deadband, or joystick 133 (FIG. 1) is faulted, joystick 133 (FIG. 1) can be indicated as centered. A deadband can indicate the amount of displacement of joystick 133 (FIG. 1) that can occur before a non-zero output from joystick 133 (FIG. 1) can appear. The deadband range can set the zero reference region to include an electrical center position that can be, for example, but not limited to, 45% to 55% of the defined signal range.

Referring now primarily to FIG. 7E, seat control byte 701G (FIG. 7B) can convey seat adjustment commands. Frame lean command 921 can include values such as, for example, invalid, lean forward, lean rearward, and idle. Seat height command 923 can include values such as, for example, invalid, lower seat down, raise seat up, and idle.

Referring again to FIG. 7A, user control packets 905 can include header, message ID, and data for messages traveling primarily to and from external applications 140 (FIG. 4) through, for example, but not limited to, a BLUETOOTH® connection. PBPs packet 907 can include data originated by PBPs 100 (FIG. 4) and destined for PSCs 11 (FIG. 4). PBP A1 43A (FIG. 2C), for example, can be designated the master of SSB 143 (FIG. 4), and PBP B1 43C (FIG. 2D), for example, can be designated as the secondary master of SSB 143 (FIG. 4) if PBP A1 43A (FIG. 2C) is no longer transmitting on the bus. The master of SSB 143 (FIG. 4) can transmit master sync packet 901 at a periodic rate, for example, but not limited to, every 20 ms+/−1%. Devices communicating using SSB 143 (FIG. 4) can synchronize the transmitting of messages to the beginning of master sync packet 901.

Referring now primarily to FIG. 8, joystick 133 (FIG. 1) can be configured to have different transfer functions to be used under different conditions according to, for example, the abilities of the user. Speed template (transfer function) 700 shows an exemplary relationship between physical displacement 702 of joystick 133 (FIG. 1) and output 703 of joystick 133 (FIG. 1) after transfer function processing. Forward and reverse travel of joystick 133 (FIG. 1) can be interpreted as forward longitudinal requests and reverse longitudinal requests, respectively, as viewed from a user in seat 105 (FIG. 1), and can be equivalent to commanded velocity 701E (FIG. 7), the X request value. Left and right travel of joystick 133 (FIG. 1) can be interpreted as left turn requests and right turn requests, respectively, as viewed from a user in seat 105 (FIG. 1), and can be equivalent to commanded turn rate 701F, the Y request value. Joystick output 703 can be modified during certain conditions such as, for example, but not limited to, battery voltage conditions, height of seat 105 (FIG. 1), mode, failed conditions of joystick 133 (FIG. 1), and when speed modification is requested by PBPs 100 (FIG. 4). Joystick output 703 can be ignored and joystick 133 (FIG. 1) can be considered as centered, for example, but not limited to, when a mode change occurs, or while in update mode 169 (FIG. 3B), or when the battery charger is connected, or when in stair mode, or when joystick 133 (FIG. 1) is disabled, or under certain fault conditions.

Continuing to refer primarily to FIG. 8, transporter 120 (FIG. 1) can be configured to suit a particular user. In some configurations, transporter 120 (FIG. 1) can be tailored to user abilities, for example, by setting speed templates and mode restrictions. In some configurations, transporter 120 (FIG. 1) can receive commands from external applications 140 (FIG. 4) executing on devices such as, for example, but not limited to, a cell phone, a computer tablet, and a personal computer. The commands can provide, for example, default and/or dynamically-determinable settings for configuration parameters. In some configurations, a user and/or an attendant can configure transporter 120 (FIG. 1).

Figure 9:
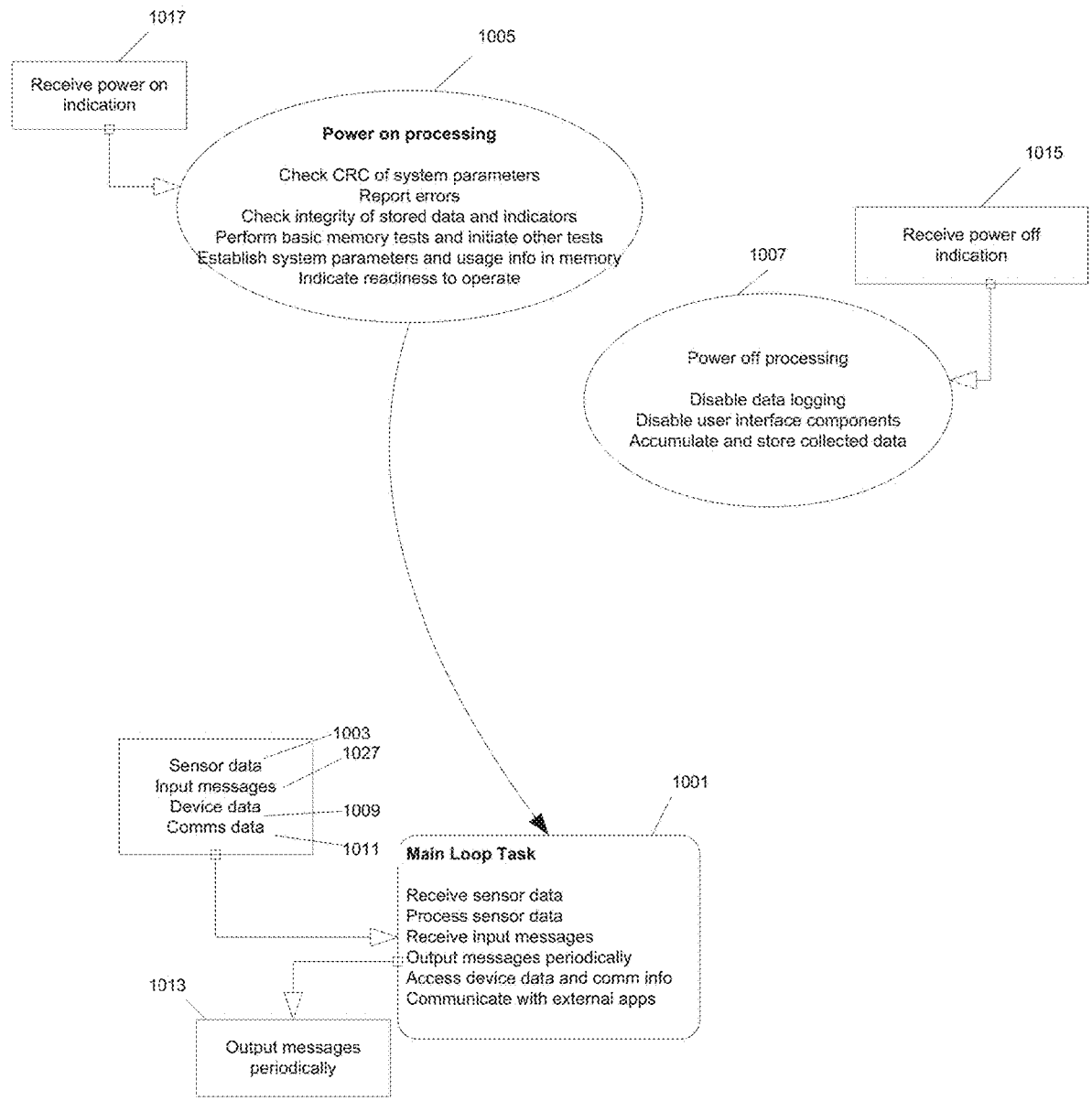
FIG. 9 is a control flow diagram of processing of the present teachings.

Referring now to FIG. 9, any of UCP 130, UCP assist 145, and/or PBPs 100 can execute a power up and processing sequence when UCP 130 (FIG. 4) and/or PBPs 100 (FIG. 4) and/or UCP assist 145 (FIG. 4) receive powered on indication 1017. Power on processing 1005 can include, but is not limited to including, integrity checks that can be performed on, for example, stored data and various indicators. Memory tests can be performed, system and configuration parameters can be established in memory, and a readiness to operate can be indicated, for example, but not limited to, by lighted LEDs. Power on processing 1005 can be followed by transitioning to main loop processing 1001 in which sensor data 1003 can be received and processed, input messages 1027 can be received, and output messages 1013 can be generated periodically, for example, but not limited to, once every frame of SSB 143 (FIG. 4). Device data 1009 and communications information 1011 can be accessed. Device data 1009 can include, but is not limited to including, a device status that can, for example, display device diagnostic data. In some configurations, communications with external applications 140 (FIG. 4) can be provided to gather information such as, for example, but not limited to, application code version numbers, application code CRC values, and protocol map compatibility information. UCP 130 (FIG. 4), UCP assist 145 (FIG. 4), and/or PBPs 100 (FIG. 4) can execute a power down sequence upon receiving power off request 1015. Ongoing activities such as, for example, but not limited to, data logging, and receiving data from, for example, switches/buttons 141A/B/C (FIG. 6), and joysticks 133 (FIG. 1), can be disabled and brought to a consistent close. Configuration, usage, service, security, and other information can be accumulated and stored during power off processing 1007.

Figure 10:
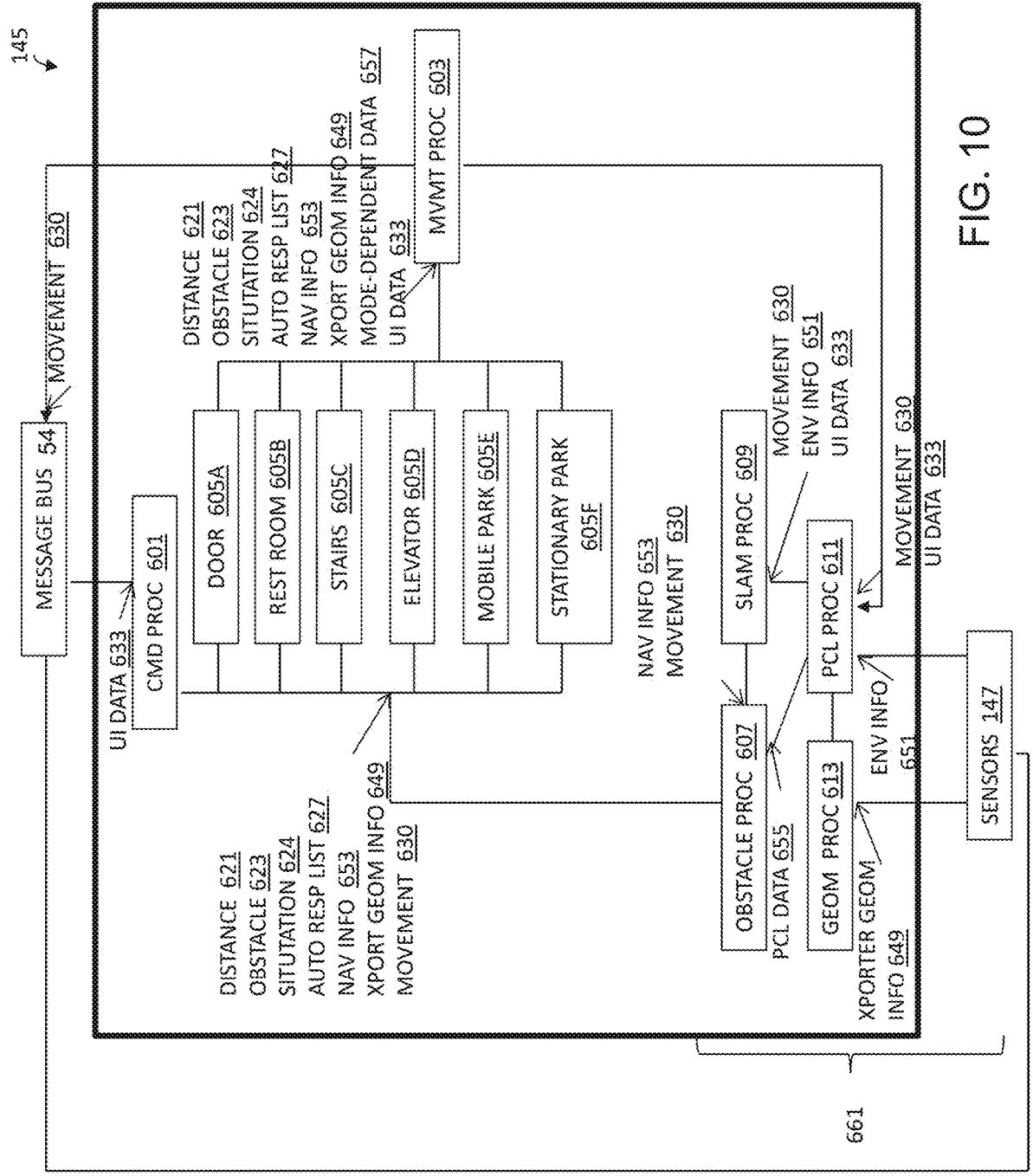
FIG. 10 is a schematic block diagram of the components of the UCP assist of the present teachings.

Referring now to FIG. 10, UCP assist 145 can provide enhanced functionality to a user, for example, but not limited to, assisting a user in avoiding obstacles, traversing doors, traversing stairs, traveling on elevators, and parking/transporting transporter 120 (FIG. 1). In general, UCP assist 145 can receive user input (for example UI data 633) and/or input from PBPs 100 (FIG. 4) through, for example, but not limited to, messages from user interface devices and sensors 147. UCP assist 145 can further receive sensor input through, for example, but not limited to sensor processing systems 661. UI data 633 and output from sensor processing systems 661, for example, can inform command processor 601 to invoke the mode that has been automatically or manually selected. Command processor 601 can pass UI data 633 and output from sensor processing systems 661 to a processor that can enable the invoked mode. The processor can generate movement commands 630 at least based on previous movement commands 630, UI data 633, and output from sensor processing systems 661.

Continuing to refer to FIG. 10, UCP assist 145 can include, but is not limited to including, command processor 601, movement processor 603, simultaneous location and mapping (SLAM) processor 609, point cloud library (PCL) processor 611, geometry processor 613, and obstacle processor 607. Command processor 601 can receive user interface (UI) data 633 from the message bus. UI data 633 can include, but is not limited to including, signals from, for example, joystick 133 (FIG. 1) providing an indication of a desired movement direction and speed of transporter 120 (FIG. 1). UI data 633 can also include selections such as an alternate mode into which transporter 120 (FIG. 1) could be transitioned. In some configurations, in addition to the modes described with respect to FIGS. 3A/3B, UCP assist 145 can process mode selections such as, but not limited to, door mode 605A, rest room mode 605B, enhanced stair mode 605C, elevator mode 605D, mobile park mode 605E, and static storage/charging mode 605F. Any of these modes can include a move-to-position mode, or the user can direct transporter 120 (FIG. 1) to move to a certain position. Message bus 54 can receive control information in the form of UI data 633 for transporter 120 (FIG. 1), and can receive a result of the processing done by UCP assist 145 in the form of commands such as movement commands 630 that can include, but are not limited to including, speed and direction. Movement commands 630 can be provided, by message bus 54, to PBPs 100 (FIG. 4) which can transmit this information to wheel motor drives 19/21/31/33 (FIGS. 2C/D) and cluster motor drives 1050/27 (FIGS. 2C/D). Movement commands 630 can be determined by movement processor 603 based on information provided by the mode-specific processors. Mode-specific processors can determine mode-dependent data 657, among other things, based on information provided through sensor-handling processors 661.

Continuing to refer primarily to FIG. 10, sensor-handling processors 661 can include, but are not limited to including, transporter geometry processor 613, PCL processor 611, SLAM processor 609, and obstacle processor 607. Movement processor 603 can provide movement commands 630 to the sensor-handling processors 661 to provide information necessary to determine future movements of transporter 120 (FIG. 1). Sensors 147 can provide environmental information 651 that can include, for example, but not limited to, obstacles 623 and geometric information about transporter 120 (FIG. 1). In some configurations, sensors 147 can include at least one time-of-flight sensor that can be mounted anywhere on transporter 120 (FIG. 1). There can be multiple of sensors 147 mounted on transporter 120 (FIG. 1). PCL processor 611 can gather and process environmental information 651, and can produce PCL data 655. The PCL, a group of code libraries for processing 2D/3D image data, can, for example, assist in processing environmental information 651. Other processing techniques can be used.

Continuing to refer primarily to FIG. 10, transporter geometry processor 613 can receive transporter geometry information 649 from sensors 147, can perform any processing necessary to prepare transporter geometry information 649 for use by the mode-dependent processors, and can provide the processed of transporter geometry information 649 to the mode-dependent processors. The geometry of transporter 120 (FIG. 1) can be used for, but is not limited to being used for, automatically determining whether or not transporter 120 (FIG. 1) can fit in and/or through a space such as, for example, a stairway and a door. SLAM processor 609 can determine navigation information 653 based on, for example, but not limited to, UI data 633, environmental information 651 and movement commands 630. Transporter 120 (FIG. 1) can travel in a path at least in part set out by navigation information 653. Obstacle processor 607 can locate obstacles 623 and distances 621 to obstacles 623. Obstacles 623 can include, but are not limited to including, doors, stairs, automobiles, and miscellaneous features in the vicinity of the path of transporter 120 (FIG. 1).

Figure 11B:
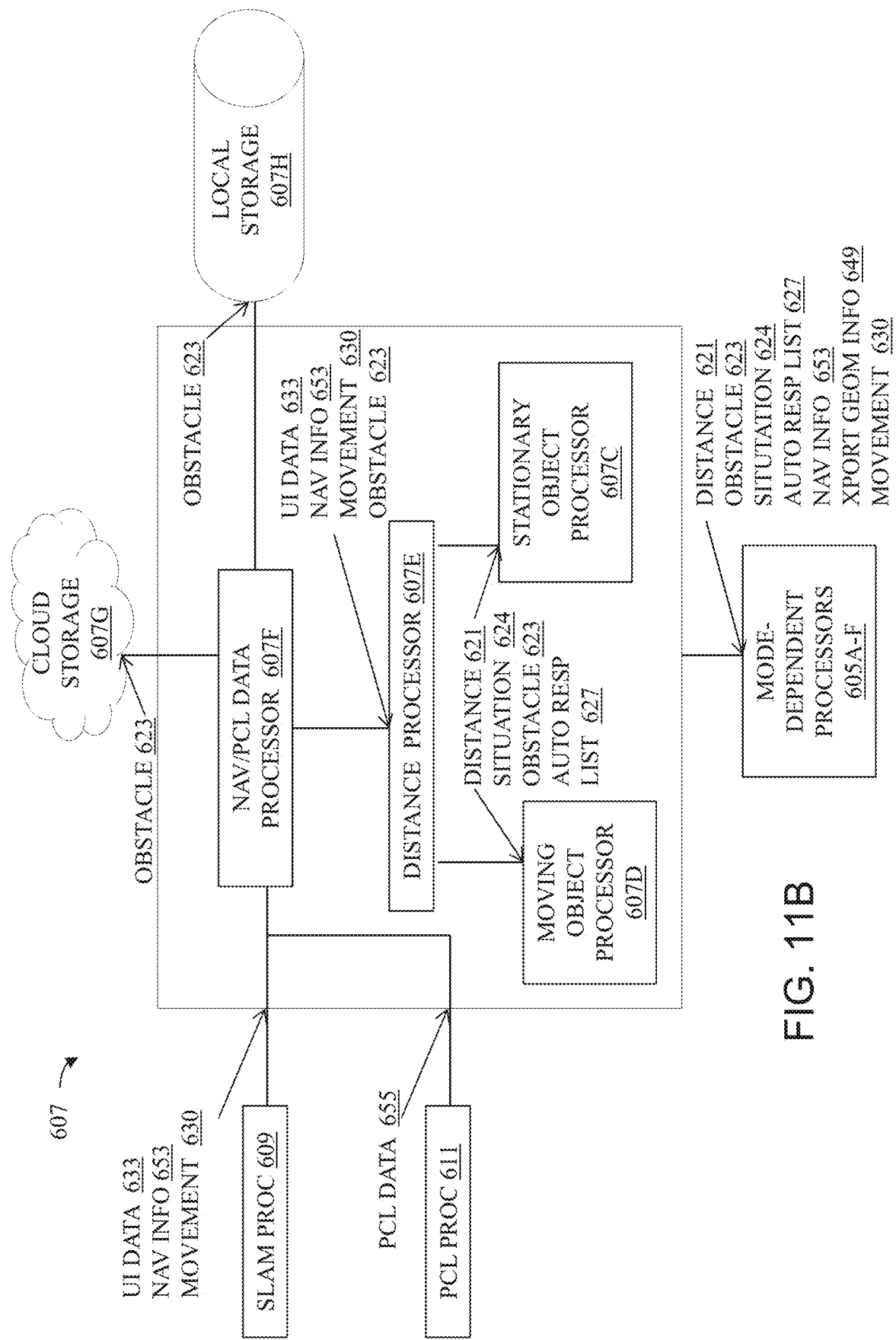
FIG. 11B is a schematic block diagram of the components of the obstacle detection of the present teachings.

Referring now to FIGS. 11A1 and 11A2, method 650 for processing at least one obstacle 623 (FIG. 11B) while navigating transporter 120 (FIG. 1) can include, but is not limited to including, receiving 1151 (FIG. 11A1) at least one movement command 630 (FIG. 11B), receiving and segmenting 1153 (FIG. 11A1) PCL data 655 (FIG. 11B), identifying 1155 (FIG. 11A1) at least one plane within the segmented PCL data 655 (FIG. 11B), and identifying 1157 (FIG. 11A1) at least one obstacle 623 (FIG. 11B) within the at least one plane. Method 650 can further include determining 1159 (FIG. 11A1) at least one situation identifier 624 (FIG. 11B) based at least on the at least one obstacle, UI data 633 (FIG. 11B), and movement commands 630 (FIG. 11B), and determining 1161 (FIG. 11A1) distance 621 (FIG. 11B) between transporter 120 (FIG. 1) and at least one obstacle 623 (FIG. 11B) based at least on at least one situation identifier 624 (FIG. 11B). Method 650 can also include accessing 1163 (FIG. 11A1) at least one allowed command related to distance 621 (FIG. 11B), at least one obstacle 623 (FIG. 11B), and at least one situation identifier 624 (FIG. 11B). Method 650 can still further include accessing 1163 (FIG. 11A1) at least one automatic response to the at least one allowed command, mapping 1167 (FIG. 11A2) at least one movement command 630 (FIG. 11B) with one of the at least one allowed commands, and providing 1169 (FIG. 11A2) at least one movement command 630 (FIG. 11B) and the at least one automatic response associated with the mapped allowed command to the mode-dependent processors.

Continuing to refer to FIGS. 11A1 and 11A2, at least one obstacle 623 (FIG. 11B) can optionally include at least one stationary object and/or at least one moving object. Distance 621 (FIG. 11B) can optionally include a fixed amount and/or a dynamically-varying amount. At least one movement command 630 (FIG. 11B) can optionally include a follow command, at least one pass-the-at-least-one-obstacle command, a travel beside-the-at-least-one-obstacle command, and a do-not-follow-the-at-least-one obstacle command. Method 650 can optionally include storing obstacle data 623 (FIG. 11B), and allowing access to stored obstacle data, for example, stored in cloud storage 607G (FIG. 11B) and/or local storage 607H (FIG. 11B), by systems external to transporter 120 (FIG. 1). PCL data 655 (FIG. 11B) can optionally include sensor data 147 (FIG. 10). Method 650 can optionally include collecting sensor data 147 (FIG. 10) from at least one time-of-flight sensor mounted on transporter 120 (FIG. 1), analyzing sensor data 147 (FIG. 10) using a point cloud library (PCL), tracking the at least one moving object using simultaneous location and mapping (SLAM) with detection and tracking of moving objects (DATMO) based on the location of transporter 120 (FIG. 1), identifying the at least one plane within obstacle data 623 (FIG. 11B) using, for example, but not limited to, random sample consensus and a PCL library, and providing the at least one automatic response associated with the mapped allowed command to the mode-dependent processors. Method 650 can also optionally include receiving a resume command, and providing, following the resume command, at least one movement command 630 (FIG. 11B) and the at least one automatic response associated with the mapped allowed command to the mode-dependent processors. The at least one automatic response can optionally include a speed control command.

Referring now to FIG. 11B, obstacle processor 607 for processing at least one obstacle 623 while navigating transporter 120 (FIG. 1) can include, but is not limited to including, nav/PCL data processor 607F receiving and segmenting PCL data 655 from PCL processor 611, identifying at least one plane within the segmented PCL data 655, and identifying at least one obstacle 623 within the at least one plane. Obstacle processor 607 can further include distance processor 607E determining at least one situation identifier 624 based at least on UI data 633, at least one movement command 630, and at least one obstacle 623. Distance processor 607E can determine distance 621 between transporter 120 (FIG. 1) and at least one obstacle 623 based at least on at least one situation identifier 624. Moving object processor 607D and/or stationary object processor 607C can access at least one allowed command related to distance 621, at least one obstacle 623, and at least one situation identifier 624. Moving object processor 607D and/or stationary object processor 607C can access at least one automatic response, from automatic response list 627, associated with the at least one allowed command. Moving object processor 607D and/or stationary object processor 607C can access at least one movement command 630 including, for example, speed/signal command and direction command/signal, and map at least one movement command 630 with one of the at least one allowed commands. Moving object processor 607D and/or stationary object processor 607C can provide at least one movement command 630 and the at least one automatic response associated with the mapped allowed command to the mode-dependent processors.

Continuing to refer to FIG. 11B, stationary object processor 607C can optionally perform any special processing necessary when encountering at least one stationary object, and moving object processor 607D can optionally perform any special processing necessary when encountering at least one moving object. Distance processor 607E can optionally process distance 621 that can be a fixed and/or a dynamically-varying amount. At least one movement command 630 can optionally include a follow command, a pass command, a travel-beside command, a move-to-position command, and a do-not-follow command. Nav/PCL processor 607F can optionally store obstacles 623, for example, but not limited to, in local storage 607H and/or on storage cloud 607G, and can allow access to the stored obstacles 623 by systems external to transporter 120 (FIG. 1) such as, for example, but not limited to, external applications 140 (FIG. 4). PCL processor 611 can optionally collect sensor data 147 (FIG. 10) from at least one time-of-flight camera mounted on transporter 120 (FIG. 1), and can analyze sensor data 147 (FIG. 10) using a point cloud library (PCL) to yield PCL data 655. Moving object processor 607D can optionally track the at least one moving object using navigation information 653 collected by simultaneous location and mapping (SLAM) processor 609 based on the location of transporter 120 (FIG. 1), identify the at least one plane using, for example, but not limited to, random sample consensus and a PCL library, and can provide at least one movement command 630 based on the at least one automatic response associated with the mapped allowed command to the mode-dependent processors. Obstacle processor 607 can optionally receive a resume command, and provide, following the resume command, at least one movement command 630 based on the at least one automatic response associated with the mapped allowed command to the mode-dependent processors. The at least one automatic response can optionally include a speed control command. For example, if joystick 133 (FIG. 1) indicates a direction that could position transporter 120 (FIG. 1) in a collision course with obstacle 623, such as, for example, a wall, the at least one automatic response can include speed control to protect transporter 120 (FIG. 1) from a collision. The at least one automatic response could be overridden by a contrary user command, for example, joystick 133 (FIG. 1) could be released and movement of transporter 120 (FIG. 1) could be halted. Joystick 133 (FIG. 1) could then be re-engaged to restart movement of transporter 120 (FIG. 1) towards obstacle 623.

Figure 12C:
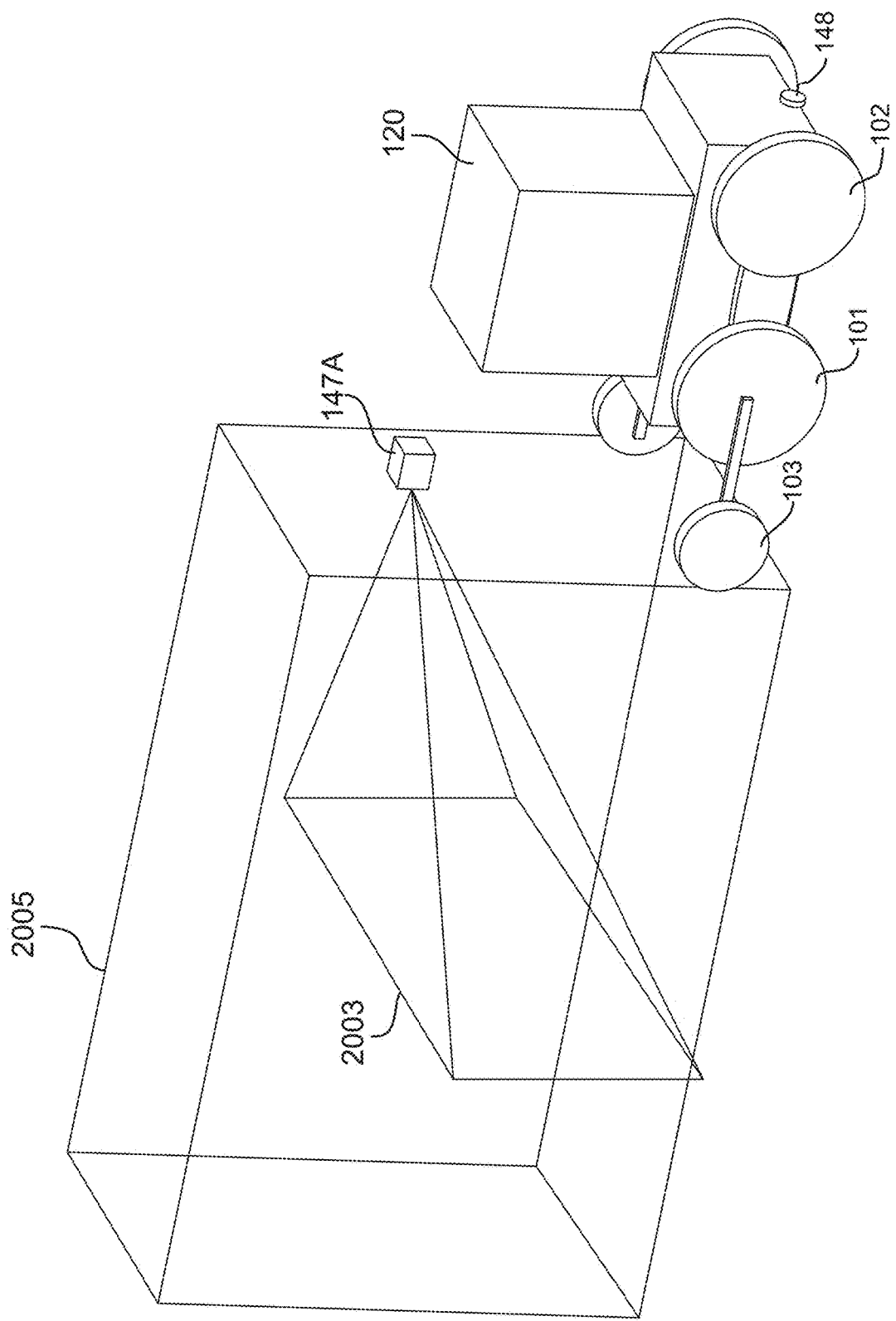
Figure 12D:
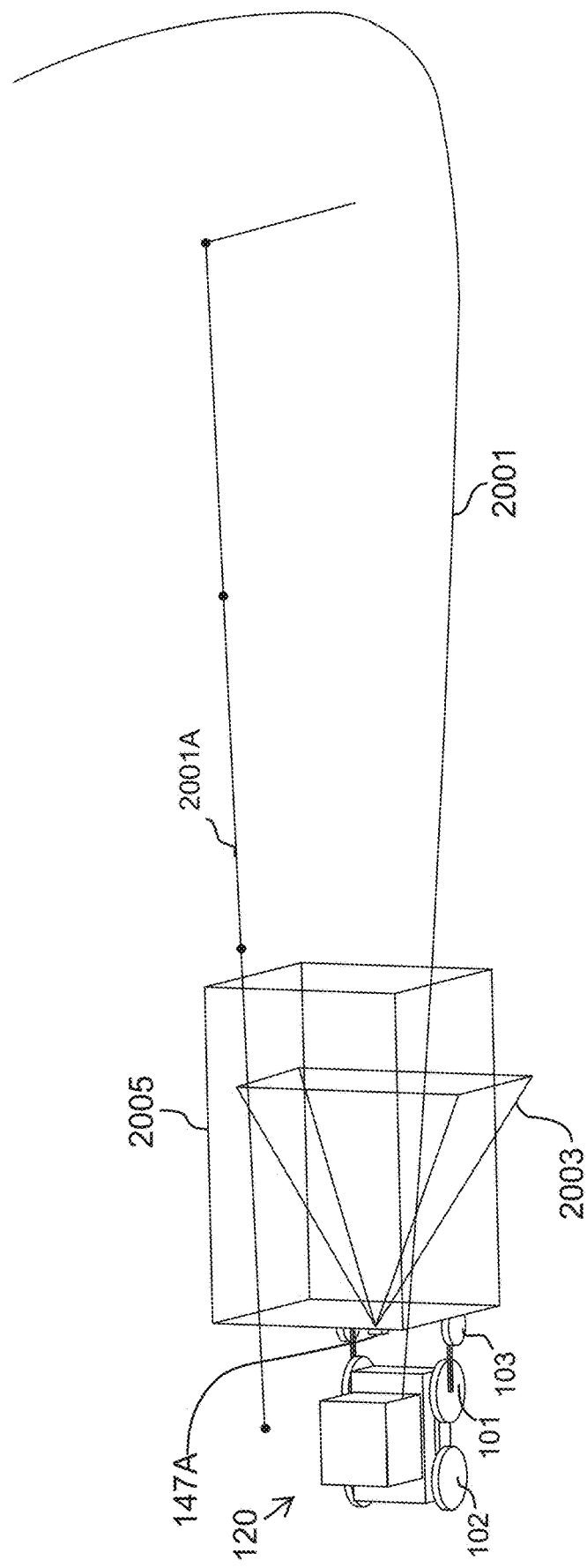

Referring now primarily to FIGS. 12A-12D, environmental information 651 (FIG. 10) can be received from sensors 147 (FIG. 10). Any of PBPs 100 (FIG. 4), UCP 130 (FIG. 4), and/or UCP assist 145 (FIG. 10) can process environmental information 651 (FIG. 10). In some configurations, PCL processor 611 (FIG. 10) can process environmental information 651 (FIG. 10) using, for example, and depending upon sensor 147 (FIG. 10), point cloud library (PCL) functions. As transporter 120 (FIG. 1) moves along travel path 2001 (FIG. 12D) around potential obstacles 2001A, sensors 147 (FIG. 10) can detect a cloud of points from, for example, and depending upon sensor 147 (FIG. 10), box 2005 (FIGS. 12C-12D) that can include data that could take the shape of frustum 2003 (FIGS. 12B-12D). A sample consensus method, for example, but not limited to, the random sample consensus method, from, for example, but not limited to, the PCL, can be used to find a plane among the cloud of points. Any of UCP 130 (FIG. 4), UCP assist 145 (FIG. 10), and PBPs 100 (FIG. 4) can create a projected cloud and can determine point cloud inliers, and from these, determine a centroid of the projected cloud. Central reference point 148 can be used to determine the location of environmental conditions with respect to transporter 120. For example, whether transporter 120 is moving towards or away from an obstacle, or where a door hinge is with respect to transporter 120 can be determined based on the location of central reference point 148. Sensors 147 (FIG. 10) can include, for example, time-of-flight sensor 147A.

Figure 13A:
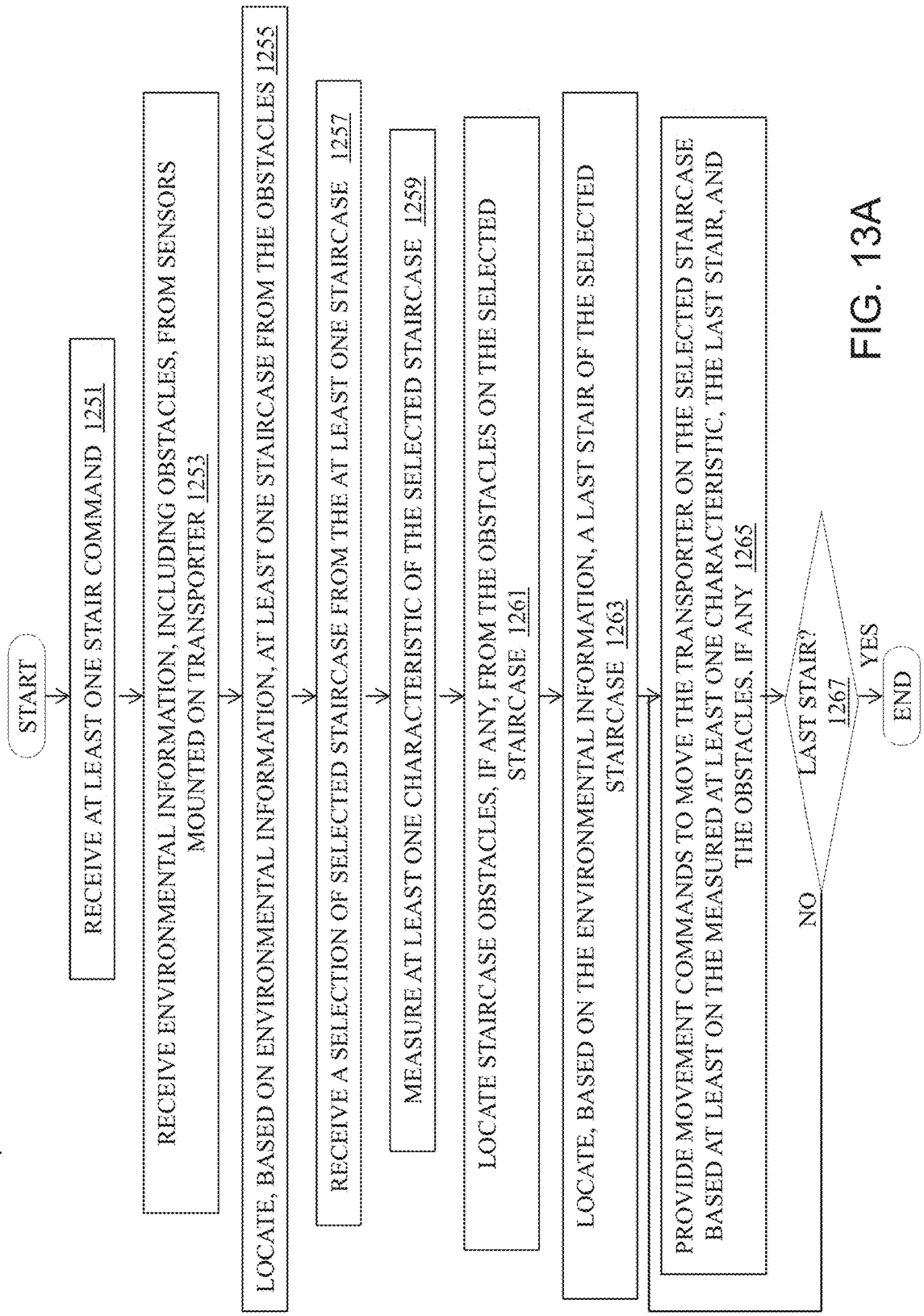
FIG. 13A is schematic block diagrams of a method of enhanced stair climbing of the present teachings.
Figure 13B:
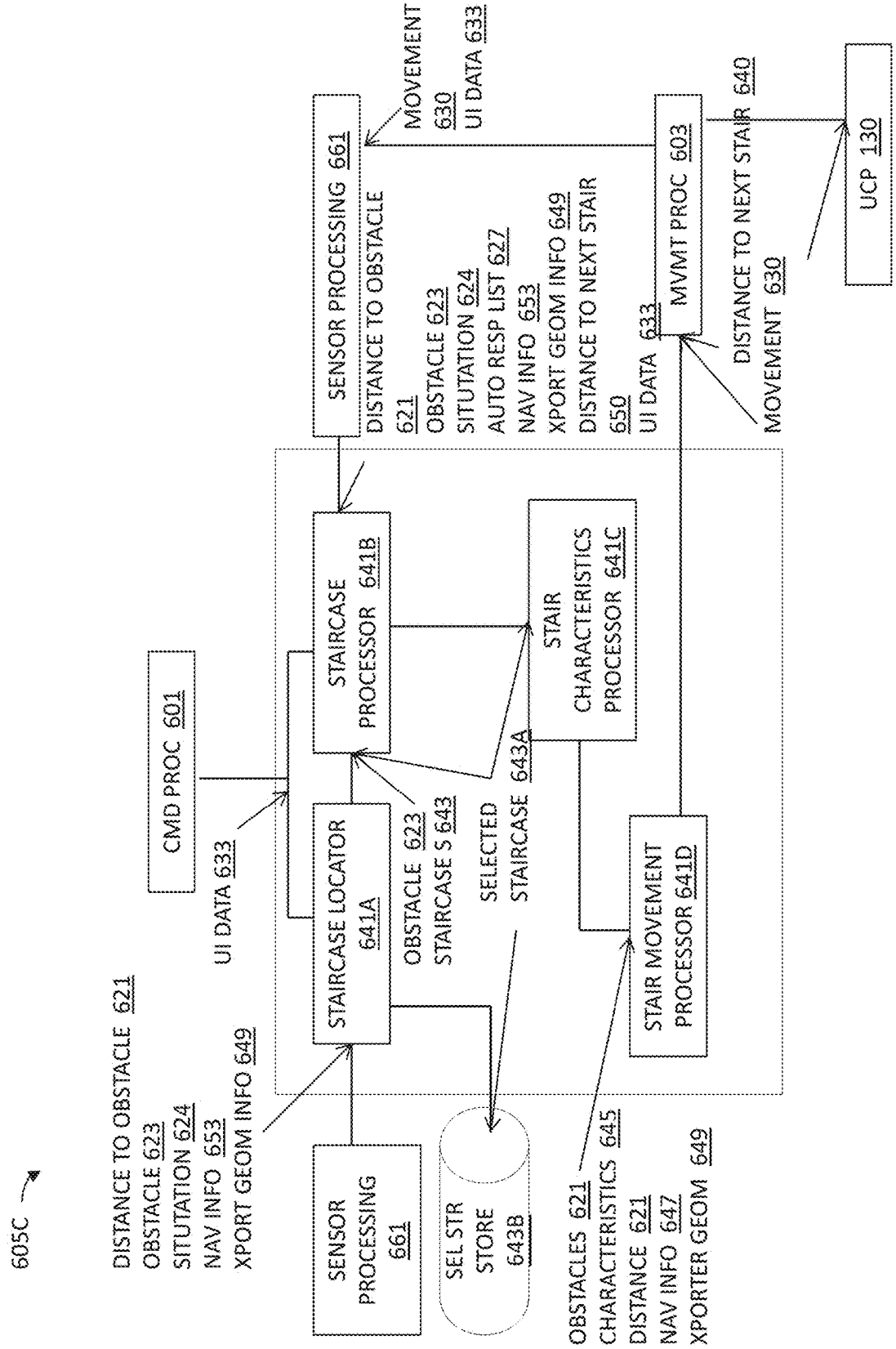
FIG. 13B is a schematic block diagram of the components of the enhanced stair climbing of the present teachings.

Referring now primarily to FIG. 13A, method 750 for enabling transporter 120 (FIG. 1) to navigate stairs can include, but is not limited to including, receiving 1251 at least one stair command, and receiving 1253 environmental information 651 (FIG. 10) from sensors 147 (FIG. 10) mounted on transporter 120 (FIG. 1) and through obstacle processor 607 (FIG. 10). Method 750 can further include locating 1255, based on environmental information 651 (FIG. 10), at least one of staircases 643 (FIG. 13B) within environmental information 651 (FIG. 10), and receiving 1257 selection of selected staircase 643A (FIG. 13B) from the at least one of staircases 643 (FIG. 13B). Method 750 can still further include measuring 1259 at least one characteristic 645 (FIG. 13B) of selected staircase 643A (FIG. 13B), and locating 1261, based on environmental information 651 (FIG. 13B), obstacles 623 (FIG. 13B), if any, on selected staircase 643A (FIG. 13B). Method 750 can also include locating 1263, based on environmental information 651 (FIG. 13B), a last stair of selected staircase 643A (FIG. 13B), and providing 1265 movement commands 630 (FIG. 13B) to move transporter 120 (FIG. 1) on selected staircase 643A (FIG. 13B) based on the measured at least one characteristic 645 (FIG. 13B), the last stair, and obstacles 623 (FIG. 13B), if any. If 1267 the last stair has not been reached, method 750 can continue providing movement commands 630 (FIG. 13B) to move transporter 120 (FIG. 1). Method 750 can optionally include locating at least one of staircases 643 (FIG. 13B) based on GPS data and building and saving a map of selected staircase 643A (FIG. 13B) using, for example, but not limited to, SLAM. Method 750 can also optionally include accessing geometry 649 (FIG. 13B) of transporter 120 (FIG. 1), comparing geometry 649 (FIG. 13B) to at least one of characteristics 645 (FIG. 13B) of selected staircase 643A (FIG. 13B), and modifying the step of navigating based on the step of comparing. At least one of characteristics 645 (FIG. 13B) can optionally include the height of at least one riser of selected staircase 643A (FIG. 13B), the surface texture of the at least one riser, and the surface temperature of the at least one riser. Method 750 can optionally include generating an alert if the surface temperature falls outside of a threshold range and the surface texture falls outside of a traction set. The threshold range can optionally include temperatures below 33° F. The traction set can optionally include a carpet texture. Method 750 can further include determining, based on environmental information 651 (FIG. 10), the topography of an area surrounding selected staircase 643A (FIG. 13B), and generating an alert if the topography is not flat. Method 750 can still further optionally include accessing a set of extreme circumstances.

Referring now primarily to FIG. 13B, automated navigation of stairs can be enabled by stair processor 605C for enabling transporter 120 (FIG. 1) to navigate stairs. Sensors 147 (FIG. 10) on transporter 120 (FIG. 1) can determine if any environmental information 651 (FIG. 10) includes at least one staircase 643. In conjunction with any automatic determination of a location of at least one staircase 643, UI data 633 can include the selection of stair mode 215 (FIG. 3A) which can invoke an automatic, semi-automatic, or semi-manual stair-climbing process. Either automatic location of at least one staircase 643 or reception of UI data 633 can invoke stair processor 605C for enhanced stair navigation functions. Stair processor 605C can receive data from obstacle processor 607 such as, for example, at least one obstacle 623, distance 621 to at least one obstacle 623, situation 624, navigation information 653, and geometry information 649 for transporter 120 (FIG. 1). Navigation information can include, but is not limited to including, a possible path for transporter 120 (FIG. 1) to traverse. At least one obstacle 623 can include, among other obstacles, at least one staircase 643. Stair processor 605C can locate at least one staircase 643, and can either automatically or otherwise determine selected staircase 643A based on, for example, but not limited to, navigation information 653 and/or UI data 633 and/or transporter geometry information 649. Characteristics 645 of selected staircase 643A, such as, for example, riser information, can be used to determine a first stair and distance to next stair 640. Stair processor 605C can determine movement commands 630 of transporter 120 (FIG. 1) based on, for example, but not limited to, characteristics 645, distance 621, and navigation information 647. Movement processor 603 can move transporter 120 (FIG. 1) based on movement commands 630, and distance to next stair 640, and can transfer control to sensor processing 661 after a stair from selected staircase 643A has been traversed. Sensor processing 661 can either proceed with navigating selected staircase 643A or can continue following the path set out by navigation information 653, depending upon whether transporter 120 (FIG. 1) has completed traversing selected staircase 643A. While transporter 120 (FIG. 1) is traversing selected staircase 643A, obstacle processor 607 can detect obstacles 623 on selected staircase 643A and stair processor 605C can provide movement commands 630 to avoid obstacles 623. Locations of obstacles 623 can be stored for future use locally to transporter 120 (FIG. 1) and/or external to transporter 120 (FIG. 1).

Continuing to refer primarily to FIG. 13B, stair processor 605C can include, but is not limited to including, staircase processor 641B receiving at least one stair command included in UI data 633, and staircase locator 641A receiving environmental information 651 (FIG. 10) from sensors 147 (FIG. 10) mounted on transporter 120 (FIG. 1) through obstacle processor 607 (FIG. 10). Staircase locator 641A can further locate, based on environmental information 651 (FIG. 10), at least one of staircases 643 within environmental information 651 (FIG. 10), and can receive the choice of selected staircase 643A from at least one of staircases 643. Selected staircase 643A can be stored in storage 643B for possible future use. Stair characteristics processor 641C can measure at least one of characteristics 645 of selected staircase 643A, and can locate, based on environmental information 651, at least one obstacle 623, if any, on selected staircase 643A. Stair movement processor 641D can locate, based on environmental information 651, a last stair of selected staircase 643A, and provide to movement processor 603 movement commands 630 for transporter 120 (FIG. 1) to move on selected staircase 643A based on the measured at least one of characteristics 645, the last stair, and at least one obstacle 623, if any. Staircase locator 641A can optionally locate at least one of staircases 643 based on GPS data, and can build and save a map of selected staircase 643A using SLAM. The map can be saved for use locally to transporter 120 (FIG. 1), and/or for use by other devices. Staircase processor 641B can optionally access geometry 649 of transporter 120 (FIG. 1), compare geometry 649 to at least one of characteristics 645 of selected staircase 643A, and can modify the navigation of transporter 120 (FIG. 1) based on the comparison. Staircase processor 641B can optionally generate an alert if the surface temperature of the risers of selected staircase 643A falls outside of a threshold range and the surface texture of selected staircase 643A falls outside of a traction set. Stair movement processor 641D can optionally determine, based on environmental information 651 (FIG. 10), the topography of an area surrounding selected staircase 643A, and can generate an alert if the topography is not flat. Stair movement processor 641D can optionally access a set of extreme circumstances.

Figure 14B:
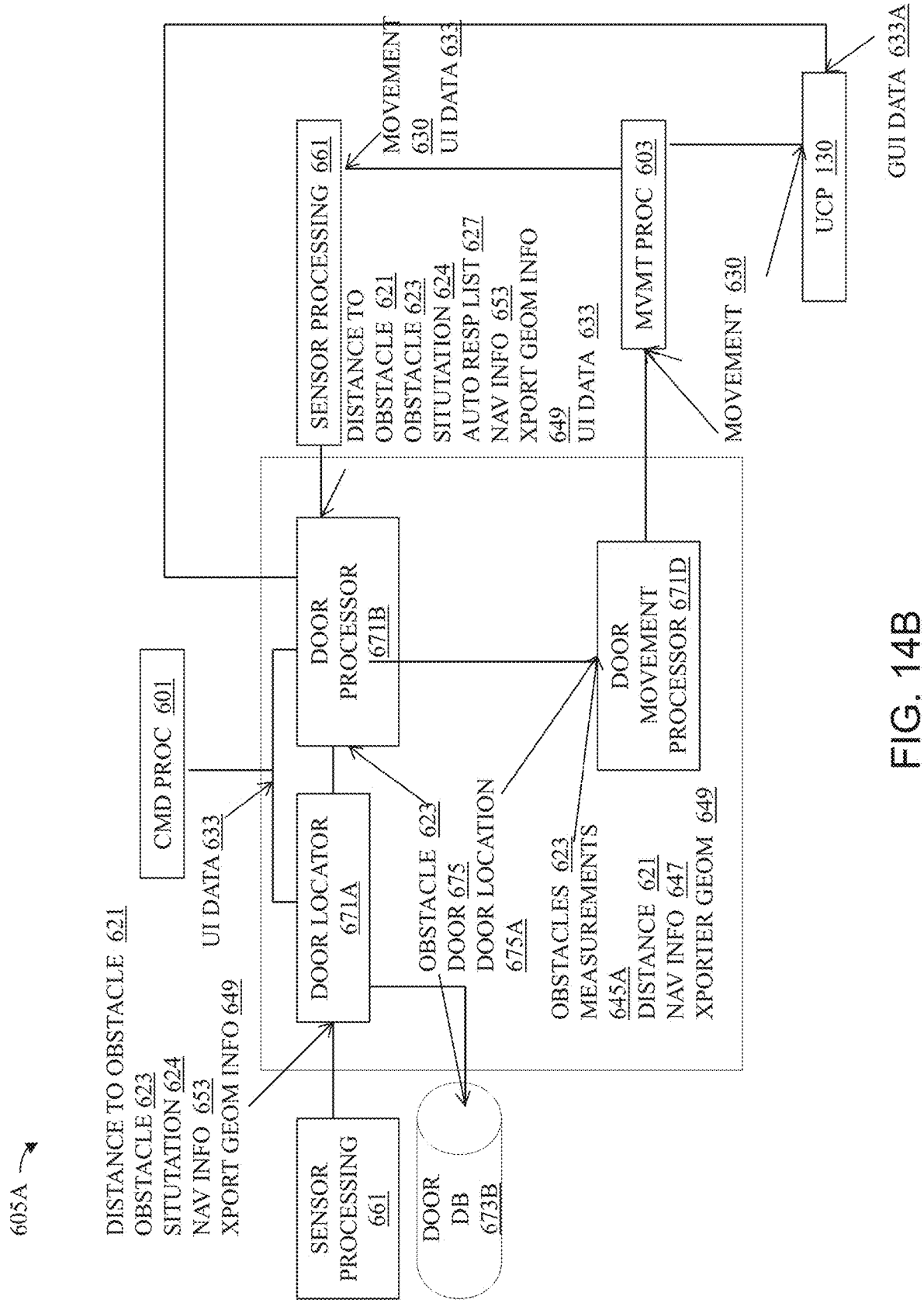
FIG. 14B is a schematic block diagram of the components of the door traversal of the present teachings.

Referring now primarily to FIGS. 14A1-14A2, method 850 for negotiating door 675 (FIG. 14B) while maneuvering transporter 120 (FIG. 1), where door 675 (FIG. 14B) can include a door swing, a hinge location, and a doorway, can include, but is not limited to including, receiving and segmenting 1351 (FIG. 14A1) environmental information 651 (FIG. 10) from sensors 147 (FIG. 10) mounted on transporter 120 (FIG. 1). Environmental information 651 (FIG. 10) can include geometry of transporter 120 (FIG. 1). Method 850 can include identifying 1353 (FIG. 14A1) at least one plane within the segmented sensor data, and identifying 1355 (FIG. 14A1) door 675 (FIG. 14B) within the at least one plane. Method 850 can further include measuring 1357 (FIG. 14A1) door 675 (FIG. 14B) to provide door measurements. Method 850 can also include determining 1361 (FIG. 14A1) the door swing. Method 850 can further include providing 1363 (FIG. 14A2) at least one movement command 630 (FIG. 14B) to move transporter 120 (FIG. 1) for access to a handle of door 675 (FIG. 14B), if necessary, and providing 1365 (FIG. 14A2) at least one movement command 630 (FIG. 14B) to move transporter 120 (FIG. 1) away from door 675 (FIG. 14B), as door 675 (FIG. 14B) opens, by a distance based on the door measurements. If door 675 (FIG. 14B) swings in, method 850 can include providing at least one movement command to move transporter 120 (FIG. 1) against door 675 (FIG. 14B), thus positioning door 675 (FIG. 14B) for movement of transporter 120 (FIG. 1) through the doorway. Method 850 can also include providing 1367 (FIG. 14A2) at least one movement command 630 (FIG. 14B) to move transporter 120 (FIG. 1) forward through the doorway, transporter 120 (FIG. 1) maintaining door 675 (FIG. 14B) in an open position, if the door swing is towards transporter 120 (FIG. 1).

Referring now to FIG. 14B, sensor processing 661 can determine, through information from sensors 147 (FIG. 10), the hinge side of door 675, and the direction, angle, and distance of door. Movement processor 603 can generate commands to PBPs 100 (FIG. 4) such as start/stop turning left, start/stop turning right, start/stop moving forward, start/stop moving backwards, and can facilitate door mode 605A by stopping transporter 120 (FIG. 1), cancelling the goal that transporter 120 (FIG. 1) can be aiming to complete, and centering joystick 133 (FIG. 1). Door processor 671B can determine whether door 675 is, for example, push to open, pull to open, or a slider. Door processor 671B can determine the width of door 675 by determining the current position and orientation of transporter 120 (FIG. 1), and determining the x/y/z location of the door pivot point. If door processor 671B determines that the number of valid points in the image of door 675 derived from obstacles 623 and/or PCL data 655 (FIG. 10) is greater than a threshold, door processor 671B can determine the distance from transporter 120 (FIG. 1) to door 675. Door processor 671B can determine if door 675 is moving based on successive samples of PCL data 655 (FIG. 10) from sensor processor 661. In some configurations, door processor 671B can assume that a side of transporter 120 (FIG. 1) is even with the handle side of door 675, and can use that assumption, along with the position of the door pivot point, to determine the width of door 675.

Continuing to refer primarily to FIG. 14B, if the movement of door 675 is towards transporter 120 (FIG. 1), door movement processor 671D can generate and provide movement commands 630 to movement processor 603 to move transporter 120 (FIG. 1) backward by a pre-determined or dynamically-determined percentage of the amount door 675 is moving. Movement processor 603 can provide movement commands 630 to UCP 130, and UCP 130 can accept GUI data 633A and provide GUI data 633A to movement processor 603. If door 675 is moving away from transporter 120 (FIG. 1), door movement processor 671D can generate movement commands 630 to direct transporter 120 (FIG. 1) to move forward by a pre-determined or dynamically-determined percentage of the amount that door 675 moves. The amount transporter 120 (FIG. 1) moves either forward or backward can be based on the width of door 675. Door processor 671B can locate the side of door 675 that provides the open/close function for door 675 based on the location of the door pivot point. Door processor 671B can determine the distance to the plane in front of sensors 147 (FIG. 4). Door movement processor 671D can generate movement commands 630 to direct transporter 120 (FIG. 1) to move through door 675. Door movement processor 671D can wait a pre-selected amount of time for the move of transporter 120 (FIG. 1) to complete, and door movement processor 671D can generate movement commands 630 to adjust the location of transporter 120 (FIG. 1) based on the position of door 675. Door processor 671B can determine the door angle and the door pivot point. Door processor 671B can determine if door 675 is stationary, can determine if door 675 is moving, and can determine the direction door 675 is moving. When door mode 605A is complete, door movement processor 671D can generate movement commands 630 that can direct transporter 120 (FIG. 1) to discontinue movement.

Continuing to still further refer primarily to FIG. 14B, door mode 605A for negotiating door 675 while maneuvering transporter 120 (FIG. 1), where door 675 can include a door swing, a hinge location, and a doorway, can include, but is not limited to including, sensor processing 661 receiving and segmenting environmental information 651 from sensors 147 (FIG. 10) mounted on transporter 120 (FIG. 1), where environmental information 651 can include geometry 649 of transporter 120 (FIG. 1). Door mode 605A can also include door locator 671A identifying at least one plane within the segmented sensor data, and identifying door 675 within the at least one plane. Door processor 671B can include measuring door 675 to provide door measurements 645A. Door movement processor 671D can provide at least one movement command 630 to move transporter 120 (FIG. 1) away from door 675 if door measurements 645A are smaller than geometry 649 of transporter (FIG. 1). Door processor 671B can also include determining the door swing, and door movement processor 671D can provide at least one movement command 630 to move transporter 120 (FIG. 1) forward through the doorway. Transporter 120 (FIG. 1) can open door 675 and maintain door 675 in an open position if the door swing is away from transporter 120 (FIG. 1). Door movement processor 671D can provide at least one movement command 630 to move transporter 120 (FIG. 1) for access to a handle of door 675, and can provide at least one movement command 630 to move transporter 120 (FIG. 1) away from door 675, as door 675 opens, by a distance based on door measurements 645A. Door movement processor 671D can provide at least one movement command 630 to move transporter 120 (FIG. 1) forward through the doorway. Transporter 120 (FIG. 1) can maintain door 675 in an open position if the door swing is towards transporter 120 (FIG. 1).

Figure 15B:
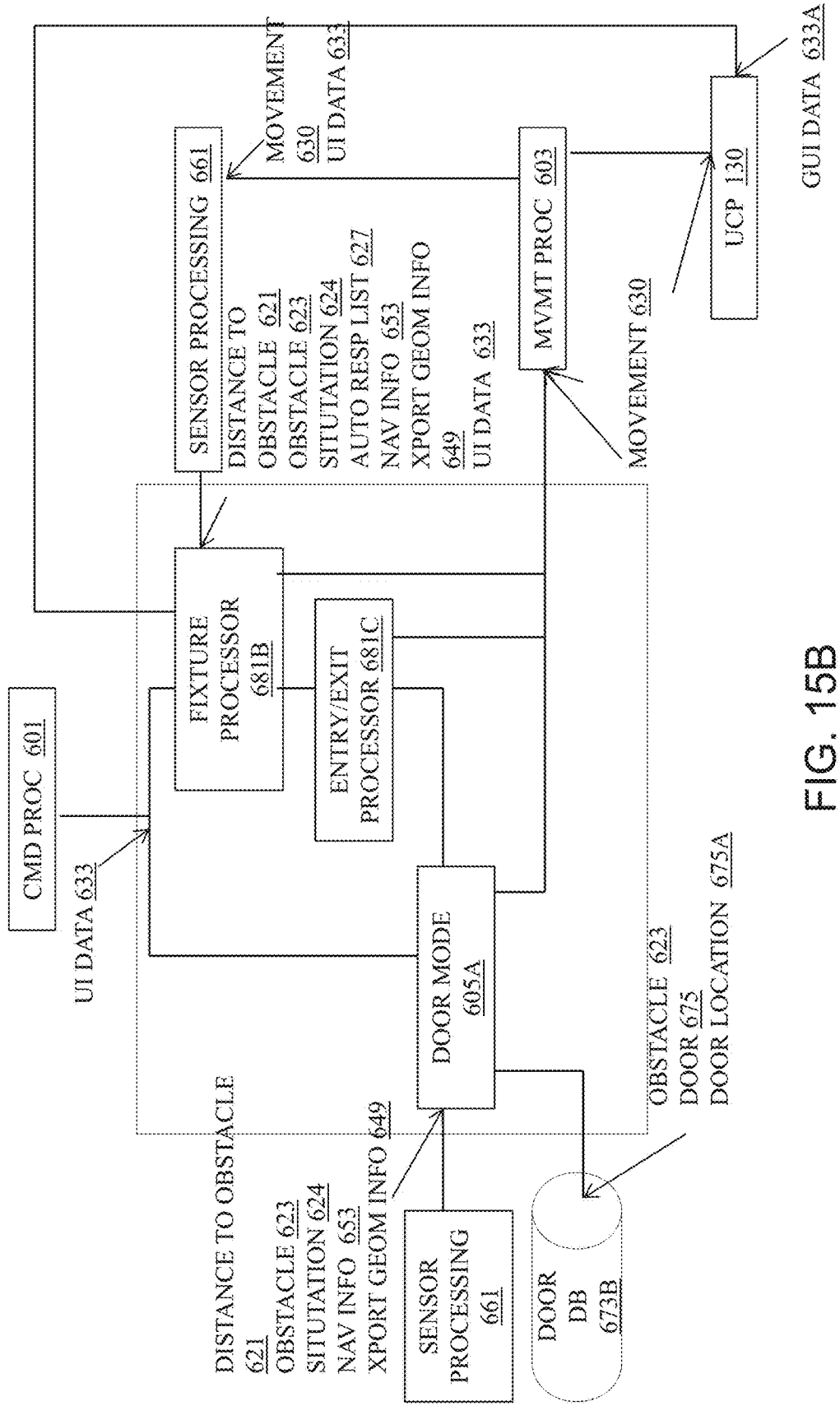
FIG. 15B is a schematic block diagram of the components of the rest room navigation of the present teachings.

Referring now to FIG. 15A, transporter 120 (FIG. 1) can automatically negotiate using rest room facilities. UCP assist 145 (FIG. 4) can automatically locate a door to a rest room, and to a rest room stall, if there are multiple doors, can automatically generate movement commands 630 (FIG. 15B) to move transporter 120 (FIG. 1) through the door(s), and can automatically position transporter 120 (FIG. 1) relative to rest room fixtures. After use of the rest room fixtures is complete, UCP assist 145 (FIG. 4) can automatically locate the door(s) and automatically generate movement commands 630 (FIG. 15B) to move transporter 120 (FIG. 1) through the door(s) to exit the rest room stall and/or rest room. Method 950 for negotiating, in transporter 120 (FIG. 1), a rest room stall in a rest room, where the rest room stall can have door 675 (FIG. 15B), and door 675 (FIG. 15B) can have a door threshold and a door swing, can include, but is not limited to including, providing 1451 at least one movement command 630 (FIG. 15B) to cause transporter 120 (FIG. 1) to traverse the door threshold entering the rest room. Method 950 can also include providing 1453 at least one movement command 630 (FIG. 15B) to position transporter 120 (FIG. 1) for accessing an egress handle of the door, and providing 1455 at least one movement command 630 (FIG. 15B) to move transporter 120 (FIG. 1) away from door 675 (FIG. 15B), as door 675 (FIG. 15B) closes, if the door swing is towards transporter 120 (FIG. 1). Method 950 can also include providing 1457 at least one movement command 630 (FIG. 15B) to move transporter 120 (FIG. 100) toward door 675 (FIG. 15B), as door 675 (FIG. 15B) closes, if the door swing is away from transporter 120 (FIG. 1), and providing 1459 at least one movement command 630 (FIG. 15B) to position transporter 120 (FIG. 1) alongside a first rest room fixture. Method 950 can include providing 1461 at least one movement command 630 (FIG. 15B) to stop transporter 120 (FIG. 1), and can include providing 1463 at least one movement command 630 (FIG. 15B) to position transporter 120 (FIG. 1) near a second rest room fixture. Method 950 can include providing 1465 at least one movement command 630 (FIG. 15B) to traverse the door threshold to exit the rest room stall.

Continuing to refer primarily to FIG. 15A, automatically traversing the door threshold can optionally include, but is not limited to including, receiving and segmenting 1351 (FIG. 14A1) environmental information 651 (FIG. 10) from sensors 147 (FIG. 10) mounted on transporter 120 (FIG. 1). Environmental information 651 (FIG. 10) can include geometry of transporter 120 (FIG. 1). Automatically traversing the door threshold can also optionally include identifying 1353 (FIG. 14A1) at least one plane within the segmented sensor data, and identifying 1355 (FIG. 14A1) door 675 (FIG. 14B) within the at least one plane. Automatically traversing the door threshold can further optionally include measuring 1357 (FIG. 14A1) door 675 (FIG. 14B) to provide door measurements, and providing 1359 (FIG. 14A1) at least one movement command 630 (FIG. 15B) to move transporter 120 (FIG. 1) away from door 675 (FIG. 14B) if the door measurements are smaller than geometry 649 (FIG. 14B) of transporter (FIG. 1). Automatically traversing the door threshold can also optionally include determining 1361 (FIG. 14A1) the door swing, and providing 1363 (FIG. 14A1) at least one movement command 630 (FIG. 15B) to move transporter 120 (FIG. 1) forward through the doorway, transporter 120 (FIG. 1) opening door 675 (FIG. 14B) and maintaining door 675 (FIG. 1) in an open position, if the door swing is away from transporter 120 (FIG. 1). Automatically traversing the door threshold can further optionally include providing 1365 (FIG. 14A2) at least one movement command 630 (FIG. 15B) to move the transporter for access to a handle of the door, and providing 1367 (FIG. 14A2) at least one movement command 630 (FIG. 15B) to move transporter 120 (FIG. 1) away from door 675 (FIG. 14B), as door 675 (FIG. 14B) opens, by a distance based on the door measurements. Automatically traversing the door threshold can also optionally include providing 1369 (FIG. 14A2) at least one movement command 630 (FIG. 15B) to move transporter 120 (FIG. 1) forward through the doorway, transporter 120 (FIG. 1) maintaining door 675 (FIG. 14B) in an open position, if the door swing is towards transporter 120 (FIG. 1). Method 950 can optionally include automatically locating the rest room, and automatically driving transporter 120 (FIG. 1) to the rest room. SLAM techniques can optionally be used to locate a destination, for example, a rest room. UCP assist 145 can optionally access a database of frequently-visited locations, can receive a selection one of the frequently-visited locations, and can provide at least one movement command 630 (FIG. 15B) to move transporter 120 (FIG. 1) to the selected location which can include, for example, but not limited to, a rest room.

Referring now to FIG. 15B, rest room mode 605B for negotiating, in transporter 120 (FIG. 1), a rest room stall in a rest room, where the rest room stall can have a door, and the door can have a door threshold and a door swing, can include, but is not limited to including, door mode 605A providing at least one movement command 630 to cause transporter 120 (FIG. 1) to traverse the door threshold entering the rest room. The rest room can also include fixtures such as for example, but not limited to, toilets, sinks, and changing tables. Entry/exit processor 681C can provide at least one movement command 630 to position transporter 120 (FIG. 1) for accessing an egress handle of the door, and can providing at least one movement command 630 to move the transporter away from the door, as the door closes, if the door swing is towards transporter 120 (FIG. 1). Entry/exit processor 681C can provide at least one movement command 630 to move transporter 120 (FIG. 1) toward door 675, as door 675 closes, if the swing of door 675 is away from transporter 120 (FIG. 1). Fixture processor 681B can provide at least one movement command 630 to position transporter 120 (FIG. 1) alongside a first rest room fixture, and can provide at least one movement command to stop transporter 120 (FIG. 1). Fixture processor 681B can also provide at least one movement command 630 to position transporter 120 (FIG. 1) near a second rest room fixture. Entry/exit processor 681C can provide at least one movement command 630 to traverse the door threshold to exit the rest room stall.

Figure 16B:
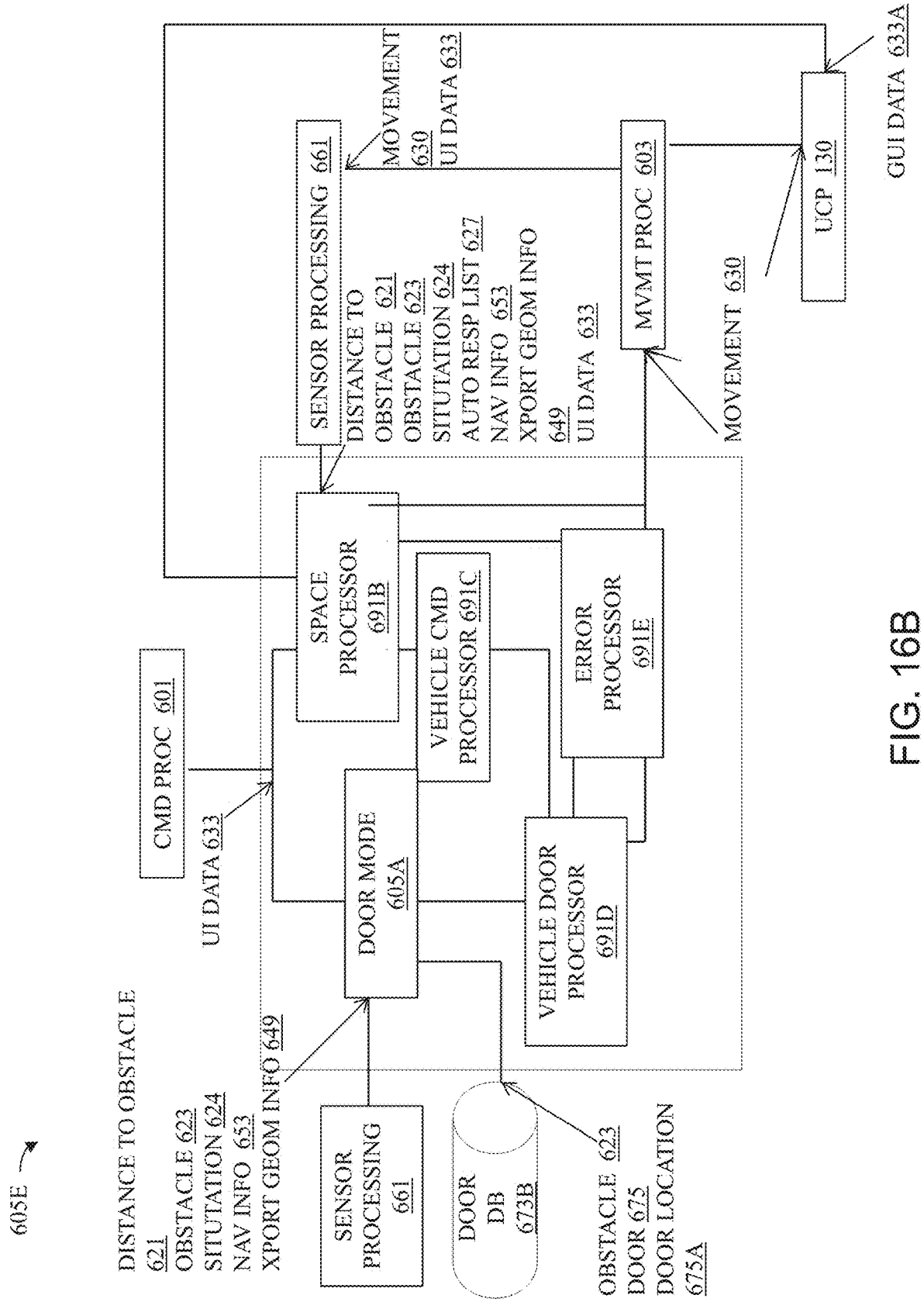
FIG. 16B is a schematic block diagram of the components of the mobile storage of the present teachings.

Referring now to FIGS. 16A1 and 16A2, method 1051 for automatically storing transporter 120 in a vehicle, such as, for example, but not limited to, an accessible van, can assist a user in independent use of the vehicle. When the user exits transporter 120 (FIG. 1) and enters the vehicle, possibly as the vehicle's driver, transporter 120 (FIG. 1) can remain parked outside of the vehicle. If transporter 120 (FIG. 1) is to accompany the user in the vehicle for later use, mobile park mode 605E (FIG. 16B) can provide movement commands 630 (FIG. 16B) to transporter 120 (FIG. 1) to cause transporter 120 (FIG. 1) to store itself either automatically or upon command, and to be recalled to the door of the vehicle as well. Transporter 120 (FIG. 1) can be commanded to store itself through commands received from external applications 140 (FIG. 4), for example. In some configurations, a computer-driven device such as a cell phone, laptop, and/or tablet can be used to execute external application 140 (FIG. 4) and generate information that could ultimately control transporter 120 (FIG. 1). In some configurations, transporter 120 (FIG. 1) can automatically proceed to mobile park mode 605E after the user exits transporter 120 (FIG. 1) when transporter 120 (FIG. 1) has been placed in park mode by, for example, the user. Movement commands 630 (FIG. 16B) can include commands to locate the door of the vehicle at which transporter 120 (FIG. 1) will enter to be stored, and to direct transporter 120 (FIG. 1) to the door. Mobile park mode 605E (FIG. 16B) can determine error conditions such as, for example, but not limited to, if the door is too small for transporter 120 (FIG. 1) to enter and can alert the user of the error condition through, for example, but not limited to, an audio alert through audio interface 150 (FIG. 4) and/or a message to external application 140 (FIG. 4). If the door is wide enough for transporter 120 (FIG. 1) to enter, mobile park mode 605E (FIG. 16B) can provide vehicle control commands to command the vehicle to open the door. Mobile park mode 605E (FIG. 16B) can determine when the vehicle door is open and whether or not there is space for transporter 120 (FIG. 1) to be stored. Mobile park mode 605E (FIG. 16B) can invoke obstacle processing 607 (FIG. 14B) to assist in determining the status of the vehicle door and if there is room in the vehicle to store transporter 120 (FIG. 1). If mobile park mode 605E (FIG. 16B) determines that there is enough room for transporter 120 (FIG. 1), mobile park mode 605E (FIG. 16B) can provide movement commands 630 (FIG. 16B) to move transporter 120 (FIG. 1) into the storage space in the vehicle. Mobile park mode 605E (FIG. 16B) can provide vehicle control commands to command the vehicle to lock transporter 120 (FIG. 1) into place, and to close the vehicle door. When transporter 120 (FIG. 1) is again needed, external application 140 (FIG. 1), for example, can be used to invoke mobile park mode 605E. Mobile park mode 605E (FIG. 16B) can recall the status of transporter 120 (FIG. 1) and can begin processing by providing vehicle control commands to command the vehicle to unlock transporter 120 (FIG. 1) and open the door of the vehicle. Mobile park mode 605E (FIG. 16B) can once again locate the door of the vehicle, or can access the location 675A of the door from, for example, local storage 607H (FIG. 14B) and/or cloud storage 607G (FIG. 14B). Mobile park mode 605E (FIG. 16B) can provide movement commands 630 (FIG. 16B) to move transporter 120 (FIG. 1) through the vehicle door and to the passenger door to which it had been summoned by, for example, external application 140 (FIG. 4). In some configurations, the vehicle can be tagged in places such as, for example, the entry door for storage of transporter 120 (FIG. 1). Mobile park mode 605E can recognize the tags, such as, for example, but not limited to, fiducials, bar codes, and/or QR CODES®, and can execute the method described herein as a result of recognizing the tags. Other tags can be included, such as tags within the storage compartment to indicate the proper storage location and tags on vehicle passenger doors. The tags can be RFID enabled, for example, and transporter 120 (FIG. 1) can include an RFID reader.

Continuing to refer primarily to FIGS. 16A1 and 16A2, method 1051 for automatically storing transporter 120 in a vehicle can include, but is not limited to including, providing 1551 at least one movement command 630 (FIG. 16B) to locate the door of the vehicle at which transporter 120 (FIG. 1) will enter to be stored in a storage space in the vehicle, and providing 1553 at least one movement command 630 (FIG. 16B) to direct transporter 120 (FIG. 1) to the door. If 1555 the vehicle door is wide enough for transporter 120 (FIG. 1) to enter, method 1051 can include providing 1557 at least one vehicle control command to command the vehicle to open the door. If 1559 the door is open and if 1561 there is room in the vehicle to store transporter 120 (FIG. 1), method 1051 can include providing 1563 at least one movement command 630 (FIG. 16B) to move transporter 120 (FIG. 1) into the storage space in the vehicle. Method 1051 can include providing 1565 at least one vehicle control command to command the vehicle to lock transporter 120 (FIG. 1) into place, and to close the door of the vehicle. If 1555 the vehicle door is not wide enough, or if 1559 the vehicle door is not open, or if 1561 there is no space for transporter 120 (FIG. 1), method 1051 can include alerting 1567 the user, and providing 1569 at least one movement command 630 (FIG. 16B) to return transporter 120 (FIG. 1) to the user.

Continuing to refer primarily to FIGS. 16A1 and 16A2, the at least one movement command 630 (FIG. 16B) to store transporter 120 (FIG. 100) can be received from external application 140 (FIG. 4) and/or automatically generated. Method 1051 can optionally include alerting the user of error conditions through, for example, but not limited to, an audio alert through audio interface 150 (FIG. 4) and/or a message to external application 140 (FIG. 4). Method 1051 can optionally invoke obstacle processing 607 (FIG. 14B) to assist in locating the door of the vehicle, to determine if there is enough room in the vehicle to store transporter 120 (FIG. 1), and to locate any locking mechanism in the vehicle. When transporter 120 (FIG. 1) is again needed, that is, when the user has arrived at a destination in the vehicle, external application 140 (FIG. 1), for example, can be used to invoke transporter 120 (FIG. 1). Method 1051 can include recalling the status of transporter 120 (FIG. 1) and can include providing vehicle control commands to command the vehicle to unlock transporter 120 (FIG. 1) and open the door of the vehicle. Method 1051 can include locating the door of the vehicle, or can include accessing the location of the vehicle door from, for example, local storage 607H (FIG. 14B) and/or cloud storage 607G (FIG. 14B). Method 1051 can include providing movement commands 630 (FIG. 16B) to move transporter 120 (FIG. 1) through the vehicle door and to the passenger door to which it had been summoned by, for example, but not limited to, external application 140 (FIG. 4).

Referring now to FIG. 16B, mobile park mode 605E can include, but is not limited to including, vehicle door processor 691D that can provide at least one movement command 630 to locate door 675 of the vehicle at which transporter 120 (FIG. 1) will enter to be stored in a storage space in the vehicle. Vehicle door processor 691D can also provide at least one movement command 630 to direct transporter 120 (FIG. 1) to door 675. If door 675 is wide enough for transporter 120 (FIG. 1) to enter, vehicle command processor 691C can provide at least one vehicle control command to command the vehicle to open door 675. If door 675 is open and if there is room in the vehicle to store transporter 120 (FIG. 1), space processor 691B can provide at least one movement command 630 to move transporter 120 (FIG. 1) into the storage space in the vehicle. Vehicle command processor 691C can provide at least one vehicle control command to command the vehicle to lock transporter 120 (FIG. 1) into place, and to close door 675 of the vehicle. If door 675 is not wide enough, or if door 675 is not open, or if there is no space for transporter 120 (FIG. 1), error processor 691E can alert the user, and can provide at least one movement command 630 to return transporter 120 (FIG. 1) to the user.

Continuing to refer to FIG. 16B, vehicle door processor 691D can optionally recall the status of transporter 120 (FIG. 1), and vehicle command processor 691C can provide vehicle control commands to command the vehicle to unlock transporter 120 (FIG. 1) and open door 675 of the vehicle. Vehicle door processor 691D can once again locate door 675 of the vehicle, or can access the location of door 675 from, for example, local storage 607H (FIG. 14B) and/or cloud storage 607G (FIG. 14B), and/or door database 673B. Vehicle door processor 691D can provide movement commands 630 to move transporter 120 (FIG. 1) through door 675 and to the passenger door to which it had been summoned by, for example, external application 140 (FIG. 4).

Figure 17A:
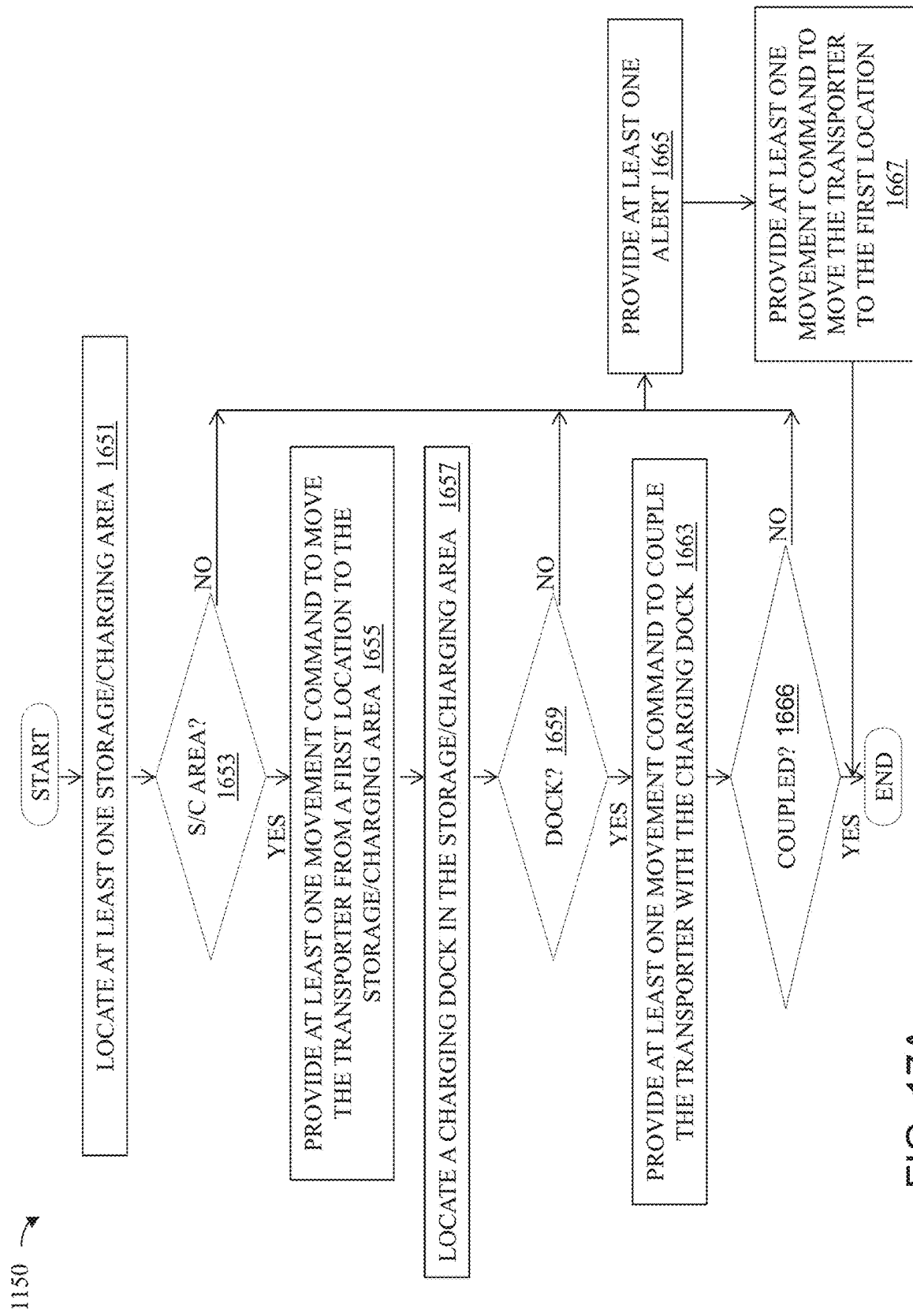
FIG. 17A is a schematic block diagrams of a method of storage/charging of the present teachings.

Referring now primarily to FIG. 17A, method 1150 for storing/recharging transporter 120 (FIG. 1) can assist the user in storing and possibly recharging transporter 120 (FIG. 1). For example, transporter 120 (FIG. 1) could be recharged when the user sleeps. After the user exits transporter 120 (FIG. 1), commands can be initiated at, for example, external application 140 (FIG. 4), to move perhaps riderless transporter 120 (FIG. 1) to a storage/docking area. In some configurations, a mode selection by the user while the user occupies transporter 120 (FIG. 1) can initiate automatic storage/docking functions after the user has exited transporter 120 (FIG. 1). When transporter 120 (FIG. 1) is again needed, commands can be initiated by external application 140 (FIG. 4) to recall transporter 120 (FIG. 1) to the user. Method 1150 can include, but is not limited to including, locating 1651 at least one storage/charging area, and providing 1655 at least one movement command 630 (FIG. 17B) to move transporter 120 (FIG. 1) from a first location to the storage/charging area. Method 1150 can include locating 1657 a charging dock in the storage/charging area and providing 1663 at least one movement command 630 (FIG. 17B) to couple transporter 120 (FIG. 1) with the charging dock. Method 1150 can optionally include providing at least one movement command 630 (FIG. 17B) to move transporter 120 (FIG. 1) to the first location when transporter 120 (FIG. 1) receives an invocation command. If 1653 there is no storage/charging area, or if 1659 there is no charging dock, or if 1666 transporter 120 (FIG. 1) cannot couple with the charging dock, method 1150 can optionally include providing 1665 at least one alert to the user, and providing 1667 at least one movement command 630 (FIG. 17B) to move transporter 120 (FIG. 1) to the first location.

Figure 17B:
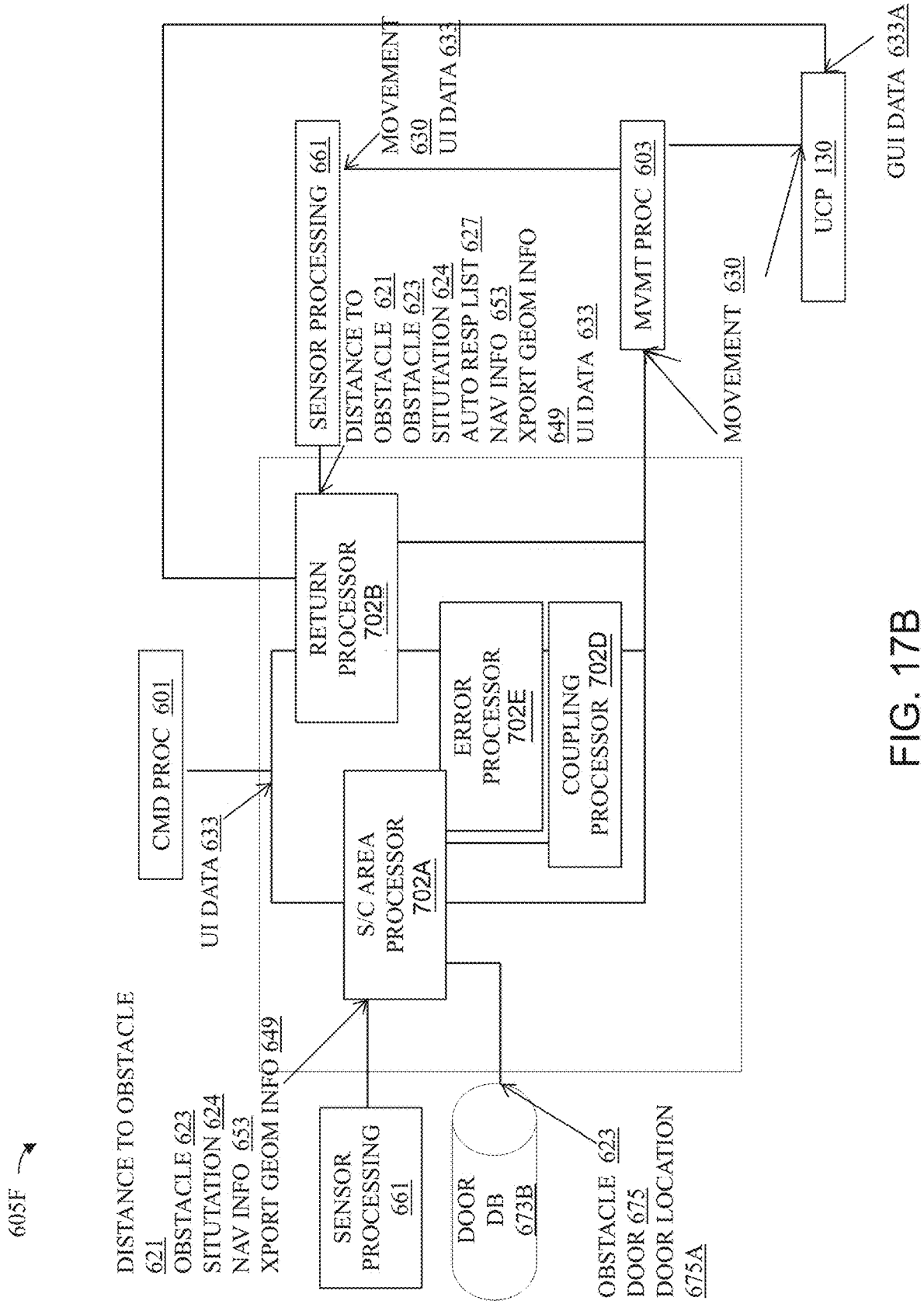
FIG. 17B is a schematic block diagram of the components of the storage/charging of the present teachings.

Referring now to FIG. 17B, static storage/charging mode 605F can include, but is not limited to including, storage/charging area processor 702A that can locate at least one storage/charging area 695, and can provide at least one movement command 630 to move transporter 120 (FIG. 1) from a first location to storage/charging area 695. Coupling processor 702D can locate a charging dock in a storage/charging area, and can provide at least one movement command 630 to couple transporter 120 (FIG. 1) with the charging dock. Return processor 702B can optionally provide at least one movement command 630 to move transporter 120 (FIG. 1) to the first location when transporter 120 (FIG. 1) receives an invocation command. If there is no storage/charging area 695, or if there is no charging dock, or if transporter 120 (FIG. 1) cannot couple with the charging dock, error processor 702E can optionally provide at least one alert to the user, and can providing at least one movement command 630 to move transporter 120 (FIG. 1) to the first location.

Figure 18A:
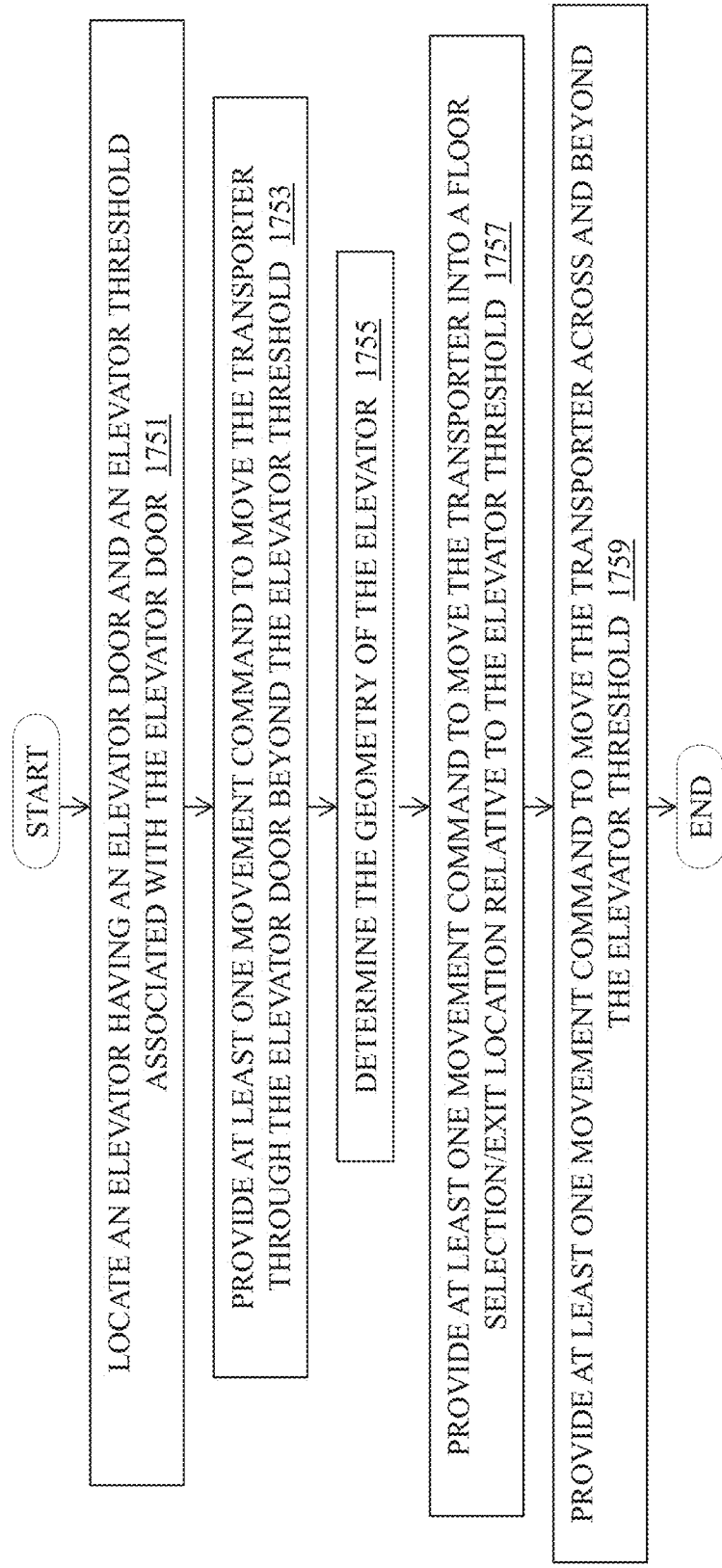
FIG. 18A is a schematic block diagrams of a method of elevator navigation of the present teachings.
Figure 18B:
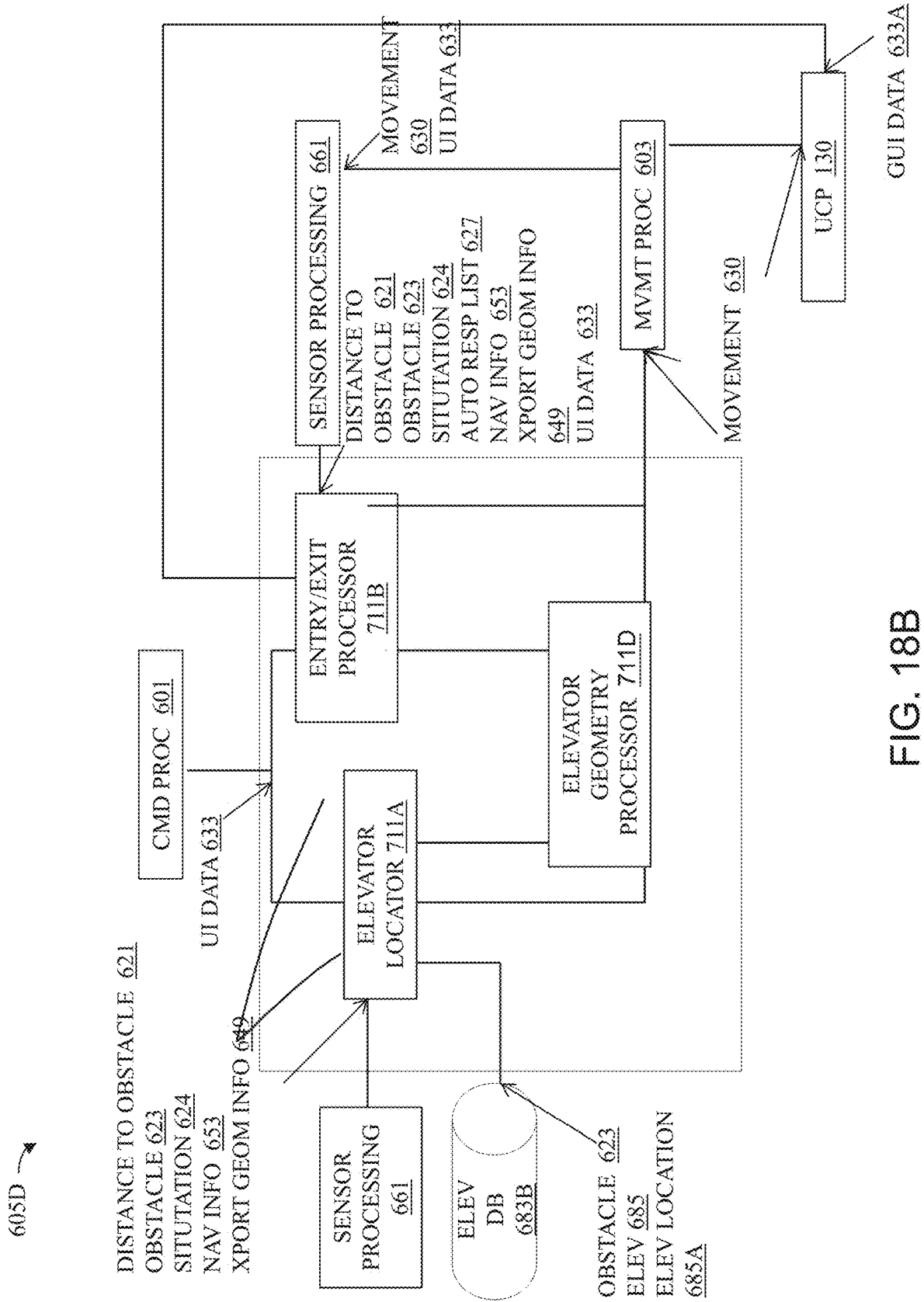
FIG. 18B is a schematic block diagram of the components of the elevator navigation of the present teachings.

Referring now to FIG. 18A, method 1250 for negotiating an elevator while maneuvering transporter 120 (FIG. 1) can assist a user in getting on and off elevator 685 (FIG. 18B) in transporter 120 (FIG. 1). Sensor processing 661 can be used to locate elevator 685 (FIG. 18B), for example, or elevator location 685A (FIG. 18B) can be determined from local storage 607H (FIG. 14B) and/or storage cloud 607G (FIG. 14B). When elevator 685 (FIG. 18B) is located, and when the user selects the desired elevator direction, and when elevator 685 (FIG. 18B) arrives and the door opens, elevator mode 605D (FIG. 18B) can provide movement commands 630 (FIG. 18B) to move transporter 120 (FIG. 1) into elevator 685 (FIG. 18B). The geometry of elevator 685 (FIG. 18B) can be determined and movement commands 630 (FIG. 18B) can be provided to move transporter 120 (FIG. 1) into a location that makes it possible for the user to select a desired activity from the elevator selection panel. The location of transporter 120 (FIG. 1) can also be appropriate for exiting elevator 685 (FIG. 18B). When the elevator door opens, movement commands 630 (FIG. 18B) can be provided to move transporter 120 (FIG. 1) to fully exit elevator 685 (FIG. 18B). Method 1250 can include, but is not limited to including, locating 1751 elevator 685 (FIG. 18B), where elevator 685 (FIG. 18B) has an elevator door and an elevator threshold associated with the elevator door. Method 1250 can include providing 1753 at least one movement command 630 (FIG. 18B) to move transporter 120 (FIG. 1) through the elevator door beyond the elevator threshold. Method 1250 can also include determining 1755 the geometry of elevator 685 (FIG. 18B), and providing 1757 at least one movement command 630 (FIG. 18B) to move transporter 120 (FIG. 1) into a floor selection/exit location relative to the elevator threshold. Method 1250 can also include providing 1759 at least one movement command 630 (FIG. 18B) to move transporter 120 (FIG. 1) across and beyond the elevator threshold to exit elevator 685 (FIG. 18B).

Referring now primarily to FIG. 18B, elevator mode 605D can include, but is not limited to including, elevator locator 711A that can locate elevator 685 having an elevator door and an elevator threshold associated with the elevator door. Elevator locator 711A can save obstacles 623, elevators 685, and elevator locations 685A in elevator database 683B, for example. Elevator database 683B can be located locally or remotely from transporter 120. Entry/exit processor 711B can provide at least one movement command 630 to move transporter 120 (FIG. 1) through the elevator door beyond the elevator threshold to either enter or exit elevator 685. Elevator geometry processor 711D can determine the geometry of elevator 685. Entry/exit processor 711B can provide at least one movement command 630 to move transporter 120 (FIG. 1) into a floor selection/exit location relative to the elevator threshold.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of system 200A (FIG. 4), for example, can operate on a computer having a variable number of CPUs. Other alternative computer platforms can be used.

The present configuration is also directed to software and/or firmware and/or hardware for accomplishing the methods discussed herein, and computer readable media storing software for accomplishing these methods. The various modules described herein can be accomplished by the same CPU, or can be accomplished by different CPUs tightly or loosely coupled. The various modules can be accomplished by specially-designed integrated circuits. In compliance with the statute, the present configuration has been described in language more or less specific as to structural and methodical features. It is to be understood, however, that the present configuration is not limited to the specific features shown and described, since the means herein disclosed comprise various forms of putting the present teachings into effect.

Methods 650 (FIGS. 11A1-11A2), 750 (FIG. 13A), 850 (FIGS. 14A1-14A2), 950 (FIG. 15A), 1050 (FIGS. 16A1-16A2), 1150 (FIG. 17A), and 1250 (FIG. 18A), can be, in whole or in part, implemented electronically. Signals representing actions taken by elements of system 200A (FIG. 4) and other disclosed configurations can travel over at least one live communications network 143/144 (FIG. 4). Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read.

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

The invention claimed is:

1. A method for reacting to at least one obstacle while maneuvering a transporter, the transporter including a processor configured to execute instructions to control motion of the transporter, the method comprising:
   receiving, by the processor from a user, at least one command and user information;
   receiving, by the processor, and segmenting, by the processor, obstacle data from at least one sensor associated with the transporter, the at least one sensor collecting the obstacle data as the transporter moves;
      identifying, by the processor, at least one plane within the segmented obstacle data;
      identifying, by the processor, the at least one obstacle within the at least one plane;
   measuring, by the processor, at least one characteristic of at least one staircase, the processor locating, based on environmental information, at least one stair obstacle, from the at least one obstacle, on the at least one staircase;
   locating, by the processor, based on the environmental information, a last stair of the at least one staircase,
      determining, by the processor, at least one situation identifier based at least on the at least one obstacle, the user information, and the at least one command;
      determining, by the processor, an obstacle distance between the transporter and the at least one obstacle;
   accessing, by the processor, at least one allowed command related to the obstacle distance, the at least one obstacle, and the at least one situation identifier;
   accessing, by the processor, at least one automatic response to the at least one command;
   relating, by the processor, the at least one command to one of the at least one allowed commands forming a related allowed command;
      providing, by the processor, at least one first movement command instructing the transporter to move moving, by the processor, the transporter based at least on the at least one command and the at least one automatic response associated with the related allowed command; and
   providing, by the processor, at least one second movement command instructing the transporter to move on the at least one staircase based on the at least one characteristic, the last stair, and the at least one stair obstacle.

2. The method as in claim 1 wherein the at least one obstacle comprises at least one moving object.

3. The method as in claim 2 further comprising:
   tracking the at least one moving object using simultaneous location and mapping (SLAM) with detection and tracking of moving objects (DATMO) based on a location of the transporter.

4. The method as in claim 1 wherein the distance comprises a dynamically-varying amount.

5. The method as in claim 1 wherein the at least one movement command comprises a pass-the-at-least-one-obstacle command.

6. A method for enabling a transporter to navigate stairs transporter, the transporter including a processor configured to execute instructions to control motion of the transporter through movement commands to wheel motor drives of the transporter, the method comprising:
   receiving, by the processor from a user, at least one stair command;
   receiving, by the processor, environmental information from sensors mounted on the transporter, the sensors collecting obstacle data as the transporter moves;
   locating, by the processor, based on the environmental information, a plurality of staircases;
   receiving, by the processor, a selection of a selected staircase from the plurality of staircases, the selection being based on the environmental information;
   measuring, by the processor, based on the environmental information, at least one characteristic of the selected staircase;
   locating, by the processor, based on the environmental information, at least one obstacle on the selected staircase;
   locating, by the processor, based on the environmental information, a last stair of the selected staircase; and
   providing, by the processor, the at least one stair command to move the transporter on the selected staircase based at least on the measured at least one characteristic, the last stair, and the at least one obstacle.

7. The method as in claim 6 further comprising: locating the at least one staircase based on GPS data.

8. The method as in claim 6 further comprising: building a map of the selected staircase using SLAM.

9. The method as in claim 6 wherein the at least one characteristic comprises a surface texture of a surface of at least one riser of the selected staircase.

10. The method as in claim 6 further comprising:
  determining a situation identifier based at least on user information, the at least one stair command, and the at least one obstacle; and
  determining an obstacle distance between the transporter and the at least one obstacle as the transporter moves.

11. The method as in claim 10 further comprising:
  accessing an allowed command related to the obstacle distance, the at least one obstacle, and the situation identifier as the transporter moves;
  accessing an automatic response associated with the allowed command as the transporter moves;
  relating the at least one stair command with at least one of the allowed commands as the transporter moves; and
  enabling mode-specific processing based at least on the automatic response associated with the related allowed command as the transporter moves.

12. The method as in claim 6 further comprising: storing a location of the at least one obstacle in a storage cloud; and enabling systems external to the transporter to access the at least one stored obstacle.

13. The method as in claim 6 further comprising:
  segmenting the environmental information, the environmental information being included in point cloud data received from the sensors, the environmental information including geometry of the transporter;
  identifying at least one plane within the point cloud data of the segmented environmental information as the transporter moves;
  identifying a door within the at least one plane;
  measuring, based on the segmented environmental information, the door;
  determining a handle location of at least one handle associated with the door;
  providing a first at least one movement command moving the transporter towards the handle location for access to the at least one handle;
  providing a second at least one movement command moving the transporter away from the door as the door opens by a door distance, the door distance being based at least on measured door characteristics associated with the measured door if a swing of the door is towards the transporter; and
  providing a third at least one movement command moving the transporter through a doorway associated with the door.

14. The method as in claim 13 wherein the measured door characteristics comprise the swing of the door, a hinge side of the door, a width of the door, and a direction and an angle of the door.

15. The method as in claim 14 further comprising:
  determining a traversal distance from the transporter to the door;
  generating at least one movement command moving the transporter based at least on the door swing, the width of the door, and the traversal distance.

16. The method as in claim 14 further comprising:
  generating an alert if the width is smaller than a pre-selected size related to a size of the transporter;
  positioning the transporter for access to the door, the positioning being based on the width;
  generating a first signal for opening the door;
  moving the transporter through a doorway associated with the door; and
  generating a second signal to close the door.

17. The method as in claim 6 wherein the sensors comprise time of flight sensors.

18. The method as in claim 6 further comprising:
  locating, by processing of data from the sensors, at least one storage/charging area;
  providing a first at least one movement command to move the transporter from a pre-selected location to the located at least one storage/charging area;
  locating, by processing of data from the sensors, a charging dock in the at least one storage/charging area; and
  providing a second at least one movement command to couple the transporter with the charging dock.

19. The method as in claim 6 further comprising:
  locating, by the processor processing of data from the sensors, an elevator;
  providing, by the processor, a first at least one movement command to the wheel motor drives moving the transporter through an elevator door associated with the elevator, the at least one movement command driving the wheel motor drives of the transporter to clear an elevator threshold associated with the elevator door and arrive within the elevator;
  determining, by the processor processing of data from the sensors, a geometry of the elevator;
  providing, by the processor to the wheel motor drives, a second at least one movement command driving the wheel motor drives of the transporter into a floor selection/exit location relative to the elevator threshold; and
  when the elevator door opens, providing, by the processor, a third at least one movement command driving the wheel motor drives of the transporter across the elevator threshold to arrive outside of the elevator.

20. A transporter for navigating stairs comprising:
  a processor receiving, from a user, at least one stair command included in user information,
  the processor receiving environmental information from sensors mounted on the transporter, the processor locating, at least one staircase within the environmental information, and receiving a choice of a selected of the at least one staircase,
  the processor measuring at least one characteristic of the selected of the at least one staircase, the processor locating, based on the environmental information, obstacles; on the selected of the at least one staircase,
  the processor locating, based on environmental information, a last stair of the selected of the at least one staircase, the processor providing at least one movement command instructing the transporter to move on the selected of the at least one staircase based on the at least one characteristic, the last stair, and the at least one obstacle.

* * * * *